(12) United States Patent
Kushmerick et al.

(10) Patent No.: US 11,316,727 B2
(45) Date of Patent: Apr. 26, 2022

(54) METHOD AND SYSTEM FOR CLUSTERING EVENT MESSAGES AND MANAGE EVENT-MESSAGE CLUSTERS

(71) Applicant: VMware, Inc., Palo Alto, CA (US)

(72) Inventors: Nicholas Kushmerick, Seattle, WA (US); Matt Roy McLaughlin, Seattle, WA (US); Darren Brown, Seattle, WA (US); Junyuan Lin, Seattle, WA (US)

(73) Assignee: VMware, Inc., Palo Alto, CA (US)

( * ) Notice: Subject to any disclaimer, the term of this patent is extended or adjusted under 35 U.S.C. 154(b) by 0 days.

(21) Appl. No.: 16/827,457

(22) Filed: Mar. 23, 2020

(65) Prior Publication Data

US 2020/0228392 A1  Jul. 16, 2020

Related U.S. Application Data

(63) Continuation of application No. 15/251,481, filed on Aug. 30, 2016, now Pat. No. 10,616,038, which is a continuation-in-part of application No. 14/313,802, filed on Jun. 24, 2014, now Pat. No. 10,205,627.

(51) Int. Cl.
| | |
|---|---|
| *G06F 15/16* | (2006.01) |
| *H04L 41/0604* | (2022.01) |
| *H04L 67/10* | (2022.01) |
| *H04L 41/069* | (2022.01) |
| *H04L 67/131* | (2022.01) |
| *H04L 41/22* | (2022.01) |
| *H04L 67/75* | (2022.01) |

(52) U.S. Cl.
CPC ........ *H04L 41/0613* (2013.01); *H04L 41/069* (2013.01); *H04L 41/22* (2013.01); *H04L 67/10* (2013.01); *H04L 67/36* (2013.01); *H04L 67/38* (2013.01)

(58) Field of Classification Search
CPC ... H04L 41/0613; H04L 41/069; H04L 41/22; H04L 67/10; H04L 67/36; H04L 67/38
See application file for complete search history.

(56) References Cited

U.S. PATENT DOCUMENTS

| | | | |
|---|---|---|---|
| 2008/0065974 A1* | 3/2008 | Campbell | G06Q 10/107 715/200 |
| 2011/0099500 A1* | 4/2011 | Smith | H04L 41/22 715/771 |

(Continued)

*Primary Examiner* — Normin Abedin

(57) ABSTRACT

The current document is directed to methods and systems that process, classify, efficiently store, and display large volumes of event messages generated in modern computing systems. In a disclosed implementation, received event messages are assigned to event-message clusters based on non-parameter tokens identified within the event messages. A parsing function is generated for each cluster that is used to extract data from incoming event messages and to prepare event records from event messages that more efficiently and accessible store event information. The parsing functions also provide an alternative basis for assignment of event messages to clusters. Event types associated with the clusters are used for gathering information from various information sources with which to automatically annotate event messages displayed to system administrators, maintenance personnel, and other users of event messages.

20 Claims, 84 Drawing Sheets

FIG. 1

(56) References Cited

U.S. PATENT DOCUMENTS

2011/0185234 A1* 7/2011 Cohen .................. G06F 16/285
714/37
2014/0157288 A1* 6/2014 Wong .................. G06F 11/3065
719/318

* cited by examiner 1202  1208  1210

2013-12-02T10:44:24.095Z li-qe-esx5.vmware.com Rhttpproxy:
[28959B90 verbose 'Proxy Req 46691'] Connected to
localhost:8307 ——— 1212                              1206

2013-12-02T10:44:24.094Z li-qe-esx5.vmware.com Rhttpproxy:
[FFFC2B90 verbose 'Proxy Req 46691'] new proxy client
TCP (local=127.0.0.1:80, peer=127.0.0.1:50155)

2013-12-02T10:44:24.093Z li-qe-esx5.vmware.com Rhttpproxy:
[2889B90 verbose 'Proxy Req 46685'] The client closed the
stream, not unexpectedly.

Dec  2 18:48:29 strata-vc 2013-12-02T18:48:30.273Z
[7FA39448B700 info 'commonvpxLro' opID=1947d6f9]  [VpxLRO] --
FINISH task-internal-2163522 -- -- vim.SessionManager.logout -

2013-12-02T18:48:51.396Z strata-esx1.eng.vmware.com Vpxa:
[65B5AB90 verbose 'VpxaHalCnxHostagent' opID=WFU-ed393333]
[WaitForUpdatesDone] Completed callback 2013-12-02T18:48:51.395Z strata-esx1.eng.vmware.com Vpxa:
[65B5AB90 verbose 'VpxaHalCnxHostagent' opID=WFU-ed393333]
[WaitForUpdatesDone] Starting next WaitForUpdates() call to
hostd 2013-12-02T18:48:51.395Z strata-esx1.eng.vmware.com Vpxa:
[65B5AB90 verbose 'vpxavpxaInvtVm' opID=WFU-ed393333]
[VpxaInvtVmChangeListener] Guest DiskInfo Changed 2013-12-02T18:48:51.395Z strata-esx1.eng.vmware.com Vpxa:
[65B5AB90 verbose 'halservices' opID=WFU-ed393333]
[VpxaHalServices] VMGuestDiskChange Event for vm(6) 59

2013-12-02T18:48:51.395Z strata-esx1.eng.vmware.com Vpxa:
[65B5AB90 verbose 'hostdvm' opID=WFU-ed393333]
[VpxaHalVmHostagent] 59: GuestInfo changed 'guest.disk'

2013-12-02T18:48:51.395Z strata-esx1.eng.vmware.com Vpxa:
[65B5AB90 verbose 'VpxaHalCnxHostagent' opID=WFU-ed393333]
[VpxaHalCnxHostagent::ProcessUpdate] Applying updates from
123718 to 123719 (at 123718)

2013-12-02T18:48:51.395Z strata-esx1.eng.vmware.com Vpxa:
[65B5AB90 verbose 'VpxaHalCnxHostagent' opID=WFU-ed393333]
[WaitForUpdatesDone] Received callback
2013-12-02T18:48:51.360Z li-dev-esx6.eng.vmware.com Hostd:
[617C1B90 error 'SoapAdapter.HTTPService'] HTTP Transaction

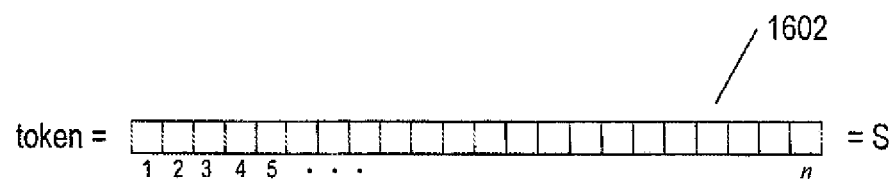
$$\begin{aligned} A_1 &= 1 \oplus S_1 \\ B_1 &= A_1 \\ \\ A_2 &\quad A_1 \oplus S_2 \\ B_2 &\quad B_1 \oplus A_2 \\ \\ 1604 \quad A_3 &\quad A_2 \oplus S_3 \\ B_3 &\quad B_2 \oplus A_3 \\ &\quad \vdots \\ A_n &= A_{n-1} \oplus S_n \\ B_n &= B_{n-1} \oplus A_n \end{aligned}$$
where $x \oplus y = (x + y) \bmod 65521$
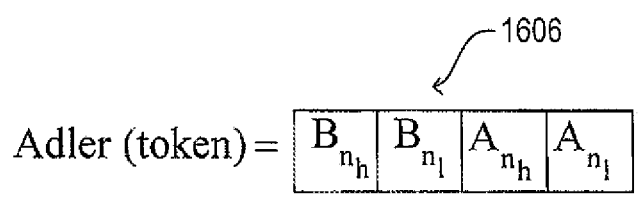
FIG. 16

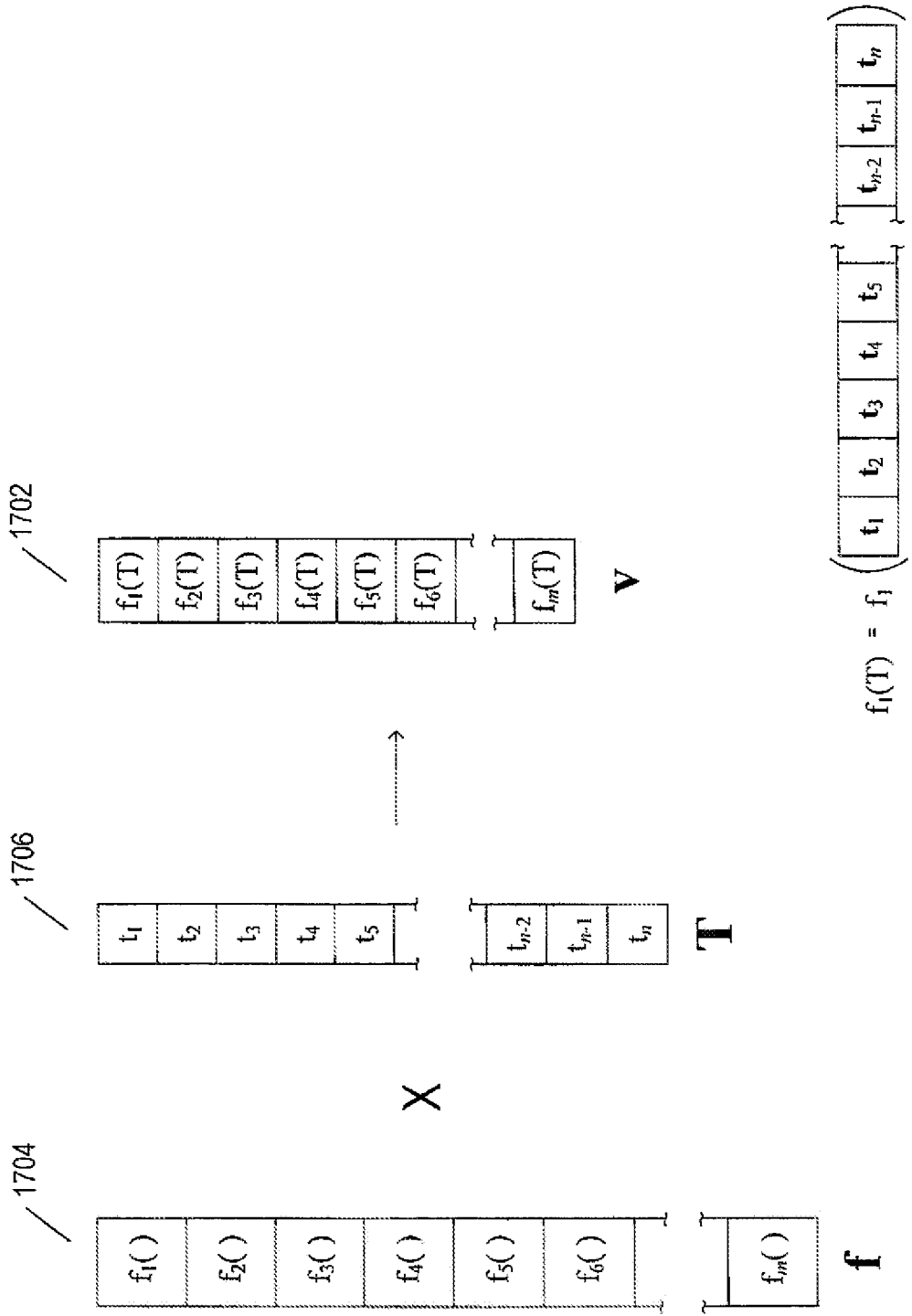

Figures 18A, 18B:
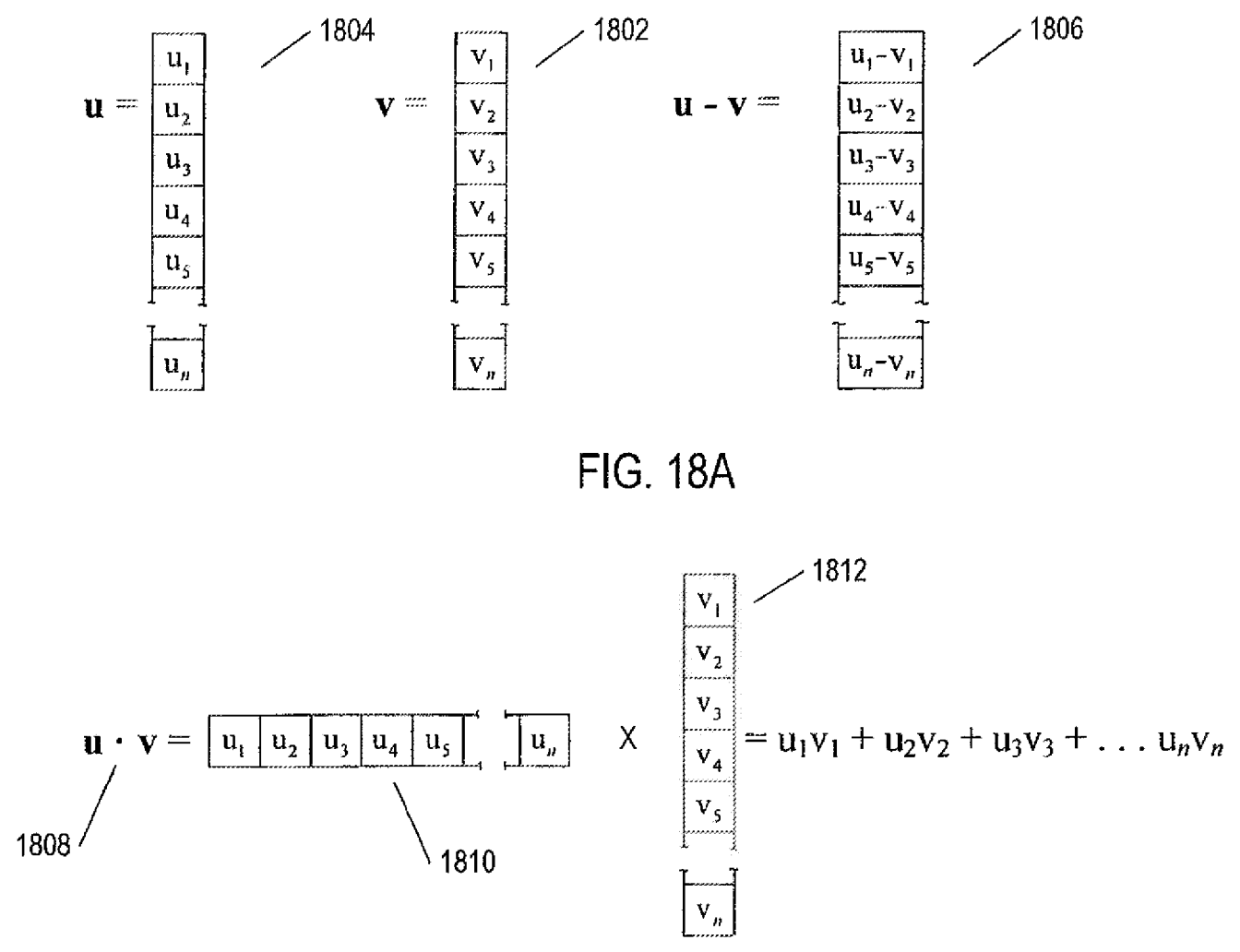

$$\mathbf{u} = \boxed{u_1 | u_2 | u_3 | u_4 | u_5} \cdots \boxed{u_n}$$

$$\mathbf{v} = \boxed{v_1 | v_2 | v_3 | v_4 | v_5} \cdots \boxed{v_n}$$

$$\mathbf{u} - \mathbf{v} = \boxed{u_1-v_1 | u_2-v_2 | u_3-v_3 | u_4-v_4 | u_5-v_5} \cdots \boxed{u_n-v_n}$$

FIG. 18A $$\mathbf{u} \cdot \mathbf{v} = \begin{bmatrix} u_1 \\ u_2 \\ u_3 \\ u_4 \\ u_5 \\ \vdots \\ u_n \end{bmatrix} \times \boxed{v_1 | v_2 | v_3 | v_4 | v_5} \cdots \boxed{v_n} = u_1v_1 + u_2v_2 + u_3v_3 + \ldots u_nv_n$$

FIG. 18B $$f_j(\mathbf{T}) \stackrel{\arg\max}{=} \left( \left[ P_i * \text{Adler}(t_j) \right] + Q_i \right) \mod 0\text{xffffffff}$$

1904 — $\mathbf{T} = $ (xServer, 36-A-102, NIC, transmission, failure)

1906 — $\begin{cases} h_1 = P_i * \text{Adler}("xServer") + Q_i \\ h_2 = P_i * \text{Adler}("36\text{-}A\text{-}102") + Q_i \\ h_3 = P_i * \text{Adler}("NIC") + Q_i \\ h_4 = P_i * \text{Adler}("transmission") + Q_i \\ h_5 = P_i * \text{Adler}("feature") + Q_i \end{cases}$ 1908 — $f_i(\mathbf{T}) = \stackrel{\arg\max}{j}(h_j)$

FIG 19

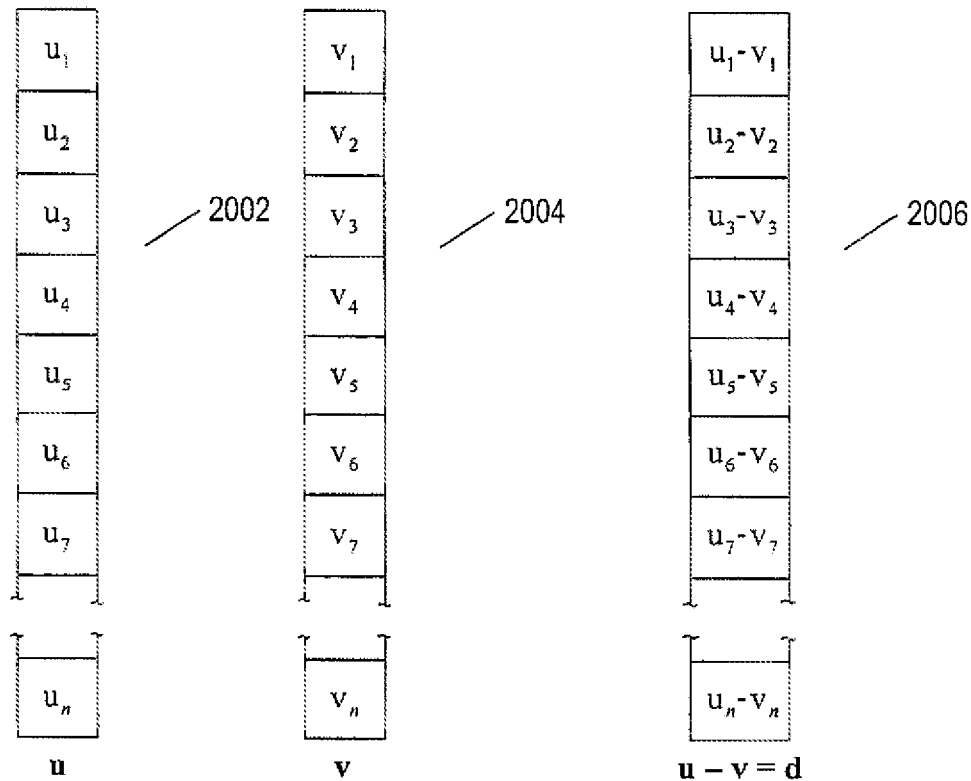
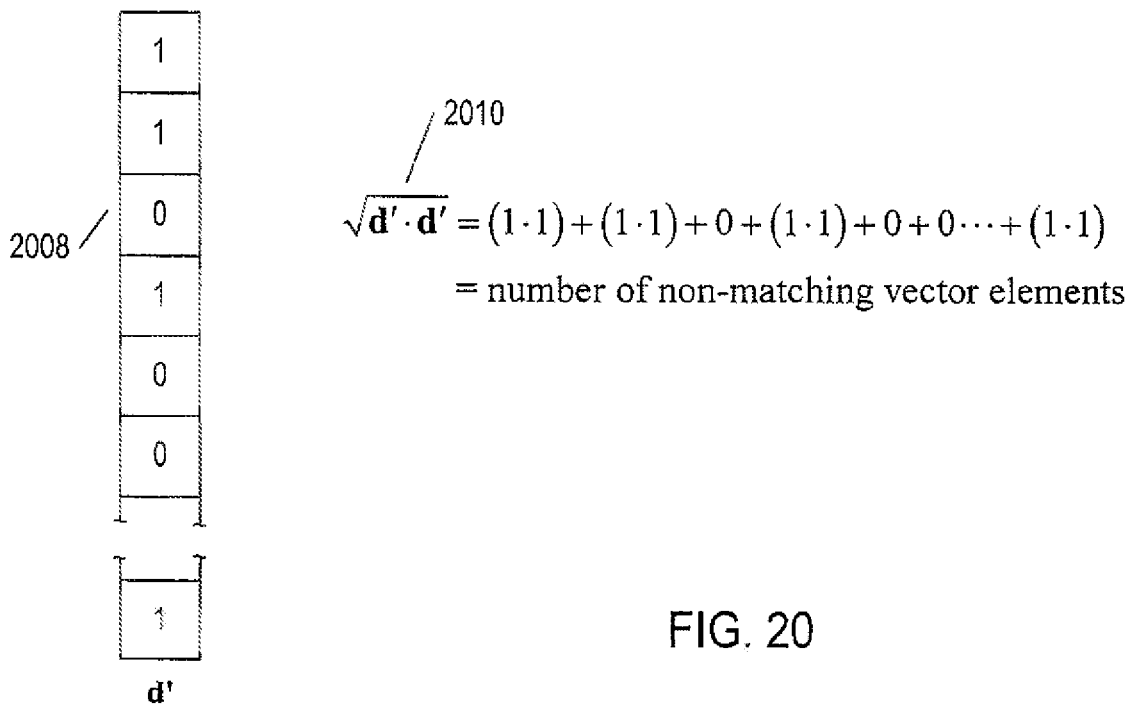
FIG. 20

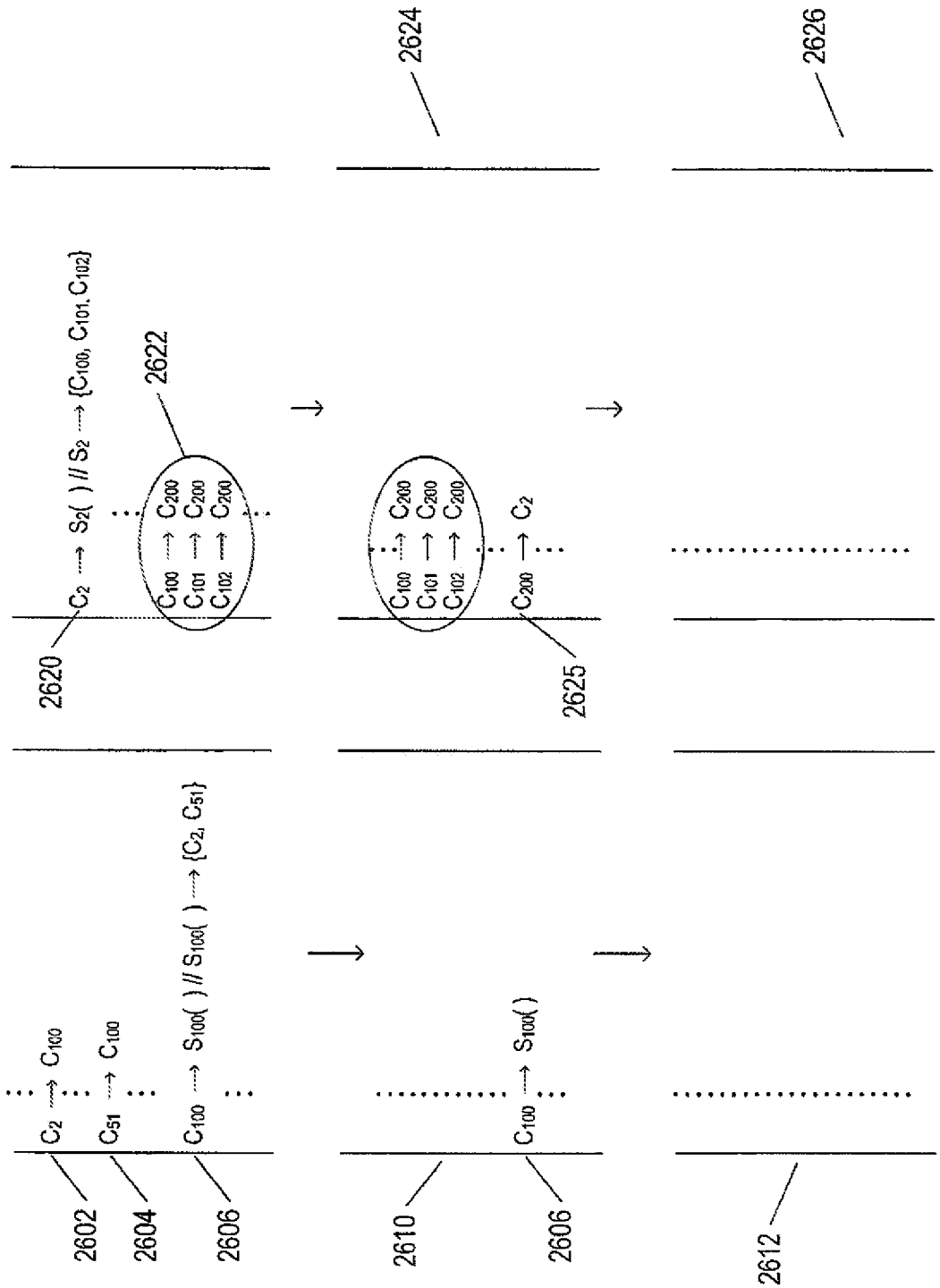

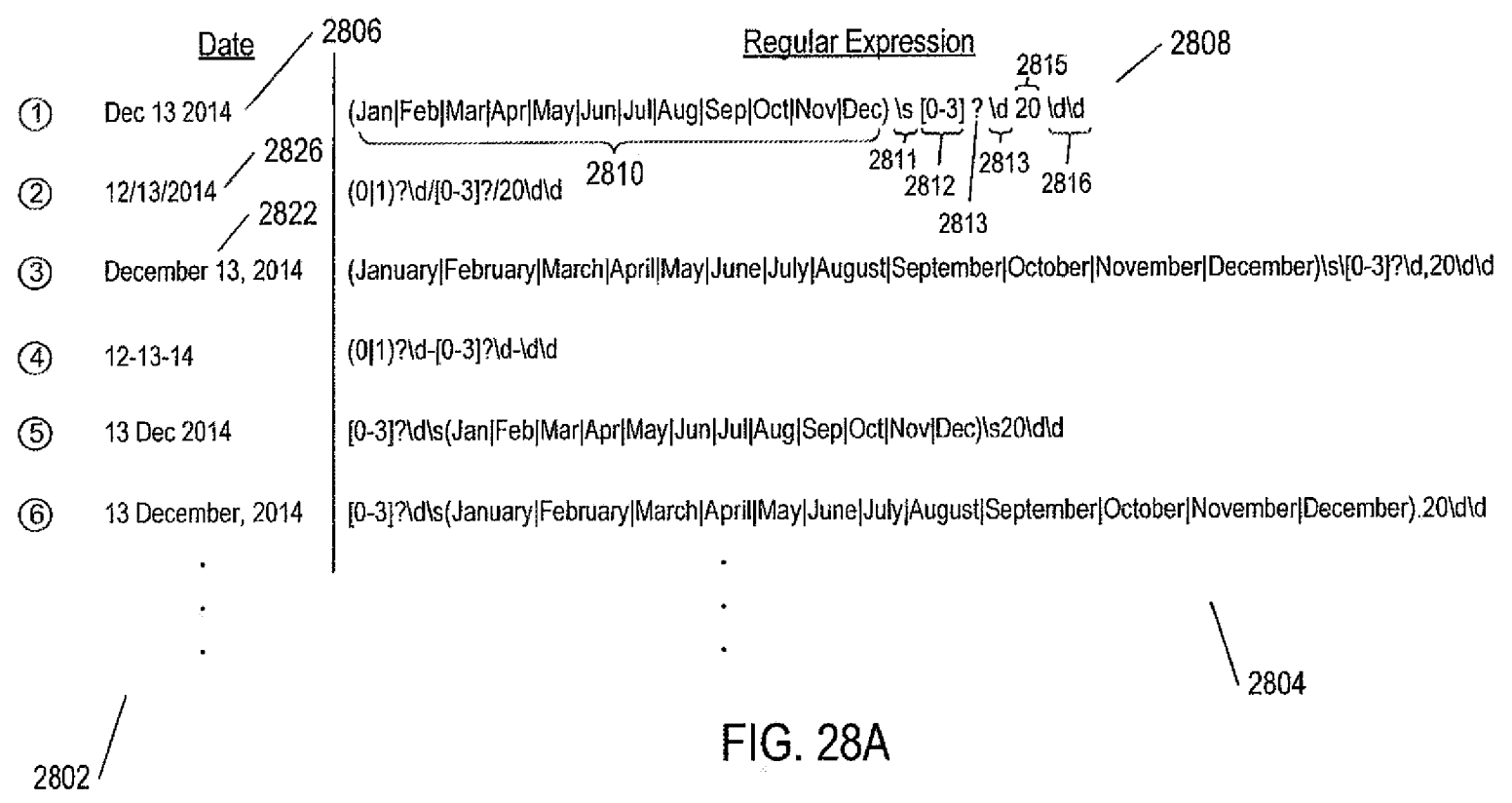

| Date | Regular Expression |
|---|---|
| ① Dec 13 2014 | (Jan\|Feb\|Mar\|Apr\|May\|Jun\|Jul\|Aug\|Sep\|Oct\|Nov\|Dec)\s[0-3]?\d 20\d\d |
| ② 12/13/2014 | (0\|1)?\d/[0-3]?/20\d\d |
| ③ December 13, 2014 | (January\|February\|March\|April\|May\|June\|July\|August\|September\|October\|November\|December)\s[0-3]?\d,20\d\d |
| ④ 12-13-14 | (0\|1)?\d-[0-3]?\d-\d\d |
| ⑤ 13 Dec 2014 | [0-3]?\d\s(Jan\|Feb\|Mar\|Apr\|May\|Jun\|Jul\|Aug\|Sep\|Oct\|Nov\|Dec)\s20\d\d |
| ⑥ 13 December, 2014 | [0-3]?\d\s(January\|February\|March\|April\|May\|June\|July\|August\|September\|October\|November\|December),20\d\d |

FIG. 28A

① and ③

(Jan|January|Feb|February|Mar|March|Apr|April|May|Jun|June|Jul|July|Aug|August|Sep|September|Oct|October|Nov|November|Dec|December) \s [0-3]? \d,? 20 \d\d
/ 2820

FIG. 28B

①, ②, and ③, (Jan|January|Feb|February|Mar|March|Apr|April|May|Jun|June|Jul|July|Aug|August|Sep|September|Oct|October|Nov|November|Dec|December)(0|1)?\d)(\s|/)[0-3]? (\s|/),? 20 \d\d
/ 2824

Regular Expression ———→ NFA ———→ DFA ———→ computer routine
/ 2832      / 2834   / 2836    / 2838
       2842      2846    2840 num find (RegularExpression $r$, string $s$, int* positions);
                         / 2844  / 2848

Example:
2850 /   $r$ = "\d\d\d";
    $s$ = [E|r|r|o|r|:| |1|6|/|7| |D|e|v|.|c|:| |F|a| |l|u|r|e|:| |N|I|C| |1|1|6|3|B| |.|4|A|6|7|.|8|F|A| |0]
            2858         ↑ 2859
    positions = [-1|-1|-1|-1|-1|-1|-1]  {[-1]
    num = find($r$, $s$, positions);
    num = 2 — 2854
    positions = [7|31|-1] — 2856

<br>(diagram with states i, 1, 2, 3, n and transitions d, p)<br>
2862
2864

$p$ = non-digit input character
$d$ = digit input character

```
3002 ── Error http://abc returned 501
3003 ── Error https://pqr returned 501
3004 ── Error http://abc returned 404
3005 ── Error https://pqr returned 404
``` event message = $f$(cluster_ID, feature_vector $v$, variable $v1$, variable $v2$, ...) ⎱ 3702
           = [id, $v$, $v1$, $v2$, ..., $v_n$] ⎯ 3706 significance (event message) ← $f$(
  significance (cluster_ID id),
  significance (feature_vector $v$),
  significance (variable $v1$),
  significance (variable $v2$),         } 3708
    ·
    ·
  significance (variable $vn$),
  significance (cluster_id, id, feature_vector $v$),
  significance (cluster_id Id, variable $v1$),
3706 {    ·
    ·
  significance (cluster_id, $d$, variable vn),
  3710 { significance (feature_vector $v$, variable $v1$),
  significance (feature_vector $v$, variable $v2$),
    ·
    ·
  significance (variable $vn$-1, variable $vn$),
    ·
    ·
  ) significance (cluster_ID id, feature_vector $v$, variable $v1$, ..., variable $vn$)

FIG. 37

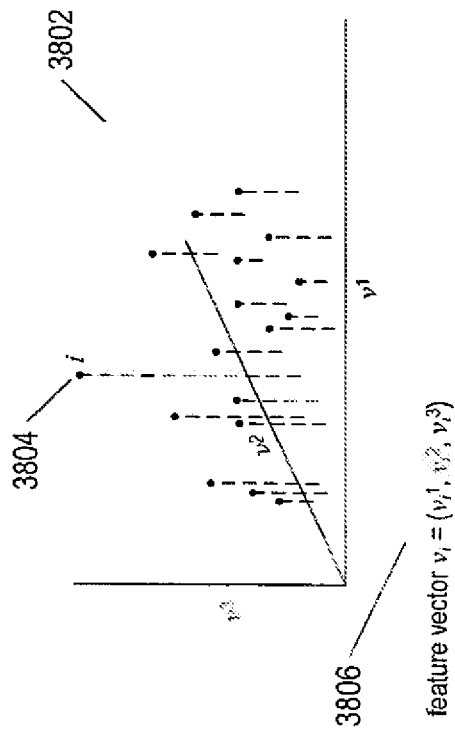

feature vector $v_i = (v_i^1, v_i^2, v_i^3)$

FIG. 38A

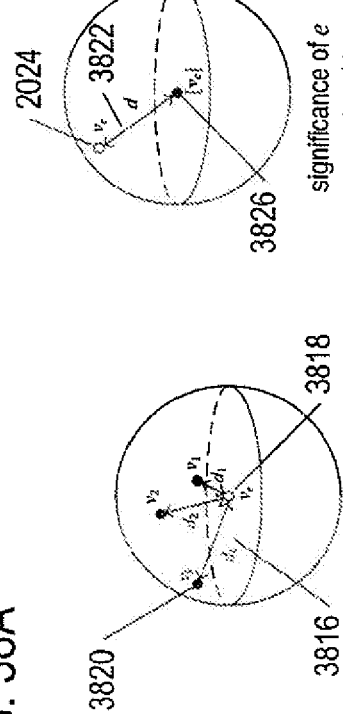

significance of $e$ proportional to distance $(v_m, v_e)$

FIG. 38D

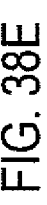

significance of $e$ proportional to distance $([v_{c,i}], v_e)$ where $[v_{c,i}]$ is centroid of $v_i$ in cluster $i$ containing $e$

FIG. 38E significance event message $e$ proportional to distance $(v_c, v_e) = d$ where $v_c$ = feature vector of cluster contains $c$; and $v_e$ = feature vector of $e$

FIG. 38B significance of $e$ proportional to: $\dfrac{\text{average density of } v_i}{\text{density of } v_i \text{ in neighborhood of } v_e}$

FIG. 38C

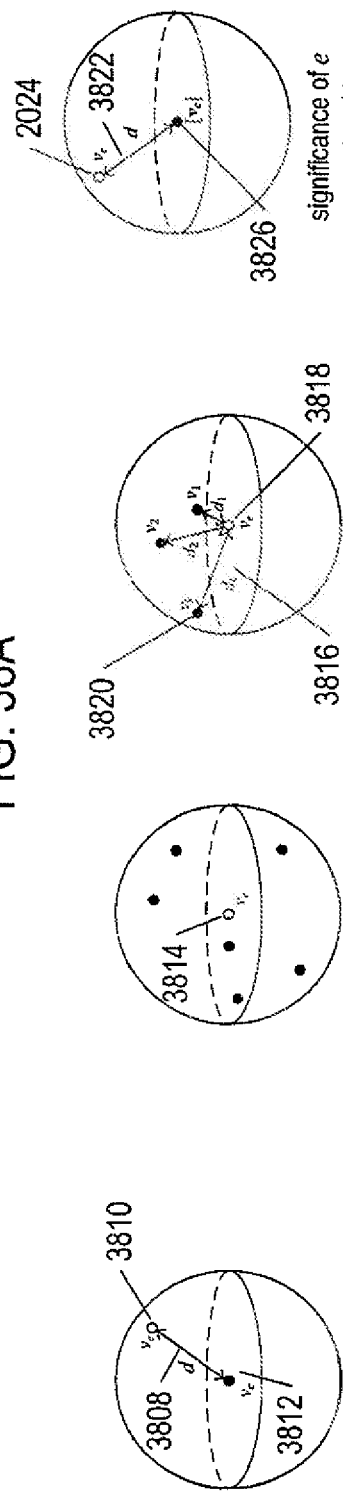

```
                              ╱4502      ╱4504
                             ╱          ╱
        CREATE PROCEDURE Get Annotations (@etype  VARCHAR(20))
        AS
        BEGIN
           CREATE TABLE RESULTS                ⎫
              (Type          VARCHAR(20),      ⎪
               Source_Type   VARCHAR(20),      ⎪
               Source        VARCHAR(100),     ⎬4506
               Description   VARCHAR(100),     ⎪
               Rank          INTEGER)          ⎭
           INSERT
           INTO RESULTS (Type, Source_Type, Source, Description, Rank)
         ⎧ SELECT IT.Type, ST.Source, AI.Source, AI.Description, A.Rank
         ⎪ FROM    Information_Type IT, Source_Type ST, Associated_Information AI, Events E, Associations A
         ⎪ WHERE E.Event.Type = @ etype
   4508 ⎨ AND    A.E_ID = E.E_ID
         ⎪ AND    A.A_ID = AI.A_ID
         ⎪ AND    IT.T_ID = AI.T_ID
         ⎪ AND    ST.S_ID = AI.S_ID
         ⎩ ORDER BY Rank  DESC

END
```

FIG. 45

METHOD AND SYSTEM FOR CLUSTERING EVENT MESSAGES AND MANAGE EVENT-MESSAGE CLUSTERS

CROSS-REFERENCE TO RELATED APPLICATIONS

This application is a continuation of application Ser. No. 15/251,481, filed Aug. 30, 2016, which is a continuation-in-part of U.S. Pat. No. 10,205,627, issued Feb. 12, 2019.

TECHNICAL FIELD

The current document is directed to event logging and event-log interpretation in complex computing systems and, in particular, to methods and systems that process event messages in order to classify each event message as belonging to a particular event-message type, use event-message-type information for interpreting the contents of event logs and for compactly storing event logs, and provide automated annotation of displayed event logs with information obtained from various different information sources related to the event types associated with the event logs.

BACKGROUND

During the past seven decades, electronic computing has evolved from primitive, vacuum-tube-based computer systems . . . initially developed during the 1940s, to modern electronic computing systems in which large numbers of multi-processor servers, work stations, and other individual computing systems are networked together with large-capacity data-storage devices and other electronic devices to produce geographically distributed computing systems with hundreds of thousands, millions, or more components that provide enormous computational bandwidths and data-storage capacities. These large, distributed computing systems are made possible by advances in computer networking, distributed operating systems and applications, data-storage appliances, computer hardware, and software technologies. Despite all of these advances, however, the rapid increase in the size and complexity of computing systems has been accompanied by numerous scaling issues and technical challenges, including technical challenges associated with communications overheads encountered in parallelizing computational tasks among multiple processors, component failures, and distributed-system management. As new distributed-computing technologies are developed and as general hardware and software technologies continue to advance, the current trend towards ever-larger and more complex distributed computing systems appears likely to continue well into the future.

In modern computing systems, individual computers, subsystems, and components generally output large volumes of status, informational, and error messages that are collectively referred to . . . in the current document, as "event messages." In large, distributed computing systems, terabytes of event messages may be generated each day. The event messages are often collected into event logs stored as files in data-storage appliances and are often analyzed both in real time, as they are generated and received, as well as retrospectively . . . after the event messages have been initially processed and stored in event logs. Event messages may contain information that can be used to detect serious failures and operational deficiencies prior to the accumulation of a sufficient number of failures and system-degrading events that lead to data loss and significant down time. The information contained in event messages may also be used to detect and ameliorate various types of security breaches and issues, to intelligently manage and maintain distributed computing systems, and to diagnose many different classes of operational problems, hardware-design deficiencies, and software-design deficiencies.

It has proved to be a challenging task for system administrators, system designers and developers, and system users to identify information within the enormous event logs generated in distributed computing systems relevant to detecting and diagnosing operational anomalies and useful in administering, managing, and maintaining distributed computer systems. System administrators, maintenance personnel . . . and other users of event messages continue to seek new automated methods and subsystems to facilitate using event logs to detect and diagnose operational anomalies and to administer . . . manage, and maintain distributed computer systems.

SUMMARY

The current document is directed to methods and systems that process . . . classify . . . efficiently store, and display large volumes of event messages generated in modern computing systems. In a disclosed implementation, received event messages are assigned to event-message clusters based on non-parameter tokens identified within the event messages. A parsing function is generated for each cluster that is used to extract data from incoming event messages and to prepare event records from event messages that more efficiently and accessible store event information. The parsing functions also provide an alternative basis for assignment of event messages to clusters. Event types associated with the clusters are used for gathering information from various information sources with which to automatically annotate event messages displayed to system administrators, maintenance personnel, and other users of event messages.

BRIEF DESCRIPTION OF THE DRAWINGS

In FIG. 9, three different physical data centers 902-904 are shown below planes representing the cloud-director layer of abstraction 906-908.

FIG. 12 shows a small, 11-entry portion of a log file from a distributed computer system.

FIGS. 15-20 illustrate one implementation of the logic used by an event-message-clustering system to compute a metric for a received event message that allows the event message to be assigned to a particular existing cluster.

FIGS. 26A-C illustrate examples of editing of the redirection-rule table.

FIG. 28A illustrates regular expressions corresponding to various types of formats in which dates may be encoded in event messages.

FIG. 28B illustrates construction of generalized regular expressions that identify two or more types of date formats.

FIG. 28C illustrates an example of the use of regular expressions in text processing.

FIG. 28D shows a representation of the deterministic finite automata 2860 corresponding to the regular expression 2850 in the example shown in FIG. 28C.

FIG. 37 illustrates computation of the significance of an event message.

FIGS. 38A-E illustrate various distance-based and density-based methods for estimating the significance of an event message based on the feature vector computed for the event message.

FIG. 45 provides a structured query language ("SQL") routine that gathers additional-information entities related to a particular event type from the relational-database table shown in FIG. 44 and inserts them into a Results table for use by a display routine for displaying additional information related to event types . . . as discussed below.

DETAILED DESCRIPTION

Figure 1:
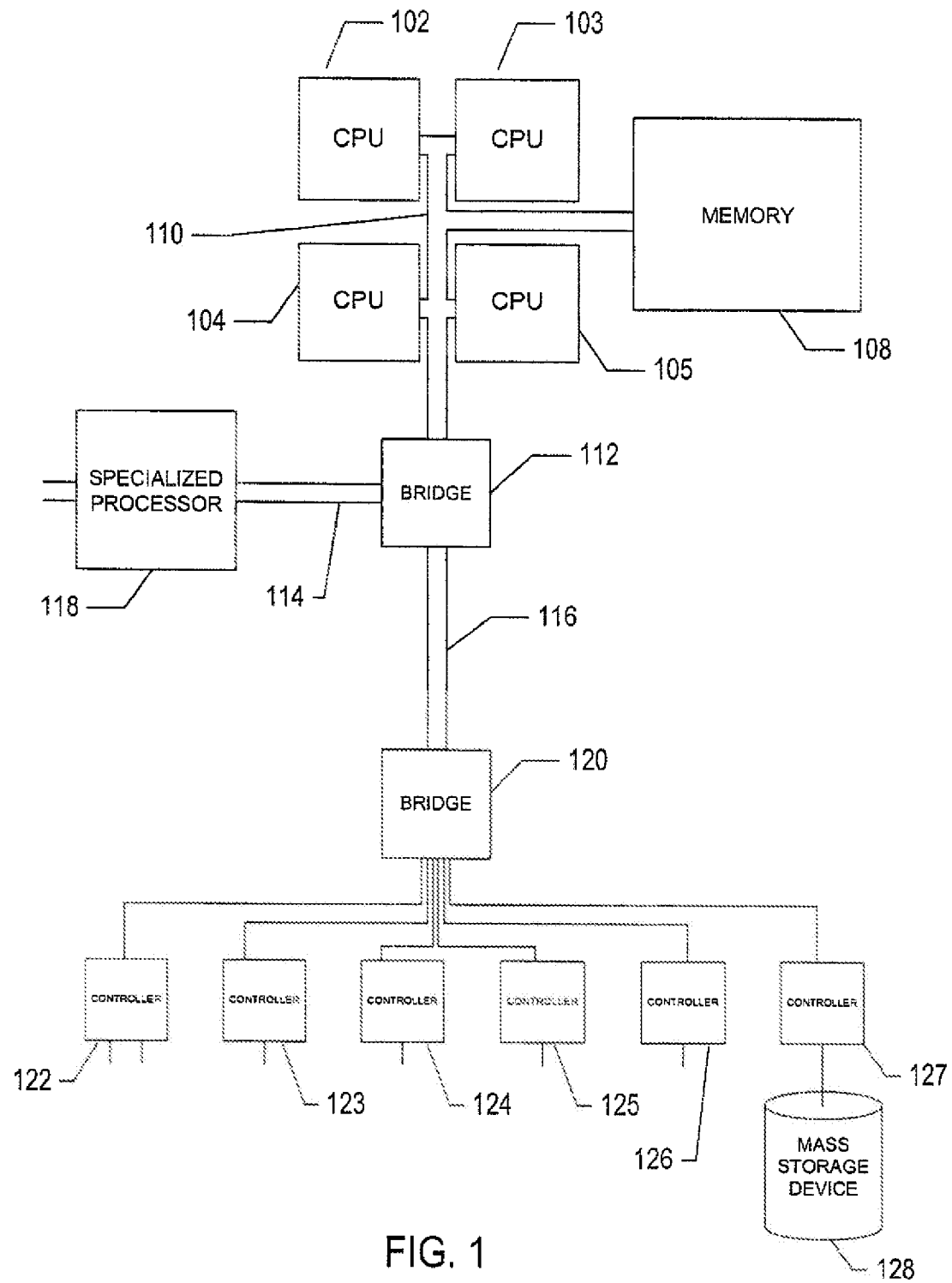
FIG. 1 provides a general architectural diagram for various types of computers.

The current document is directed to methods and systems for processing . . . classifying, efficiently storing, and displaying event messages. In a first subsection, below, a detailed description of computer hardware, complex computational systems, and virtualization is provided with reference to FIGS. 1-10. In a second subsection, implementations of the currently disclosed methods and systems that process, classify, and efficiently store event messages are discussed with reference to FIGS. 11-27G. In a third subsection, generation of parsing functions for event-message clusters is discussed with reference to FIGS. 28A-41D. In a final subsection, the automated displayed event-message annotation methods and subsystems to which the current document is particularly directed are discussed with reference to FIGS. 42A-48

Computer Hardware, Complex Computational Systems, and Virtualization

The term "abstraction" is not, in any way, intended to mean or suggest an abstract idea or concept. Computational abstractions are tangible, physical interfaces that are implemented . . . ultimately, using physical computer hardware, data-storage devices, and communications systems. Instead, the term "abstraction" refers, in the current discussion, to a logical level of functionality encapsulated within one or more concrete, tangible, physically-implemented computer systems with defined interfaces through which electronically-encoded data is exchanged, process execution launched, and electronic services are provided. Interfaces may include graphical and textual data displayed on physical display devices as well as computer programs and routines that control physical computer processors to carry out various tasks and operations and that are invoked through electronically implemented application programming interfaces ("APIs") and other electronically implemented interfaces. There is a tendency among those unfamiliar with modern technology and science to misinterpret the terms "abstract" and "abstraction," when used to describe certain aspects of modern computing. For example, one frequently encounters assertions that, because a computational system is described in terms of abstractions, functional layers, and interfaces, the computational system is somehow different from a physical machine or device. Such allegations are unfounded. One only needs to disconnect a computer system or group of computer systems from their respective power supplies to appreciate the physical, machine nature of complex computer technologies. One also frequently encounters statements that characterize a computational technology as being "only software," and thus not a machine or device. Software is essentially a sequence of encoded symbols, such as a printout of a computer program or digitally encoded computer instructions sequentially stored in a file on an optical disk or within an electromechanical mass-storage device. Software alone can do nothing. It is only when encoded computer instructions are loaded into an electronic memory within a computer system and executed on a physical processor that so-called "software implemented" functionality is provided. The digitally encoded computer instructions are an essential and physical control component of processor-controlled machines and de % ices, no less essential and physical than a cam-shaft control system in an internal-combustion engine. Multi-cloud aggregations, cloud-computing services, virtual-machine containers and virtual machines . . . communications interfaces, and many of the other topics discussed below are tangible, physical components of physical . . . electro-optical-mechanical computer systems.

FIG. 1 provides a general architectural diagram for various types of computers. Computers that receive, process, and store event messages may be described by the general architectural diagram shown in FIG. 1, for example. The computer system contains one or multiple central processing units ("CPUs") 102-105, one or more electronic memories 108 interconnected with the CPUs by a CPU/memory-subsystem bus 110 or multiple busses . . . a first bridge 112 that interconnects the CPU/memory-subsystem bus 110 with additional busses 114 and 116, or other types of high-speed interconnection media, including multiple, high-speed serial interconnects. These busses or serial interconnections, in turn, connect the CPUs and memory with specialized processors, such as a graphics processor 118, and with one or more additional bridges 120 . . . which are interconnected with high-speed serial links or with multiple controllers 122-127, such as controller 127, that provide access to various different types of mass-storage devices 128, electronic displays, input devices, and other such components, subcomponents, and computational resources. It should be noted that computer-readable data-storage devices include optical and electromagnetic disks, electronic memories, and other physical data-storage devices. Those familiar with modern science and technology appreciate that electromagnetic radiation and propagating signals do not store data for subsequent retrieval, and can transiently "store" only a byte or less of information per mile, far less information than needed to encode even the simplest of routines.

Of course, there are many different types of computer-system architectures that differ from one another in the number of different memories, including different types of hierarchical cache memories, the number of processors and the connectivity of the processors with other system components, the number of internal communications busses and serial links, and in many other ways. However, computer systems generally execute stored programs by fetching instructions from memory and executing the instructions in one or more processors. Computer systems include general-purpose computer systems, such as personal computers ("PCs"), various types of servers and workstations, and higher-end mainframe computers, but may also include a plethora of various types of special-purpose computing devices, including data-storage systems, communications routers, network nodes, tablet computers, and mobile telephones.

Figure 2:
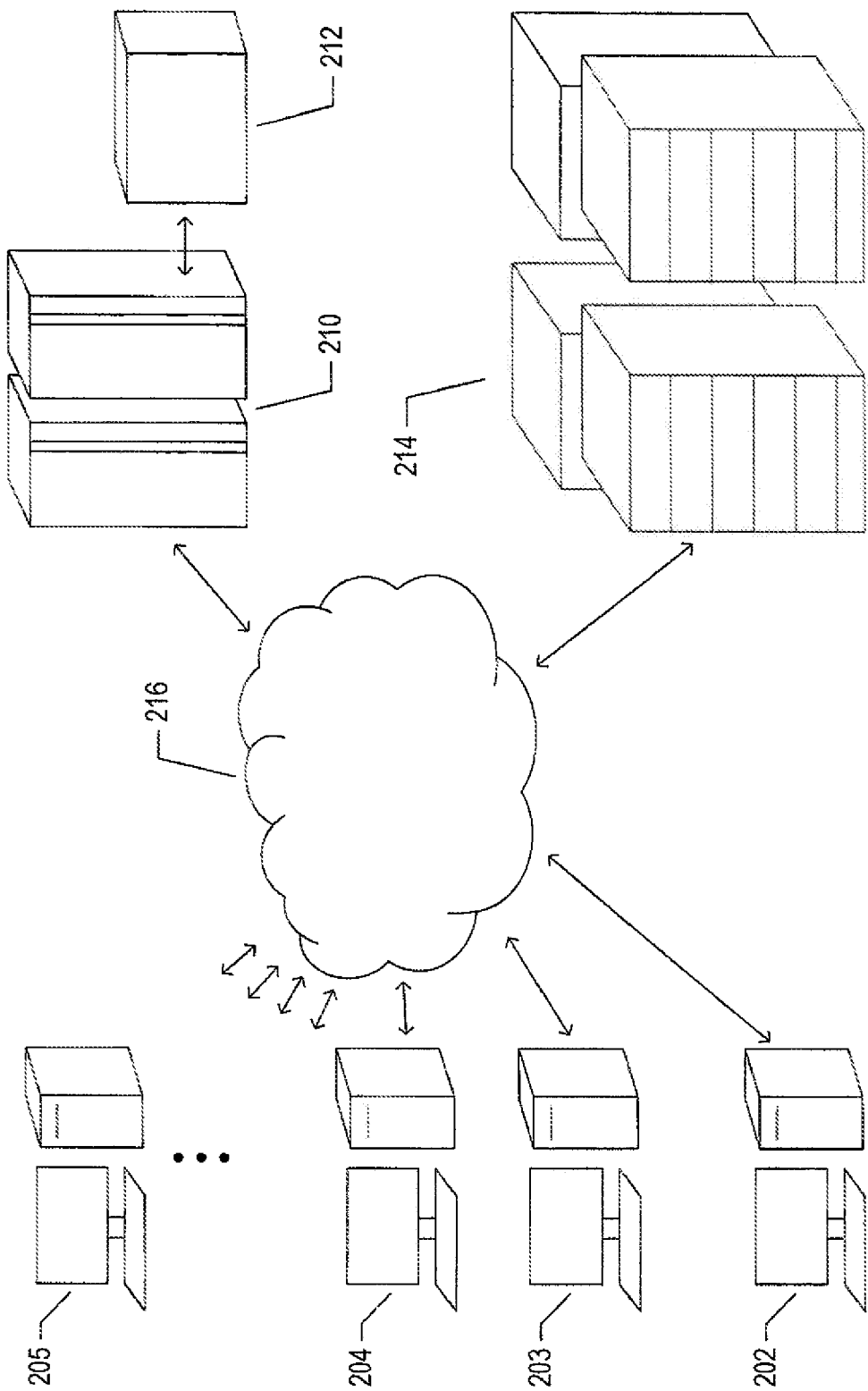
FIG. 2 illustrates an Internet-connected distributed computer system.

FIG. 2 illustrates an Internet-connected distributed computer system. As communications and networking technologies have evolved in capability and accessibility, and as the computational bandwidths, data-storage capacities, and other capabilities and capacities of various types of computer systems have steadily and rapidly increased, much of modern computing now generally involves large distributed systems and computers interconnected by local networks, wide-area networks, wireless communications, and the Internet. FIG. 2 shows a typical distributed system in which a large number of PCs 202-205, a high-end distributed mainframe system 210 with a large data-storage system 212, and a large computer center 214 with large numbers of rack-mounted servers or blade servers all interconnected through various communications and networking systems that together comprise the Internet 216. Such distributed computing systems provide diverse arrays of functionalities. For example, a PC user sitting in a home office may access hundreds of millions of different web sites provided by hundreds of thousands of different web servers throughout the world and may access high-computational-bandwidth computing services from remote computer facilities for running complex computational tasks.

Until recently, computational services were generally provided by computer systems and data centers purchased, configured, managed, and maintained by service-provider organizations. For example, an e-commerce retailer generally purchased, configured, managed, and maintained a data center including numerous web servers, back-end computer systems, and data-storage systems for serving web pages to remote customers, receiving orders through the web-page interface, processing the orders, tracking completed orders, and other myriad different tasks associated with an e-commerce enterprise.

Figure 3:
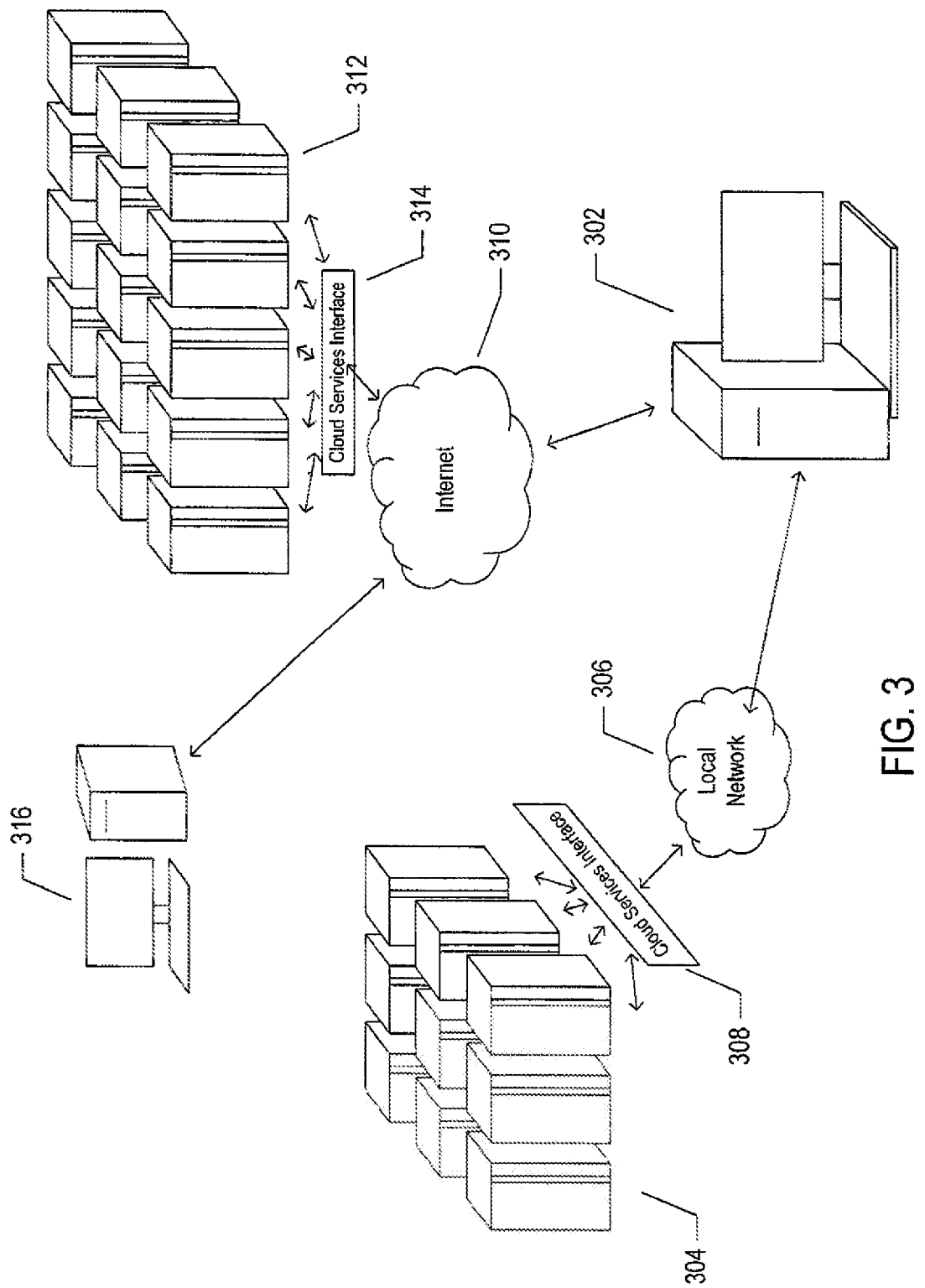
FIG. 3 illustrates cloud computing. In the recently developed cloud-computing paradigm, computing cycles and data-storage facilities are provided to organizations and individuals by cloud-computing providers.

FIG. 3 illustrates cloud computing. In the recently developed cloud-computing paradigm, computing cycles and data-storage facilities are provided to organizations and individuals by cloud-computing providers. In addition, larger organizations may elect to establish private cloud-computing facilities in addition to, or instead of, subscribing to computing services provided by public cloud-computing service providers. In FIG. 3, a system administrator for an organization, using a PC 302, accesses the organization's private cloud 304 through a local network 306 and private-cloud interface 308 and also accesses, through the Internet 310, a public cloud 312 through a public-cloud services interface 314. The administrator can, in either the case of the private cloud 304 or public cloud 312, configure virtual computer systems and even entire virtual data centers and launch execution of application programs on the virtual computer systems and virtual data centers in order to carry out any of many different types of computational tasks. As one example, a small organization may configure and run a virtual data center within a public cloud that executes web servers to provide an e-commerce interface through the public cloud to remote customers of the organization, such as a user viewing the organization's e-commerce web pages on a remote user system 316.

Cloud-computing facilities are intended to provide computational bandwidth and data-storage services much as utility companies provide electrical power and water to consumers. Cloud computing provides enormous advantages to small organizations without the resources to purchase, manage, and maintain in-house data centers. Such organizations can dynamically add and delete virtual computer systems from their virtual data centers within public clouds in order to track computational-bandwidth and data-storage needs, rather than purchasing sufficient computer systems within a physical data center to handle peak computational-bandwidth and data-storage demands. Moreover, small organizations can completely avoid the overhead of maintaining and managing physical computer systems, including hiring and periodically retraining information-technology specialists and continuously paying for operating-system and database-management-system upgrades. Furthermore, cloud-computing interfaces allow for easy and straightforward configuration of virtual computing facilities, flexibility in the types of applications and operating systems that can be configured, and other functionalities that are useful even for owners and administrators of private cloud-computing facilities used by a single organization.

Figure 4:
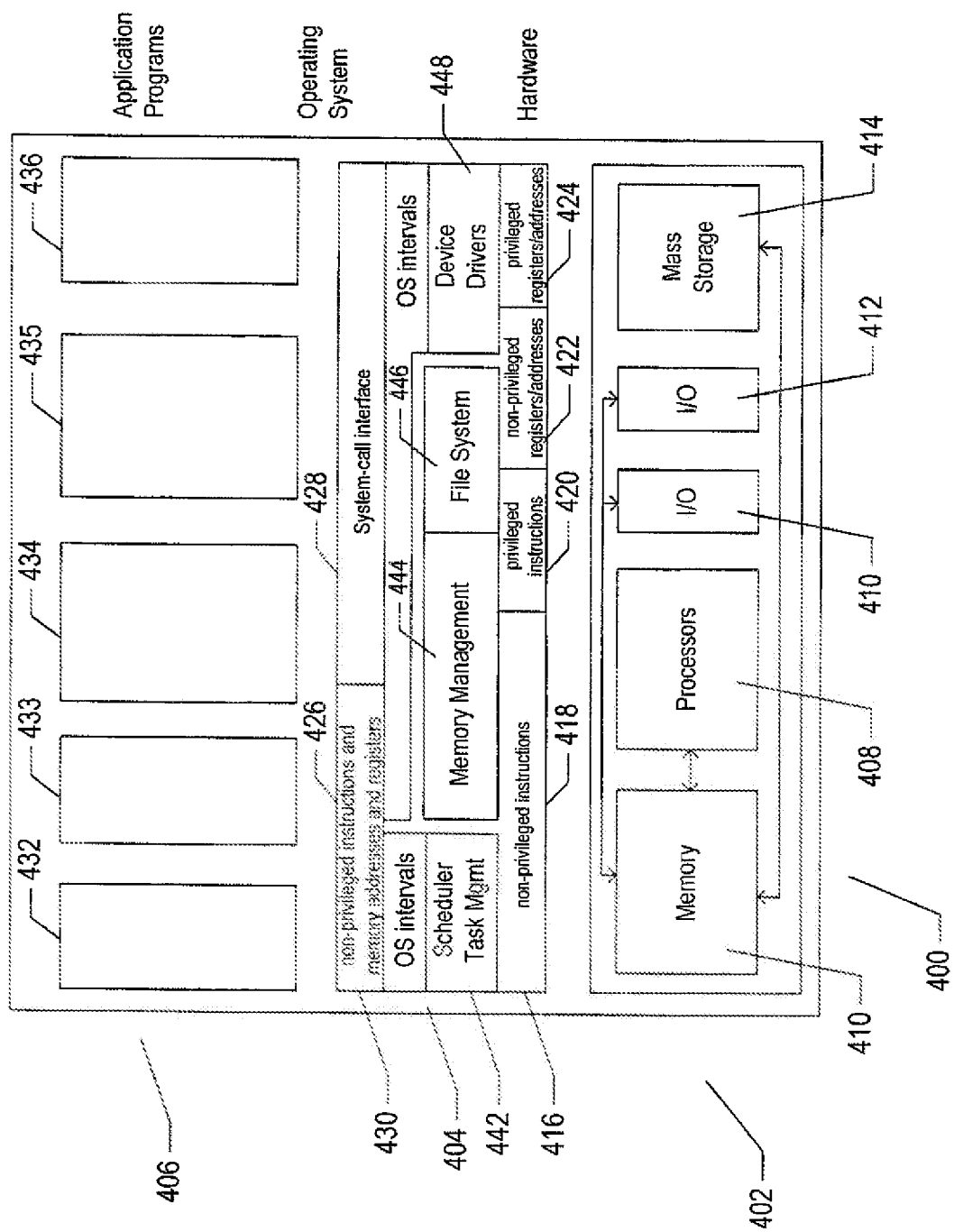
FIG. 4 illustrates generalized hardware and software components of a general-purpose computer system, such as a general-purpose computer system having an architecture similar to that shown in FIG. 1.

FIG. 4 illustrates generalized hardware and software components of a general-purpose computer system, such as a general-purpose computer system having an architecture similar to that shown in FIG. 1. The computer system 400 is often considered to include three fundamental layers: (1) a hardware layer or level 402; (2) an operating-system layer or level 404; and (3) an application-program layer or level 406. The hardware layer 402 includes one or more processors 408, system memory 410, various different types of input-output ("I/O") devices 410 and 412, and mass-storage devices 414. Of course, the hardware level also includes many other components, including power supplies, internal communications links and busses, specialized integrated circuits, many different types of processor-controlled or microprocessor-controlled peripheral devices and controllers, and many other components. The operating system 404 interfaces to the hardware level 402 through a low-level operating system and hardware interface 416 generally comprising a set of non-privileged computer instructions 418, a set of privileged computer instructions 420, a set of non-privileged registers and memory addresses 422, and a set of privileged registers and memory addresses 424. In general, the operating system exposes non-privileged instructions, non-privileged registers, and non-privileged memory addresses 426 and a system-call interface 428 as an operating-system interface 430 to application programs 432-436 that execute within an execution environment provided to the application programs by the operating system. The operating system, alone, accesses the privileged instructions, privileged registers, and privileged memory addresses. By reserving access to privileged instructions, privileged registers, and privileged memory addresses, the operating system can ensure that application programs and other higher-level computational entities cannot interfere with one another's execution and cannot change the overall state of the computer system in ways that could deleteriously impact system operation. The operating system includes many internal components and modules, including a scheduler 442, memory management 444, a file system 446, device drivers 448, and many other components and modules. To a certain degree, modern operating systems provide numerous levels of abstraction above the hardware level, including virtual memory, which provides to each application program and other computational entities a separate, large, linear memory-address space that is mapped by the operating system to various electronic memories and mass-storage devices. The scheduler orchestrates interleaved execution of various different application programs and higher-level computational entities, providing to each application program a virtual, stand-alone system devoted entirely to the application program. From the application program's standpoint, the application program executes continuously without concern for the need to share processor resources and other system resources with other application programs and higher-level computational entities. The device drivers abstract details of hardware-component operation, allowing application programs to employ the system-call interface for transmitting and receiving data to and from communications networks, mass-storage devices, and other I/O devices and subsystems. The file system 436 facilitates abstraction of mass-storage-device and memory resources as a high-level, easy-to-access, file-system interface. Thus, the development and evolution of the operating system has resulted in the generation of a type of multi-faceted virtual execution environment for application programs and other higher-level computational entities.

While the execution environments provided by operating systems have proved to be an enormously successful level of abstraction within computer systems, the operating-system-provided level of abstraction is nonetheless associated with difficulties and challenges for developers and users of application programs and other higher-level computational entities. One difficulty arises from the fact that there are many different operating systems that run within various different types of computer hardware. In many cases, popular application programs and computational systems are developed to run on only a subset of the available operating systems, and can therefore be executed within only a subset of the various different types of computer systems on which the operating systems are designed to run. Often, even when an application program or other computational system is ported to additional operating systems, the application program or other computational system can nonetheless run more efficiently on the operating systems for which the application program or other computational system was originally targeted. Another difficulty arises from the increasingly distributed nature of computer systems. Although distributed operating systems are the subject of considerable research and development efforts, many of the popular operating systems are designed primarily for execution on a single computer system. In many cases, it is difficult to move application programs, in real time, between the different computer systems of a distributed computer system for high-availability, fault-tolerance, and load-balancing purposes. The problems are even greater in heterogeneous distributed computer systems which include different types of hardware and devices running different types of operating systems. Operating systems continue to evolve, as a result of which certain older application programs and other computational entities may be incompatible with more recent versions of operating systems for which they are targeted, creating compatibility issues that are particularly difficult to manage in large distributed systems.

Figure 5A:
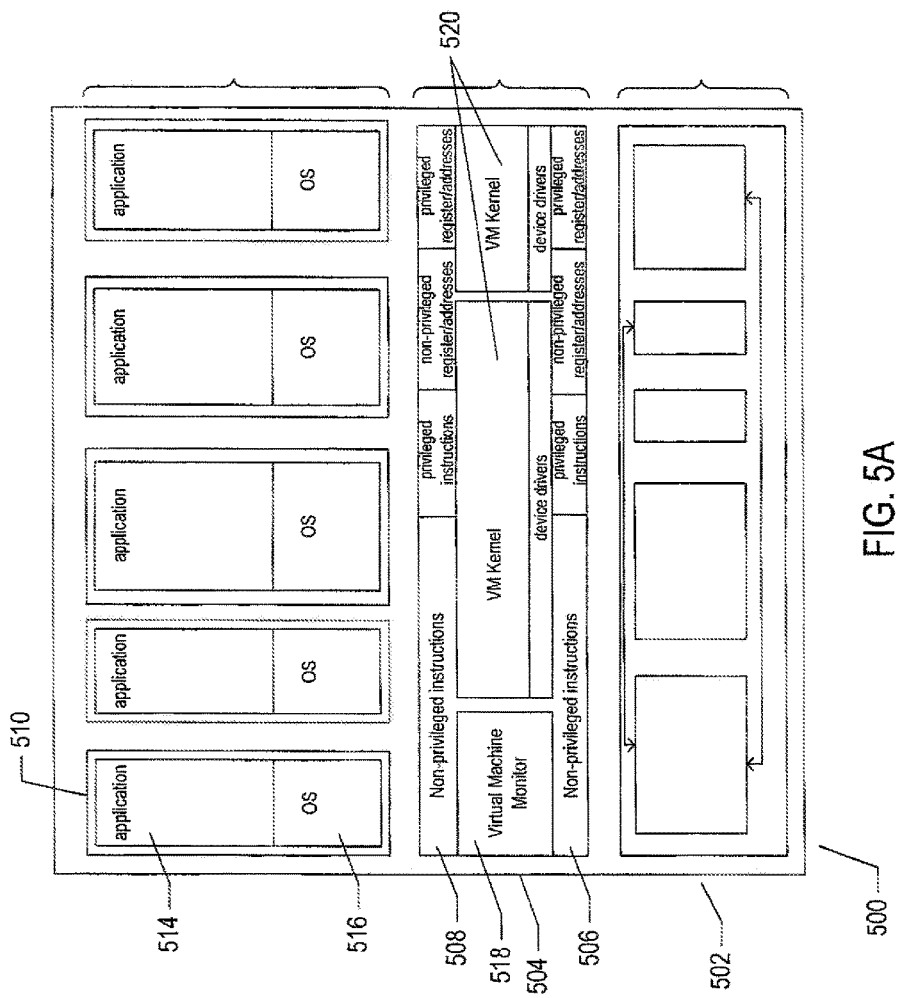
FIGS. 5A-B illustrate two types of virtual machine and virtual-machine execution environments.
Figure 5B:
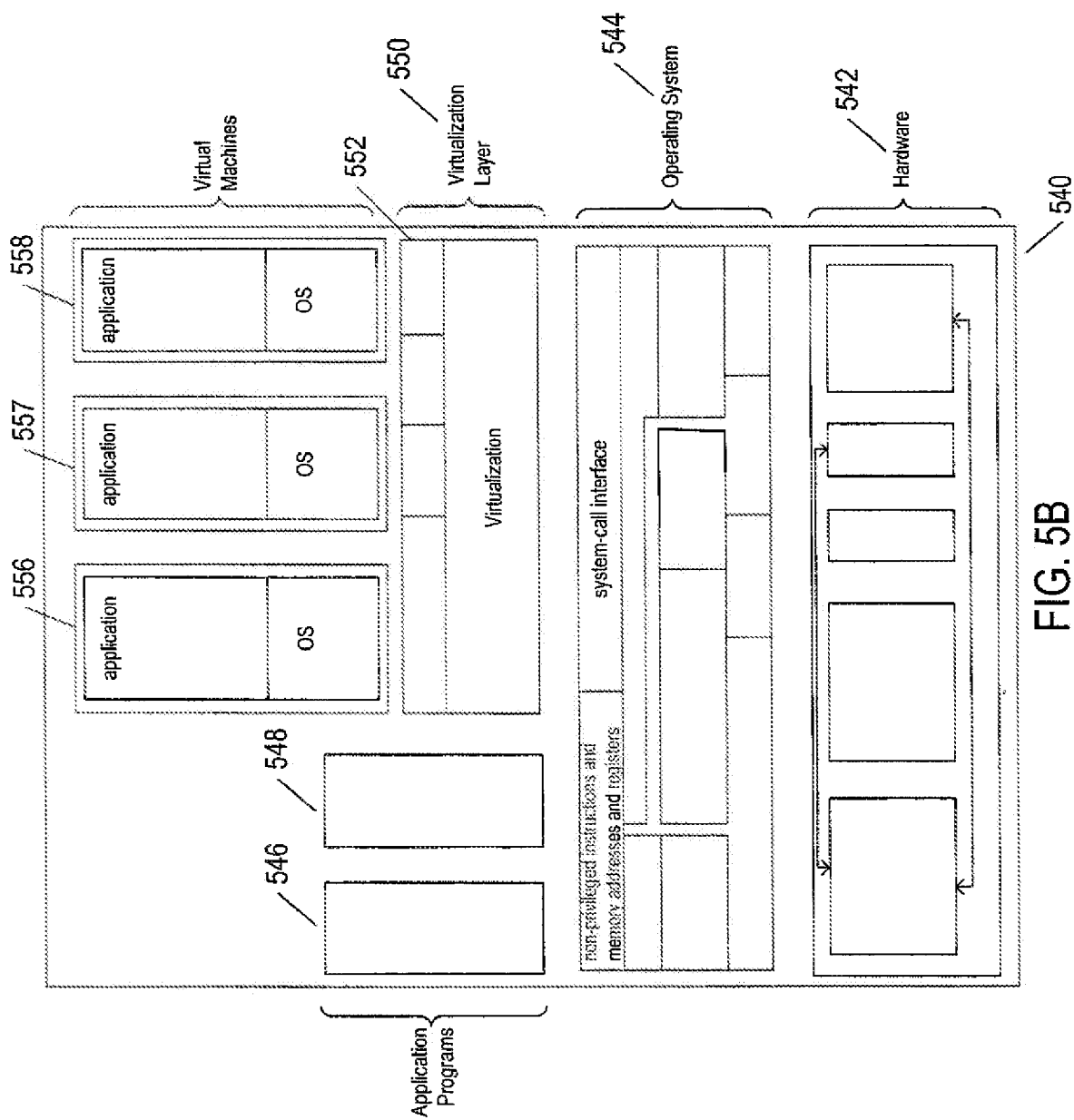

For all of these reasons, a higher level of abstraction, referred to as the "virtual machine," has been developed and evolved to further abstract computer hardware in order to address many difficulties and challenges associated with traditional computing systems, including the compatibility issues discussed above. FIGS. 5A-B illustrate two types of virtual machine and virtual-machine execution environments. FIGS. 5A-B use the same illustration conventions as used in FIG. 4. Figure 5A shows a first type of virtualization. The computer system 500 in FIG. 5A includes the same hardware layer 502 as the hardware layer 402 shown in FIG. 4. However, rather than providing an operating system layer directly above the hardware layer, as in FIG. 4, the virtualized computing environment illustrated in FIG. 5A features a virtualization layer 504 that interfaces through a virtualization-layer/hardware-layer interface 506, equivalent to interface 416 in FIG. 4, to the hardware. The virtualization layer provides a hardware-like interface 508 to a number of virtual machines, such as virtual machine 510, executing above the virtualization layer in a virtual-machine layer 512. Each virtual machine includes one or more application programs or other higher-level computational entities packaged together with an operating system, referred to as a "guest operating system," such as application 514 and guest operating system 516 packaged together within virtual machine 510. Each virtual machine is thus equivalent to the operating-system layer 404 and application-program layer 406 in the general-purpose computer system shown in FIG. 4. Each guest operating system within a virtual machine interfaces to the virtualization-layer interface 508 rather than to the actual hardware interface 506. The virtualization layer partitions hardware resources into abstract virtual-hardware layers to which each guest operating system within a virtual machine interfaces. The guest operating systems within the virtual machines, in general, are unaware of the virtualization layer and operate as if they were directly accessing a true hardware interface. The virtualization layer ensures that each of the virtual machines currently executing within the virtual environment receive a fair allocation of underlying hardware resources and that all virtual machines receive sufficient resources to progress in execution. The virtualization-layer interface 508 may differ for different guest operating systems. For example, the virtualization layer is generally able to provide virtual hardware interfaces for a variety of different types of computer hardware. This allows, as one example, a virtual machine that includes a guest operating system designed for a particular computer architecture to run on hardware of a different architecture. The number of virtual machines need not be equal to the number of physical processors or even a multiple of the number of processors.

The virtualization layer includes a virtual-machine-monitor module 518 ("VMM") that virtualizes physical processors in the hardware layer to create virtual processors on which each of the virtual machines executes. For execution efficiency, the virtualization layer attempts to allow virtual machines to directly execute non-privileged instructions and to directly access non-privileged registers and memory. However, when the guest operating system within a virtual machine accesses virtual privileged instructions, virtual privileged registers, and virtual privileged memory through the virtualization-layer interface 508, the accesses result in execution of virtualization-layer code to simulate or emulate the privileged resources. The virtualization layer additionally includes a kernel module 520 that manages memory, communications, and data-storage machine resources on behalf of executing virtual machines ("VM kernel"). The VM kernel, for example, maintains shadow page tables on each virtual machine so that hardware-level virtual-memory facilities can be used to process memory accesses. The VM kernel additionally includes routines that implement virtual communications and data-storage devices as well as device drivers that directly control the operation of underlying hardware communications and data-storage devices. Similarly, the VM kernel virtualizes various other types of I/O devices, including keyboards, optical-disk drives, and other such devices. The virtualization layer essentially schedules execution of virtual machines much like an operating system schedules execution of application programs, so that the virtual machines each execute within a complete and fully functional virtual hardware layer.

FIG. 5B illustrates a second type of virtualization. In FIG. 5B, the computer system 540 includes the same hardware layer 542 and software layer 544 as the hardware layer 402 shown in FIG. 4. Several application programs 546 and 548 are shown running in the execution environment provided by the operating system. In addition, a virtualization layer 550 is also provided, in computer 540, but, unlike the virtualization layer 504 discussed with reference to FIG. 5A, virtualization layer 550 is layered above the operating system 544, referred to as the "host OS," and uses the operating system interface to access operating-system-provided functionality as well as the hardware. The virtualization layer 550 comprises primarily a VMM and a hardware-like interface 552, similar to hardware-like interface 508 in FIG. 5A. The virtualization-layer/hardware-layer interface 552, equivalent to interface 416 in FIG. 4, provides an execution environment for a number of virtual machines 556-558, each including one or more application programs or other higher-level computational entities packaged together with a guest operating system.

In FIGS. 5A-B, the layers are somewhat simplified for clarity of illustration. For example, portions of the virtualization layer 550 may reside within the host-operating-system kernel, such as a specialized driver incorporated into the host operating system to facilitate hardware access by the virtualization layer.

It should be noted that virtual hardware layers, virtualization layers, and guest operating systems are all physical entities that are implemented by computer instructions stored in physical data-storage devices, including electronic memories, mass-storage devices, optical disks, magnetic disks, and other such devices. The term "virtual" does not, in any way, imply that virtual hardware layers, virtualization layers, and guest operating systems are abstract or intangible. Virtual hardware layers, virtualization layers, and guest operating systems execute on physical processors of physical computer systems and control operation of the physical computer systems, including operations that alter the physical states of physical devices, including electronic memories and mass-storage devices. They are as physical and tangible as any other component of a computer since, such as power supplies, controllers, processors, busses, and data-storage devices.

Figure 6:
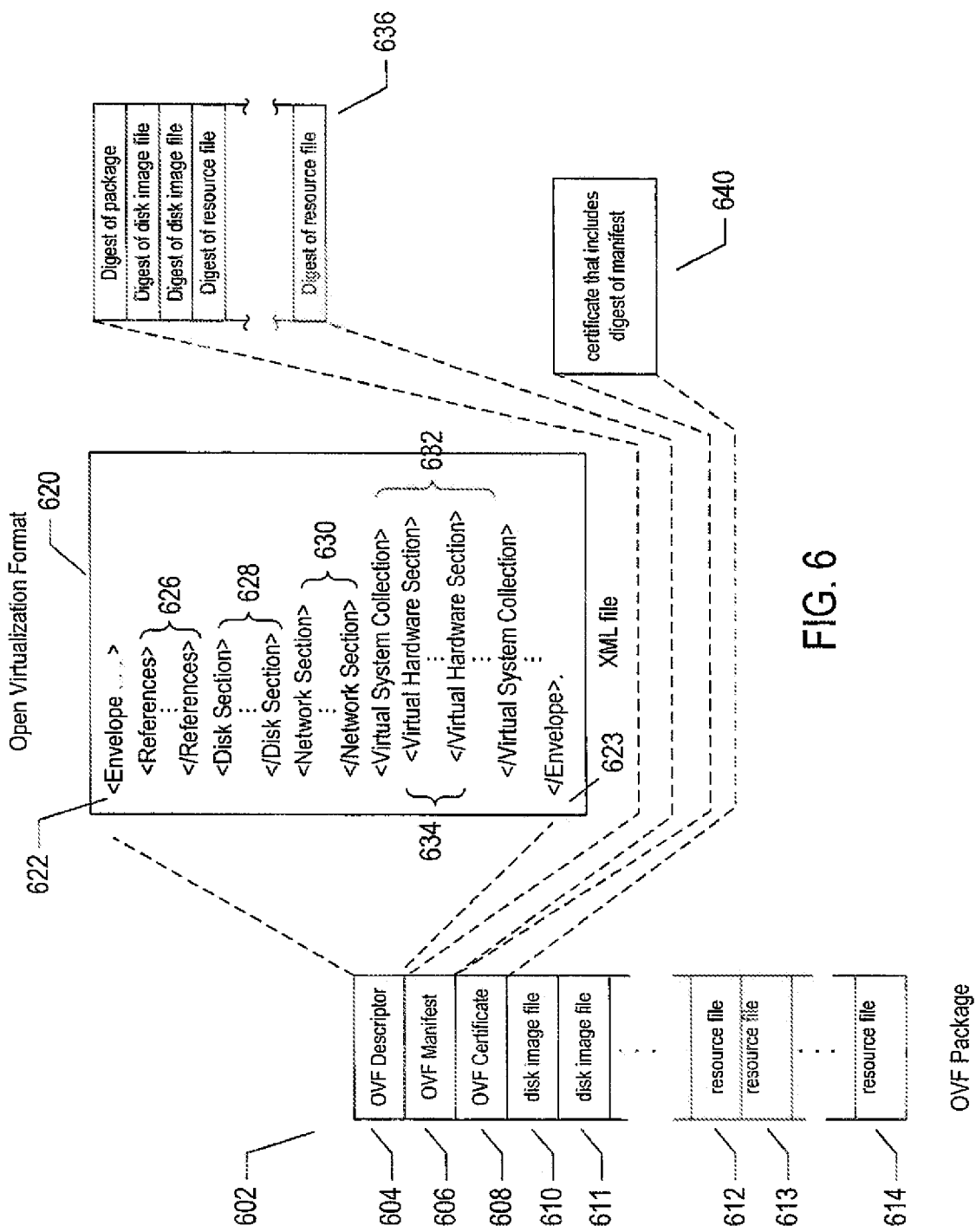
FIG. 6 illustrates an OVF package.

A virtual machine or virtual application, described below, is encapsulated within a data package for transmission, distribution, and loading into a virtual-execution environment. One public standard for virtual-machine encapsulation is referred to as the "open virtualization format" ("OVF"). The OVF standard specifies a format for digitally encoding a virtual machine within one or more data files. FIG. 6 illustrates an OVF package. An OVF package 602 includes an OVF descriptor 604, an OVF manifest 606, an OVF certificate 608, one or more disk-image files 610-611, and one or more resource files 612-614. The OVF package can be encoded and stored as a single file or as a set of files. The OVF descriptor 604 is an XML document 620 that includes a hierarchical set of elements, each demarcated by a beginning tag and an ending tag. The outermost, or highest-level, element is the envelope element, demarcated by tags 622 and 623. The next-level element includes a reference element 626 that includes references to all files that are part of the OVF package, a disk section 628 that contains meta information about all of the virtual disks included in the OVF package, a networks section 630 that includes meta information about all of the logical networks included in the OVF package, and a collection of virtual-machine configurations 632 which further includes hardware descriptions of each virtual machine 634. There are many additional hierarchical levels and elements within a typical OVF descriptor. The OVF descriptor is thus a self-describing, XML file that describes the contents of an OVF package. The OVF manifest 606 is a list of cryptographic-hash-function-generated digests 636 of the entire OVF package and of the various components of the OVF package. The OVF certificate 608 is an authentication certificate 640 that includes a digest of the manifest and that is cryptographically signed. Disk image files, such as disk image file 610, are digital encodings of the contents of virtual disks and resource files 612 are digitally encoded content, such as operating-system images. A virtual machine or a collection of virtual machines encapsulated together within a virtual application can thus be digitally encoded as one or more files within an OVF package that can be transmitted, distributed, and loaded using well-known tools for transmitting, distributing, and loading files. A virtual appliance is a software service that is delivered as a complete software stack installed within one or more virtual machines that is encoded within an OVF package.

Figure 7:
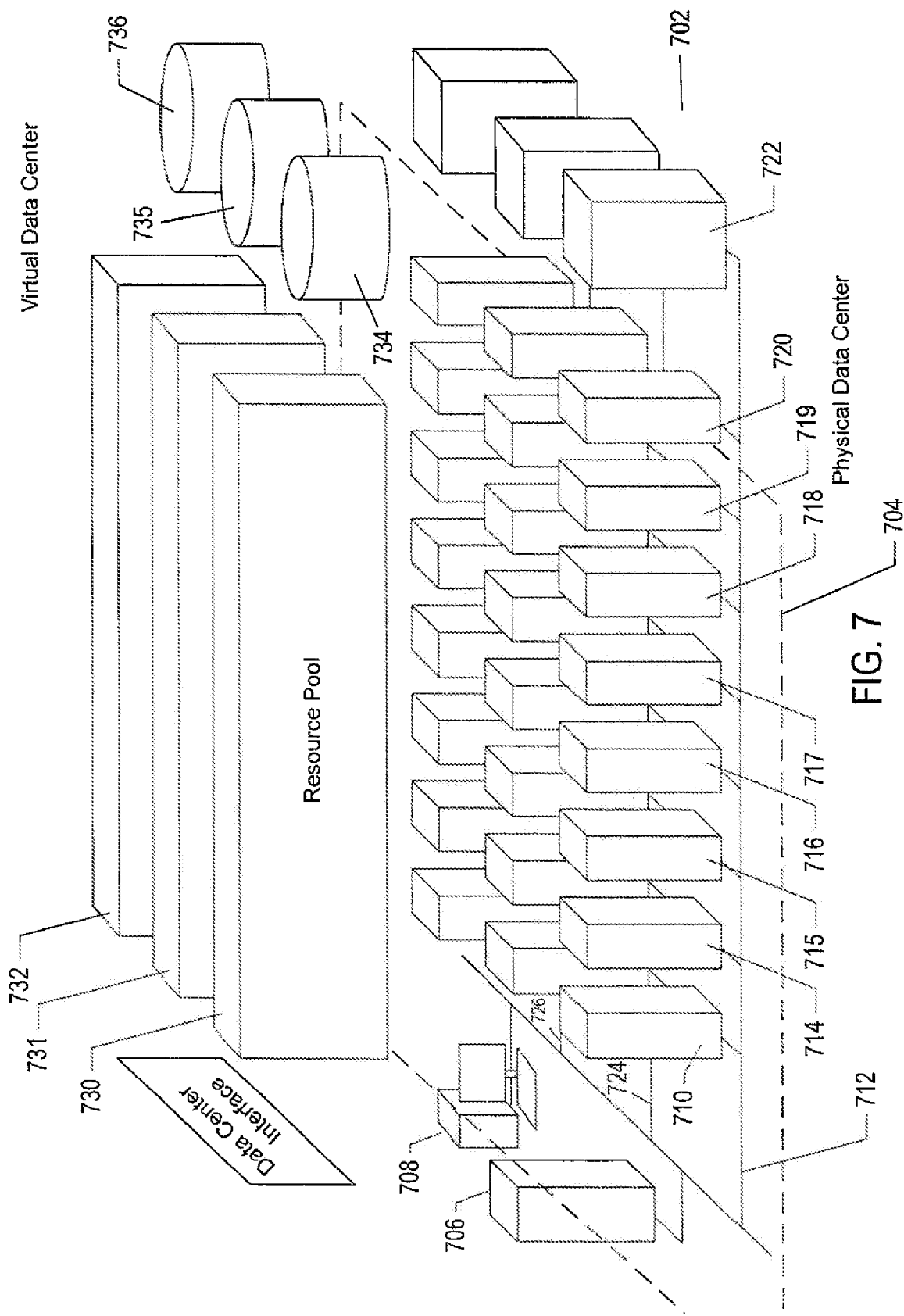
FIG. 7 illustrates virtual data centers provided as an abstraction of underlying physical-data-center hardware components.

The advent of virtual machines and virtual environments has alleviated many of the difficulties and challenges associated with traditional general-purpose computing. Machine and operating-system dependencies can be significantly reduced or entirely eliminated by packaging applications and operating systems together as virtual machines and virtual appliances that execute within virtual environments provided by virtualization layers running on many different types of computer hardware. A next level of abstraction, referred to as virtual data centers or virtual infrastructure, provide a data-center interface to virtual data centers computationally constructed within physical data centers. FIG. 7 illustrates virtual data centers provided as an abstraction of underlying physical-data-center hardware components. In FIG. 7, a physical data center 702 is shown below a virtual-interface plane 704. The physical data center consists of a virtual-data-center management server 706 and any of various different computers, such as PCs 708, on which a virtual-data-center management interface may be displayed to system administrators and other users. The physical data center additionally includes generally large numbers of server computers, such as server computer 710, that are coupled together by local area networks, such as local area network 712 that directly interconnects server computer 710 and 714-720 and a mass-storage array 722. The physical data center shown in FIG. 7 includes three local area networks 712, 724, and 726 that each directly interconnects a bank of eight servers and a mass-storage array. The individual server computers, such as server computer 710, each includes a virtualization layer and runs multiple virtual machines. Different physical data centers may include many different types of computers, networks, data-storage systems and devices connected according to many different types of connection topologies. The virtual-data-center abstraction layer 704, a logical abstraction layer shown by a plane in FIG. 7, abstracts the physical data center to a virtual data center comprising one or more resource pools, such as resource pools 730-732, one or more virtual data stores, such as virtual data stores 734-736, and one or more virtual networks. In certain implementations, the resource pools abstract banks of physical servers directly interconnected by a local area network.

Figure 8:
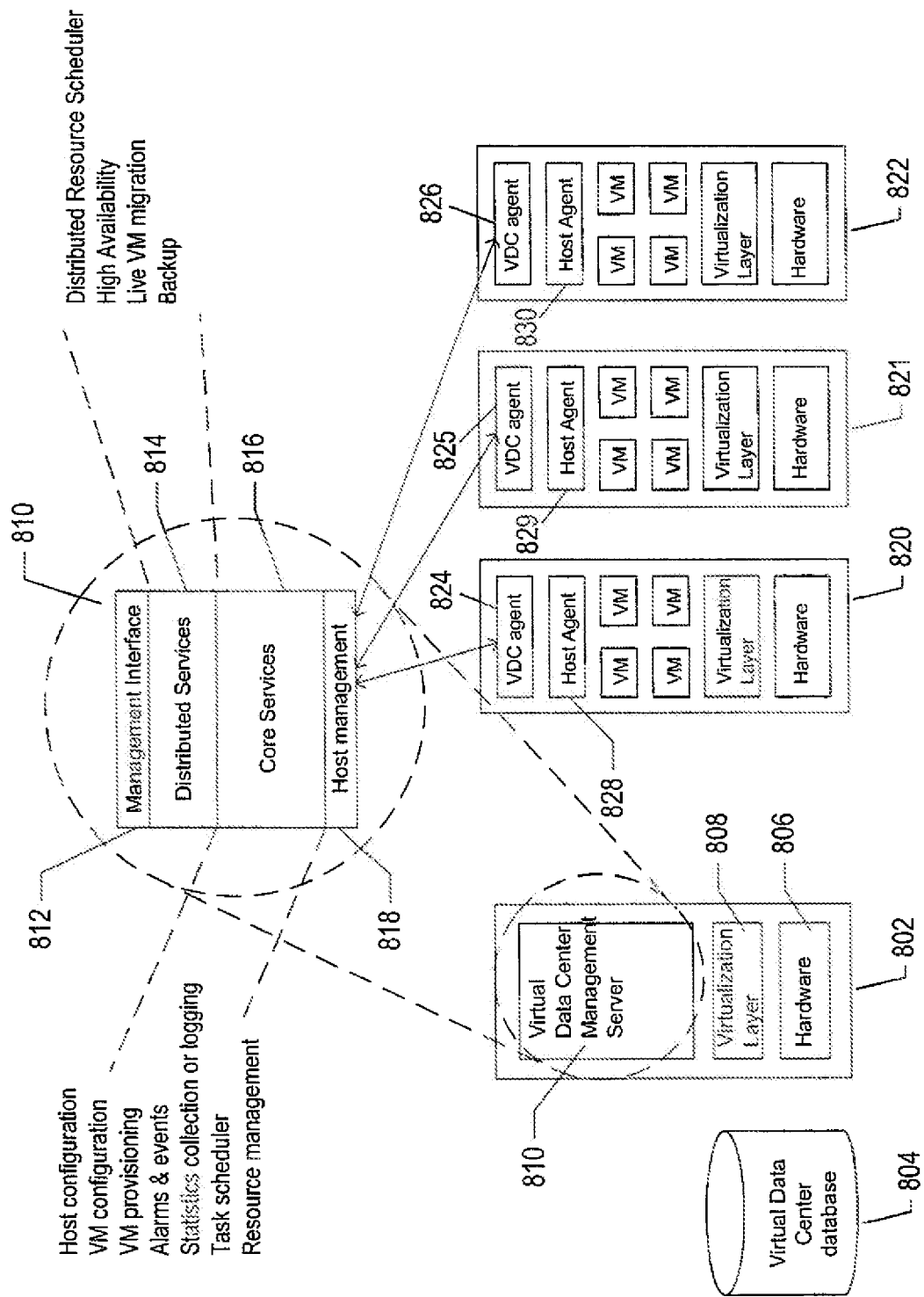
FIG. 8 illustrates virtual-machine components of a virtual-data-center management server and physical servers of a physical data center above which a virtual-data-center interface is provided by the virtual-data-center management server.

The virtual-data-center management interface allows provisioning and launching of virtual machines with respect to resource pools, virtual data stores, and virtual networks, so that virtual-data-center administrators need not be concerned with the identities of physical-data-center components used to execute particular virtual machines. Furthermore, the virtual-data-center management server includes functionality to migrate running virtual machines from one physical server to another in order to optimally or near optimally manage resource allocation, provide fault tolerance, and high availability by migrating virtual machines to most effectively utilize underlying physical hardware resources, to replace virtual machines disabled by physical hardware problems and failures, and to ensure that multiple virtual machines supporting a high-availability virtual appliance are executing on multiple physical computer systems so that the services provided by the virtual appliance are continuously accessible, even when one of the multiple virtual appliances becomes compute bound, data-access bound, suspends execution, or fails. Thus, the virtual data center layer of abstraction provides a virtual-data-center abstraction of physical data centers to simplify provisioning, launching, and maintenance of virtual machines and virtual appliances as well as to provide high-level, distributed functionalities that involve pooling the resources of individual physical servers and migrating virtual machines among physical servers to achieve load balancing, fault tolerance, and high availability. FIG. 8 illustrates virtual-machine components of a virtual-data-center management server and physical servers of a physical data center above which a virtual-data-center interface is provided by the virtual-data-center management server. The virtual-data-center management server 802 and a virtual-data-center database 804 comprise the physical components of the management component of the virtual data center. The virtual-data-center management server 802 includes a hardware layer 806 and virtualization layer 808, and runs a virtual-data-center management-server virtual machine 810 above the virtualization layer. Although shown as a single server in FIG. 8, the virtual-data-center management server ("VDC management server") may include two or more physical server computers that support multiple VDC-management-server virtual appliances. The virtual machine 810 includes a management-interface component 812, distributed services 814, core services 816, and a host-management interface 818. The management interface is accessed from any of various computers, such as the PC 708 shown in FIG. 7. The management interface allows the virtual-data-center administrator to configure a virtual data center, provision virtual machines, collect statistics and view log files for the virtual data center, and to carry out other, similar management tasks. The host-management interface 818 interfaces to virtual-data-center agents 824, 825, and 826 that execute as virtual machines within each of the physical servers of the physical data center that is abstracted to a virtual data center by the VDC management server.

The distributed services 814 include a distributed-resource scheduler that assigns virtual machines to execute within particular physical servers and that migrates virtual machines in order to most effectively make use of computational bandwidths, data-storage capacities, and network capacities of the physical data center. The distributed services further include a high-availability service that replicates and migrates virtual machines in order to ensure that virtual machines continue to execute despite problems and failures experienced by physical hardware components. The distributed services also include a live-virtual-machine migration service that temporarily halts execution of a virtual machine, encapsulates the virtual machine in an OVF package, transmits the OVF package to a different physical server, and restarts the virtual machine on the different physical server from a virtual-machine state recorded when execution of the virtual machine was halted. The distributed services also include a distributed backup service that provides centralized virtual-machine backup and restore.

The core services provided by the VDC management server include host configuration, virtual-machine configuration, virtual-machine provisioning, generation of virtual-data-center alarms and events, ongoing event logging and statistics collection, a task scheduler, and a resource-management module. Each physical server 820-822 also includes a host-agent virtual machine 828-830 through which the virtualization layer can be accessed via a virtual-infrastructure application programming interface ("API"). This interface allows a remote administrator or user to manage an individual server through the infrastructure API. The virtual-data-center agents 824-826 access virtualization-layer server information through the host agents. The virtual-data-center agents are primarily responsible for offloading certain of the virtual-data-center management-server functions specific to a particular physical server to that physical server. The virtual-data-center agents relay and enforce resource allocations made by the VDC management server, relay virtual-machine provisioning and configuration-change commands to host agents, monitor and collect performance statistics, alarms, and events communicated to the virtual-data-center agents by the local host agents through the interface API, and to carry out other, similar virtual-data-management tasks.

The virtual-data-center abstraction provides a convenient and efficient level of abstraction for exposing the computational resources of a cloud-computing facility to cloud-computing-infrastructure users. A cloud-director management server exposes virtual resources of a cloud-computing facility to cloud-computing-infrastructure users. In addition, the cloud director introduces a multi-tenancy layer of abstraction, which partitions VDCs into tenant-associated VDCs that can each be allocated to a particular individual tenant or tenant organization, both referred to as a "tenant." A given tenant can be provided one or more tenant-associated VDCs by a cloud director managing the multi-tenancy layer of abstraction within a cloud-computing facility. The cloud services interface (308 in FIG. 3) exposes a virtual-data-center management interface that abstracts the physical data center.

Figure 9:
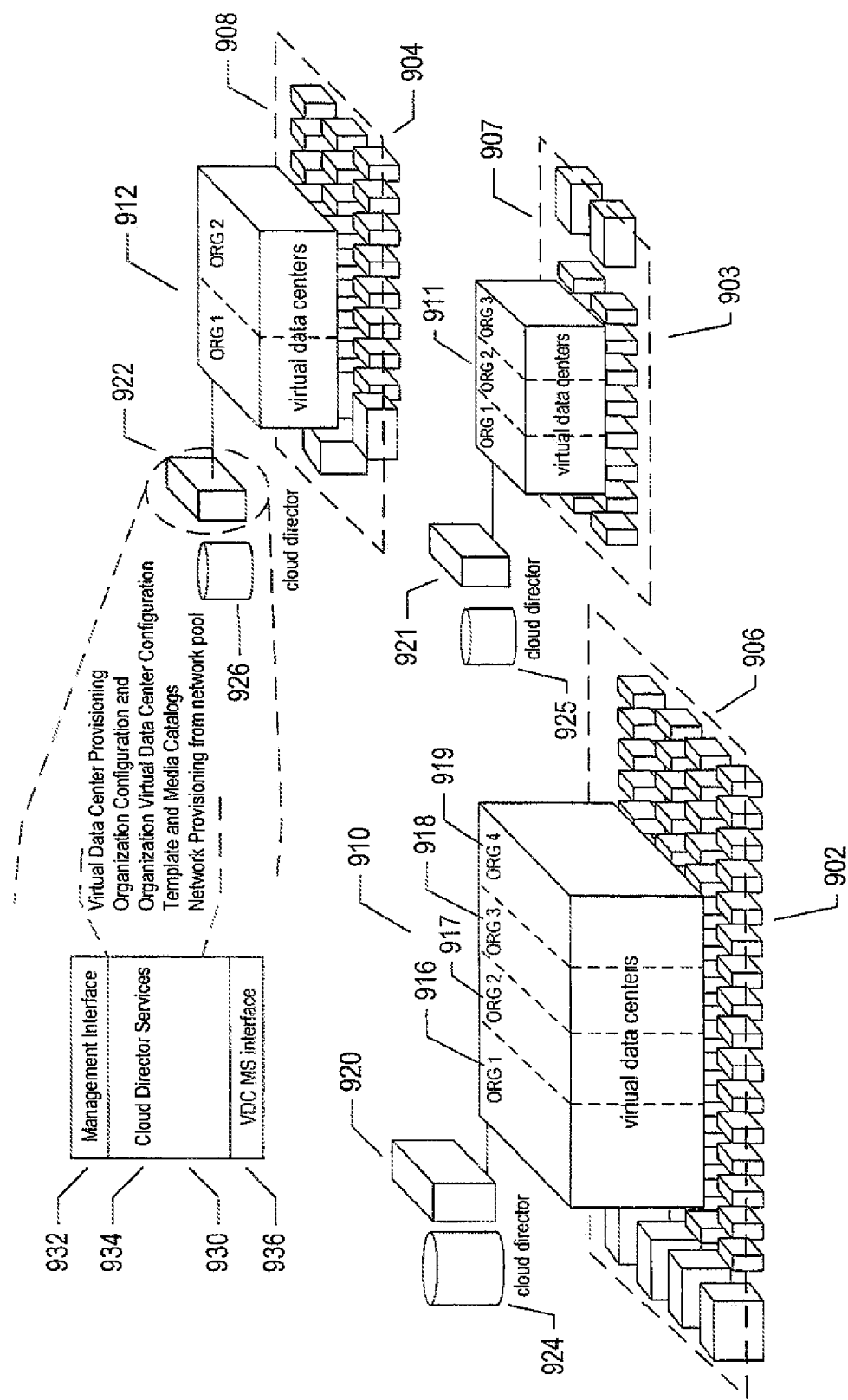
FIG. 9 illustrates a cloud-director level of abstraction.

FIG. 9 illustrates a cloud-director level of abstraction. In FIG. 9, three different physical data centers 902-904 are shown below planes representing the cloud-director layer of abstraction 906-908. Above the planes representing the cloud-director level of abstraction, multi-tenant virtual data centers 910-912 are shown. The resources of these multi-tenant virtual data centers are securely partitioned in order to provide secure virtual data centers to multiple tenants, or cloud-services-accessing organizations. For example, a cloud-services-provider virtual data center 910 is partitioned into four different tenant-associated virtual-data centers within a multi-tenant virtual data center for four different tenants 916-919. Each multi-tenant virtual data center is managed by a cloud director comprising one or more cloud-director servers 920-922 and associated cloud-director databases 924-926. Each cloud-director server or servers runs a cloud-director virtual appliance 930 that includes a cloud-director management interface 932, a set of cloud-director services 934, and a virtual-data-center management-server interface 936. The cloud-director services include an interface and tools for provisioning multi-tenant virtual data center virtual data centers on behalf of tenants, tools and interfaces for configuring and managing tenant organizations, tools and services for organization of virtual data centers and tenant-associated virtual data centers within the multi-tenant virtual data center, services associated with template and media catalogs, and provisioning of virtualization networks from a network pool. Templates are virtual machines that each contains an OS and/or one or more virtual machines containing applications. A template may include much of the detailed contents of virtual machines and virtual appliances that are encoded within OVF packages, so that the task of configuring a virtual machine or virtual appliance is significantly simplified, requiring only deployment of one OVF package. These templates are stored in catalogs within a tenant's virtual-data center. These catalogs are used for developing and staging new virtual appliances and published catalogs are used for sharing templates in virtual appliances across organizations. Catalogs may include OS images and other information relevant to construction, distribution, and provisioning of virtual appliances.

Considering FIGS. 7 and 9, the VDC-server and cloud-director layers of abstraction can be seen, as discussed above, to facilitate employment of the virtual-data-center concept within private and public clouds. However, this level of abstraction does not fully facilitate aggregation of single-tenant and multi-tenant virtual data centers into heterogeneous or homogeneous aggregations of cloud-computing facilities.

Figure 10:
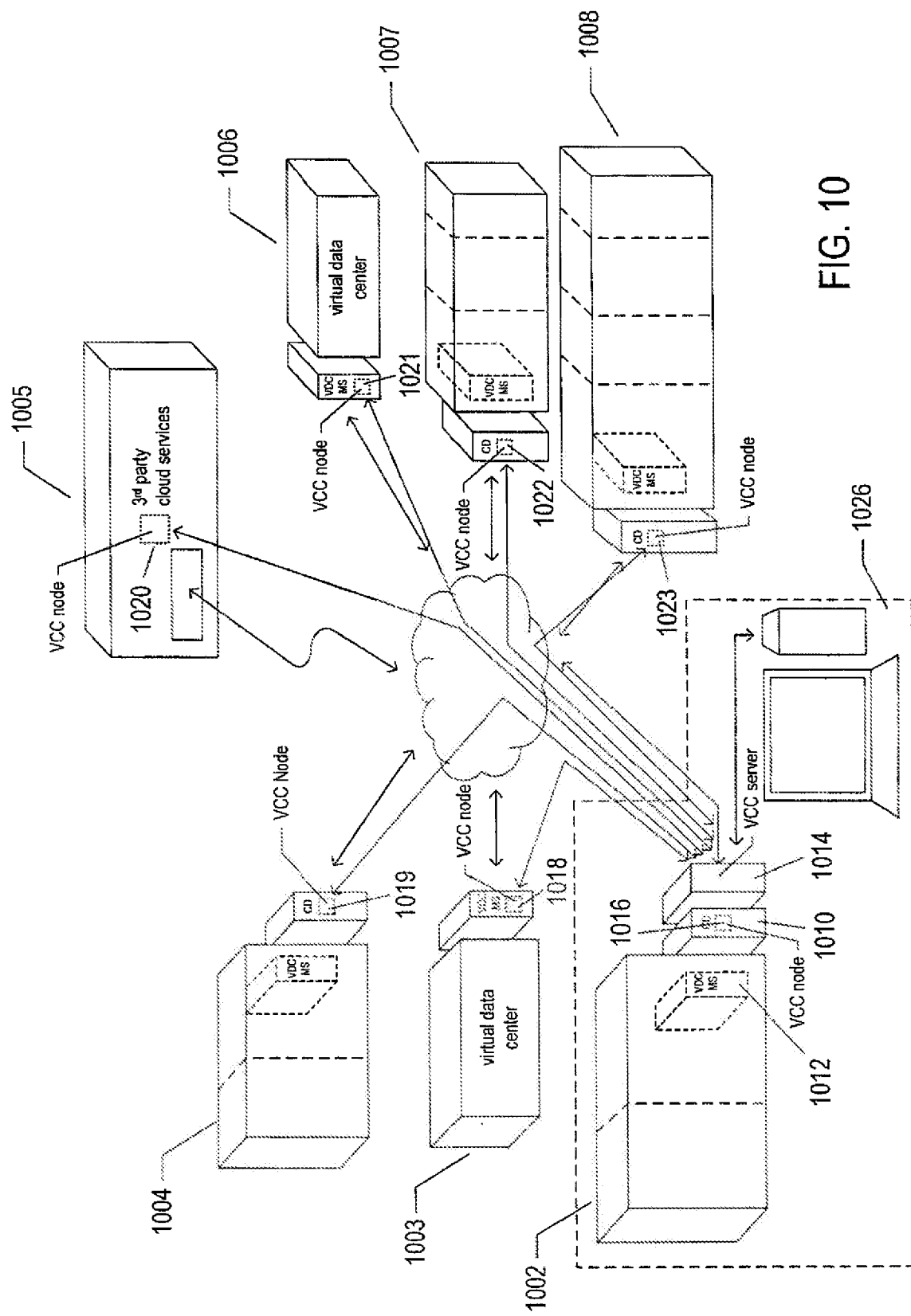
FIG. 10 illustrates virtual-cloud-connector nodes ("VCC nodes") and a VCC server, components of a distributed system that provides multi-cloud aggregation and that includes a cloud-connector server and cloud-connector nodes that cooperate to provide services that are distributed across multiple clouds.

FIG. 10 illustrates virtual-cloud-connector nodes ("VCC nodes") and a VCC server, components of a distributed system that provides multi-cloud aggregation and that includes a cloud-connector server and cloud-connector nodes that cooperate to provide services that are distributed across multiple clouds. VMware vCloud™ VCC servers and nodes are one example of VCC server and nodes. In FIG. 10, seven different cloud-computing facilities are illustrated 1002-1008. Cloud-computing facility 1002 is a private multi-tenant cloud with a cloud director 1010 that interfaces to a VDC management server 1012 to provide a multi-tenant private cloud comprising multiple tenant-associated virtual data centers. The remaining cloud-computing facilities 1003-1008 may be either public or private cloud-computing facilities and may be single-tenant virtual data centers, such as virtual data centers 1003 and 1006, multi-tenant virtual data centers, such as multi-tenant virtual data centers 1004 and 1007-1008, or any of various different kinds of third-party cloud-services facilities, such as third-party cloud-services facility 1005. An additional component, the VCC server 1014, acting as a controller is included in the private cloud-computing facility 1002 and interfaces to a VCC node 1016 that runs as a virtual appliance within the cloud director 1010. A VCC server may also run as a virtual appliance within a VDC management server that manages a single-tenant private cloud. The VCC server 1014 additionally interfaces, through the Internet, to VCC node virtual appliances executing within remote VDC management servers, remote cloud directors, or within the third-party cloud services 1018-1023. The VCC server provides a VCC server interface that can be displayed on a local or remote terminal, PC, or other computer system 1026 to allow a cloud-aggregation administrator or other user to access VCC-server-provided aggregate-cloud distributed services. In general, the cloud-computing facilities that together form a multiple-cloud-computing aggregation through distributed services provided by the VCC server and VCC nodes are geographically and operationally distinct.

Event-Message Clustering Methods and Systems

Figure 11:
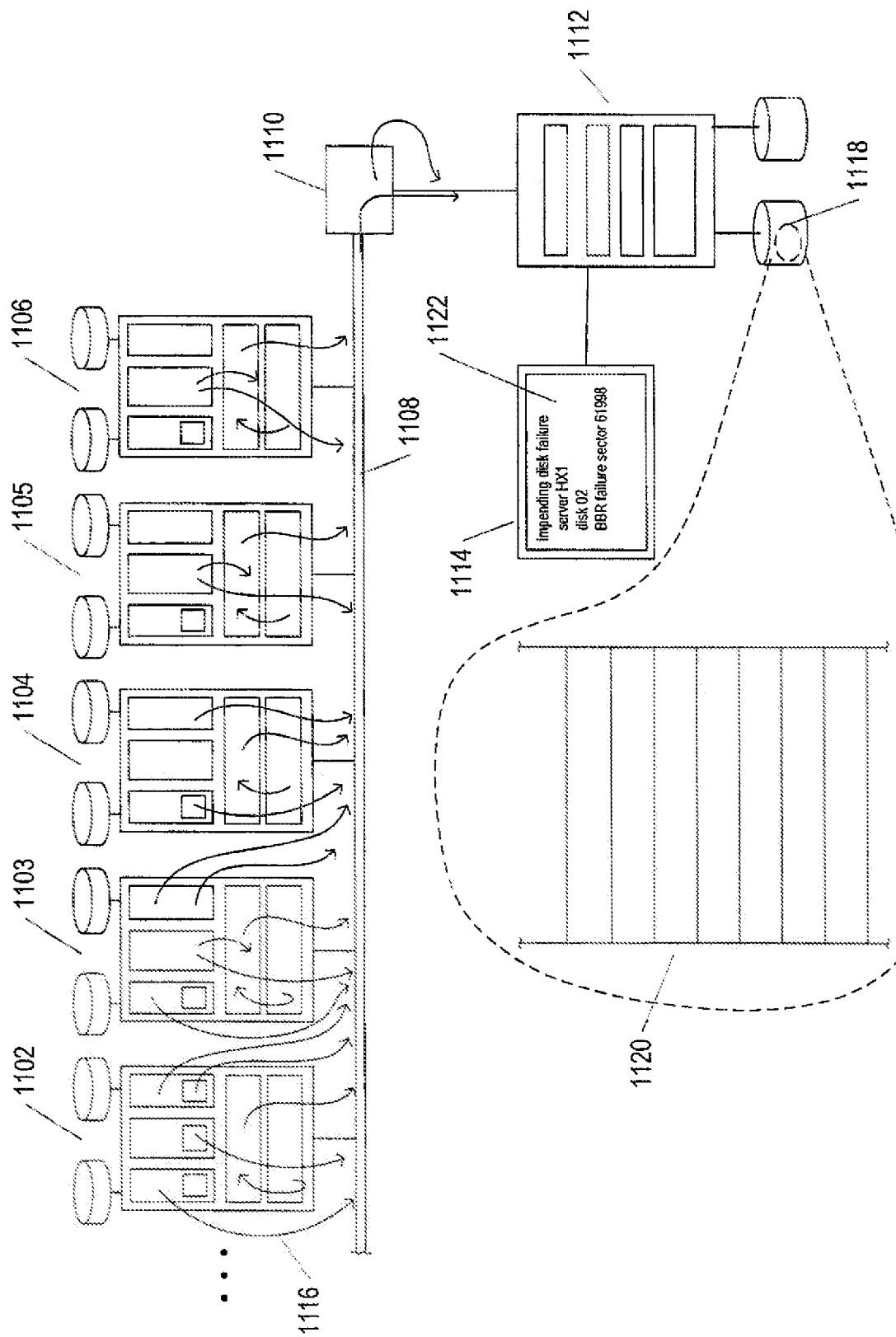
FIG. 11 illustrates a simple example of event-message logging and analysis.

FIG. 11 illustrates a simple example of event-message logging and analysis. In FIG. 11, a number of computer systems 1102-1106 within a distributed computing system are linked together by an electronic communications medium 1108 and additionally linked through a communications bridge/router 1110 to an administration computer system 1112 that includes an administrative console 1114. As indicated by curved arrows, such as curved arrow 1116, multiple components within each of the discrete computer systems 1102 and 1106 as well as the communications bridge/router 1110 generate event messages which are ultimately transmitted to the administration computer 1112. Event messages may be relatively directly transmitted from a component within a discrete computer system to the administration computer or may be collected at various hierarchical levels within a discrete computer and then forwarded from an event-message-collecting entity within the discrete computer to the administration computer. The administration computer 1112 may filter and analyze the received event messages, as they are received, in order to detect various operational anomalies and impending failure conditions. In addition, the administration computer collects and stores the received event messages in a data-storage device or appliance 1118 as large event-message log files 1120. Either through real-time analysis or through analysis of log files, the administration computer may detect operational anomalies and conditions for which the administration computer displays warnings and informational displays, such as the warning 1122 shown in FIG. 11 displayed on the administration-computer display device 1114.

FIG. 12 shows a small, 11-entry portion of a log file from a distributed computer system. In FIG. 12, each rectangular cell, such as rectangular cell 1202, of the portion of the log file 1204 represents a single stored event message. In general, event messages are relatively cryptic, including generally only one or two natural-language sentences or phrases as well as various types of file names, path names, and, perhaps most importantly, various alphanumeric parameters. For example, log entry 1202 includes a short natural-language phrase 1206, date 1208 and time 1210 parameters, as well as a numeric parameter 1212 which appears to identify a particular host computer.

There are a number of reasons why event messages, particularly when accumulated and stored by the millions in event-log files or when continuously received at very high rates during daily operations of a computer system, are difficult to automatically interpret and use. A first reason is the volume of data present within log files generated within large, distributed computing systems. As mentioned above, a large, distributed computing system may generate and store terabytes of logged event messages during each day of operation. This represents an enormous amount of data to process, even were the individual event messages highly structured and precisely formatted to facilitate automated processing. However, event messages are not so structured and formatted, which is a second reason that continuously received event messages and event logs are difficult to automatically interpret and analyze. They are even more difficult to manually analyze and interpret, by human system administrators and system analysts. Event messages are generated from many different components and subsystems at many different hierarchical levels within a distributed computer system, from operating system and application-program code to control programs within disk drives, communications controllers, and other such distributed-computer-system components. The event messages may be generated according to a variety of different event-message structuring and formatting approaches used by various different vendors and programmers. Even within a given subsystem, such as an operating system, many different types and styles of event messages may be generated, due to the many thousands of different programmers who contribute code to the operating system over very long time frames. A third reason that it is difficult to process and analyze event messages is that, in many cases, event messages relevant to a particular operational condition, subsystem failure, or other problem represent only a tiny fraction of the total number of event messages that are received and logged. Searching for these relevant event messages within an enormous volume of event messages continuously streaming into an event-message-processing-and-logging subsystem of a distributed computer system may itself be a significant computational challenge. While text-search methodologies may be employed to search for relevant data within large log files, such methods are generally quite time-consuming and imprecise. A fourth problem associated with event messages in large, distributed computer systems is that storing and archiving event logs may itself represent a significant computational challenge. Given that many terabytes of event messages may be collected during the course of a single day of operation of a large, distributed computer system, collecting and storing the large volume of information represented by event messages may represent a significant processing-bandwidth, communications-subsystems bandwidth, and data-storage-capacity challenge, particularly when it may be necessary to reliably store event logs in ways that allow the event logs to be subsequently accessed for searching and analysis.

Figure 13:
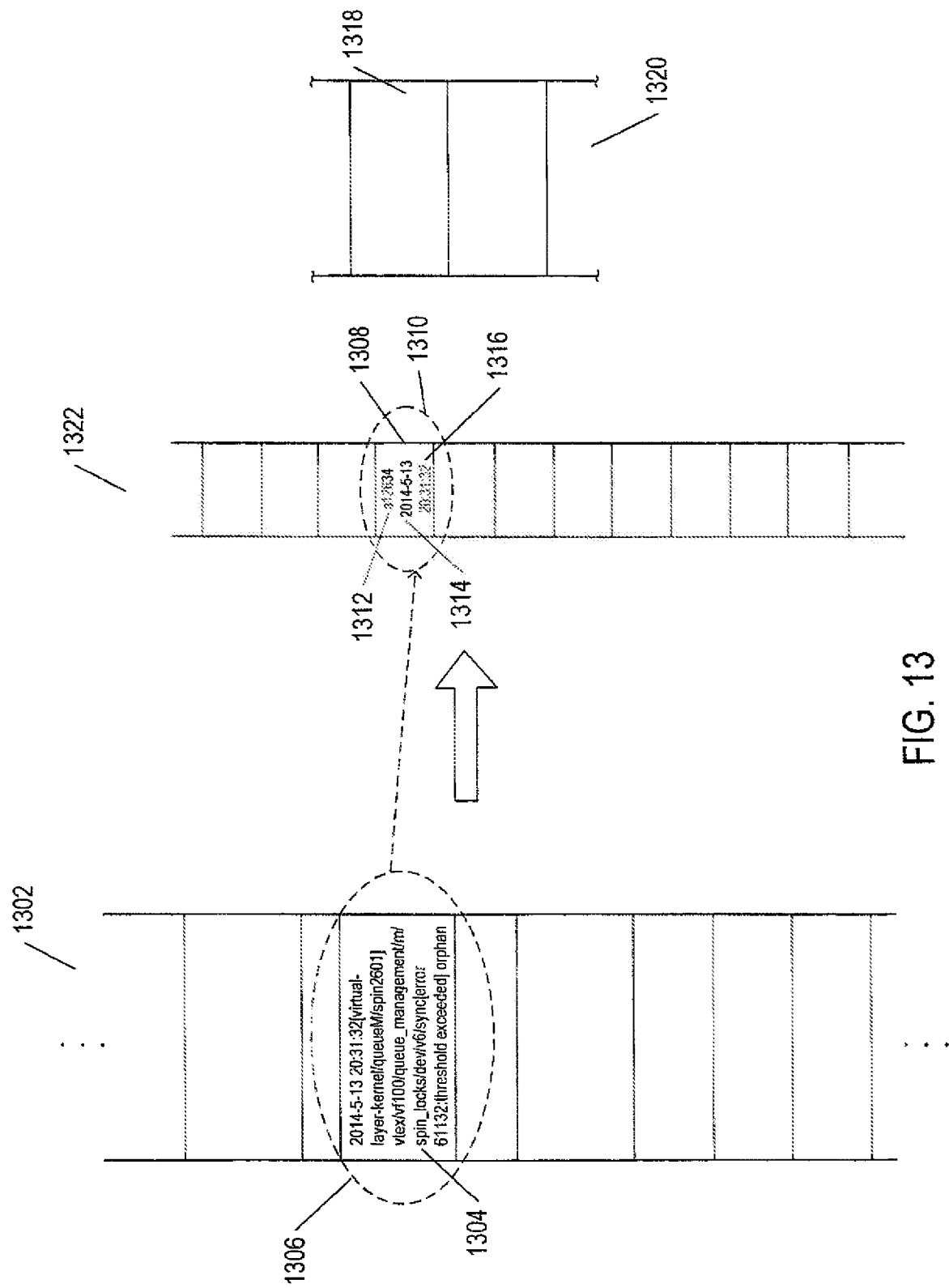
FIG. 13 illustrates the event-message-processing approach represented by certain of these methods and systems.

The methods and systems for processing, classifying, and efficiently storing event messages, collectively referred to as "event-clustering methods and systems," have been devised to address the above-mentioned challenges associated with event-message processing and analysis as well as additional deficiencies and problems associated with currently available event-message processing, analysis, and storage. FIG. 13 illustrates the event-message-processing approach represented by certain of these methods and systems. In FIG. 13, a traditional event log 1302 is shown as a column of event messages, including the event message 1304 shown within inset 1306. The methods and systems to which the current document are directed automatically process event messages, as they are received, in order to transform the received event messages into event records, such as event record 1308 shown within inset 1310. The event record 1308 includes a numeric event-type identifier 1312 as well as the values of parameters included in the original event message. In the example shown in FIG. 13, a date parameter 1314 and a time parameter 1315 are included in the event record 1308. The remaining portions of the event message, referred to as the "non-parameter portion of the event message," is separately stored in an entry in a table of non-parameter portions that includes an entry for each type of event message. For example, entry 1318 in table 1320 may contain an encoding of the non-parameter portion common to all event messages of type a12634 (1312 in FIG. 13). Thus, the methods and systems to which the current document is directed have the effect of transforming traditional event logs, such as event log 1302, into stored event records, such as event-record log 1322, and a generally very small table 1320 with encoded non-parameter portions, or templates, for each different type of event message.

The event-record log, such as event-record log 1322, and other types of accumulations of event records have numerous advantages over a traditional event-message log. A first advantage is that each event record is typed. Because the event records are typed, the event-record log can be easily searched, partitioned, and otherwise processed based on event-message types, which produces a significant computational advantage for downstream event-analysis and event-interpretation systems. A second advantage is that, as shown in FIG. 13, event-record logs are significantly compressed with respect to traditional event-message logs. Because only one copy of the non-parameter portion of each type of event message needs to be stored in the associated table, a significant data compression is achieved by the methods and systems to which the current document is directed. The compression ratios achieved depend on the average ratio of non-parameter characters to parameter characters in event messages. In many cases, compression ratios of between 2:1 and 10:1 can be achieved by storing event records rather than event messages. Because terabytes of event messages may be collected on a daily basis within a large, distributed computing system, this potential rate of data compression represents a significant decrease in computational and hardware-usage overheads. A third advantage of event-record logs in comparison to event-message logs is that the event-record logs are fully and uniformly structured, which additionally facilitates downstream automated analysis and interpretation. The downstream analysis and interpretation systems directly acquire relevant parameters and an event type from an event record, without the need for parsing and typing a large variety of different types of event messages.

Returning briefly to FIG. 11, it should be noted that the simple example illustrated in FIG. 11 fails to illustrate the entire problem space addressed by the methods and systems to which the current document is directed. In large, distributed computing systems, for example, it would be impractical to funnel all event messages to a single administration computer. Instead, processing, analysis, and storage of event messages is typically carried out by multiple discrete computer systems and is therefore also distributed. As a result, methods and systems for processing, typing, and efficiently storing event messages need to be both scalable and distributable over multiple computer systems in order to be generally useful over a range of different types of distributed computing systems as well as over significant time frames during which distributed computing systems may increase in size due to continuous addition of new processing components. The distributed virtual-data-center and virtual-cloud management systems discussed in the first subsection of the current document are examples of systems in which event-message processing, typing, and storage may be distributed over multiple computational nodes.

In the current application, the phrase "event-message-clustering system" refers to any of various standalone systems as well as subsystems and components of standalone systems and systems within distributed computing systems that carry out event-message clustering by the event-message-clustering methods to which the current document is directed. The phrase "event message" refers to any of various types of information entities include parameters and non-parametric portions to which the currently described clustering-based typing methods can be applied.

Figure 14A:
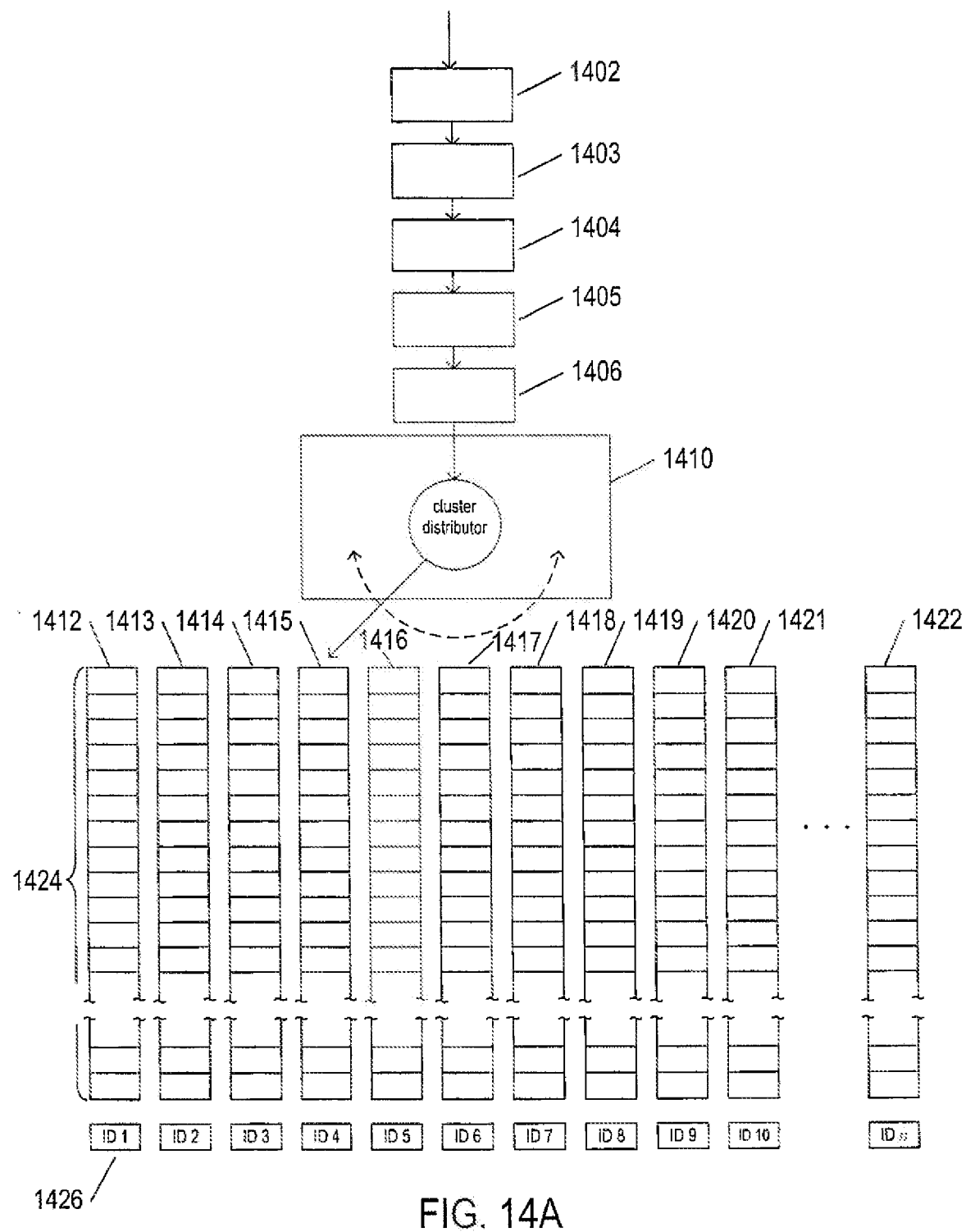
FIG. 14A illustrates one implementation of clustering methods and systems to which the current document is directed.

FIG. 14A illustrates one implementation of clustering methods and systems. Rectangles 1402-1406 represent incoming event messages to an event-message-clustering system. The event-message-clustering system includes an event-processing-and-distribution component 1410 and multiple clusters of event records 1412-1422. Each cluster includes stored event records, such as the stored event records 1424 of cluster 1412, and a cluster identifier, such as cluster identifier 1426 of cluster 1412. The event-message-clustering system 1410 processes each received event message to transform the received event message into an event record and determines to which cluster to assign the event record. The clusters represent a typing scheme for event messages. In other words, each cluster represents a message type. The event-message-clustering system 1410 operates in real time to transform event messages into event records and to type the event messages by assigning each event record corresponding to an event message to a particular cluster. The stored event records may be accessed by downstream event-analysis and event-interpretation systems. In certain implementations, the event records may be physically stored by separate systems. Event records may not only be accessed by other entities, but may be periodically flushed to event-record archives, copied to downstream event-record-processing components, and transferred to downstream event-record-processing components. Initially, when a cluster is first initialized and begins storing events, the cluster may store unprocessed event messages rather than event records for an initial period of time. Only when a sufficient number of event messages of a particular type have been accumulated can downstream analysis components provide tools to the event-message-clustering system that allow the event-message-clustering system 1410 to transform event messages into event records.

Figure 14B:
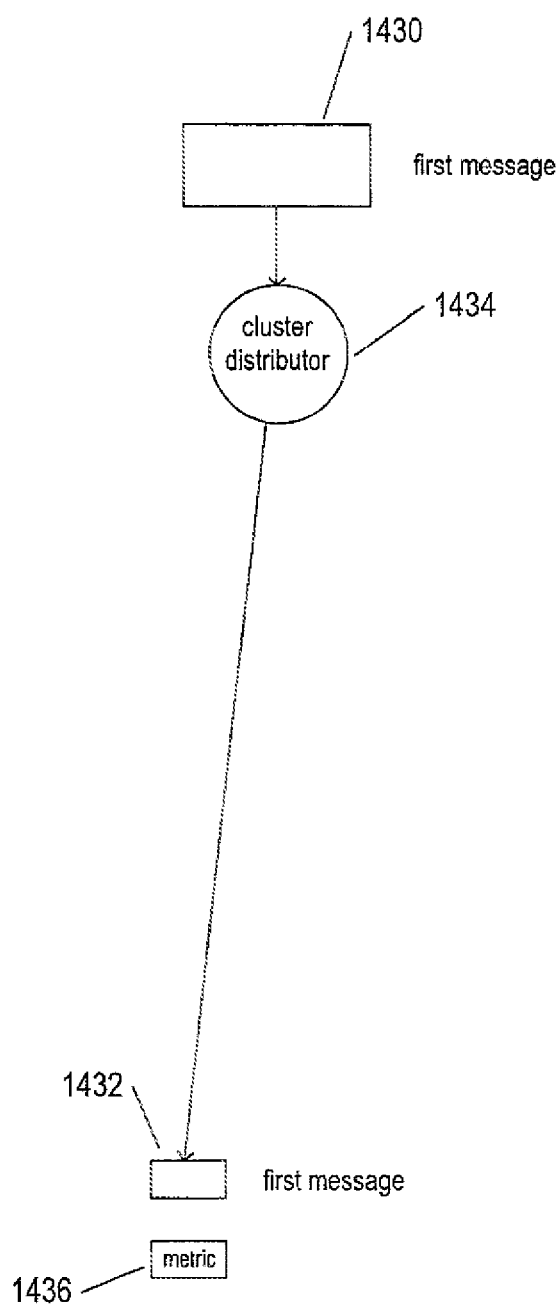
FIG. 14B illustrates processing of a first event message.

FIG. 14B illustrates processing of a first event message. Initially, there are no clusters. The first received event message 1430 initiates creation of a first cluster 1432 to which the cluster-distributor-component 1434 of the event-message-clustering system 1410 assigns the first event message. A temporary identifier 1436 is assigned to the first cluster.

Figure 14C:
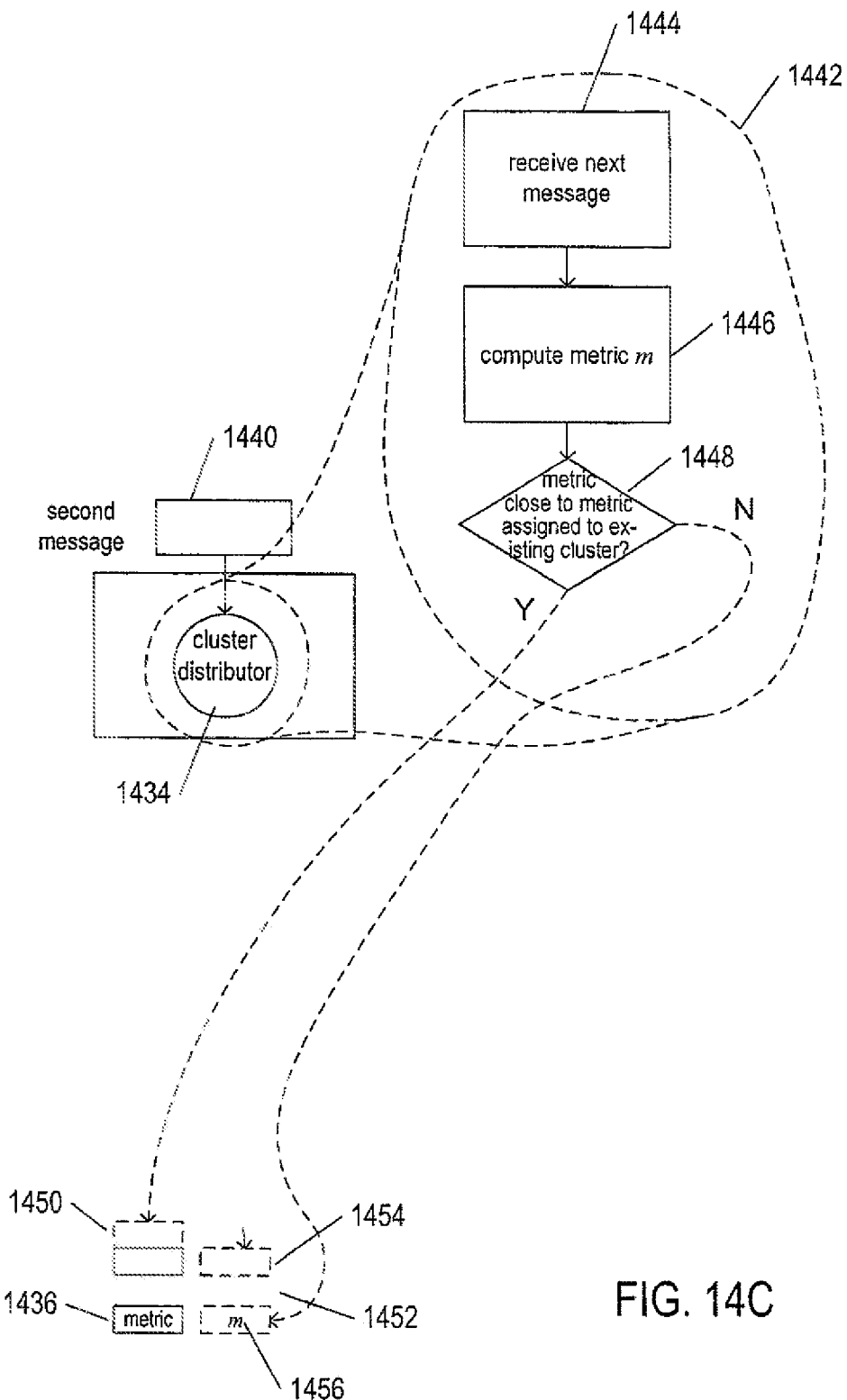
FIG. 14C illustrates processing of a second message.

FIG. 14C illustrates processing of a second message. The second event message 1440 is analyzed by the cluster distributor 1434 as represented by the logic shown in inset 1442. In step 1444, the cluster distributor receives the second message and, in step 1446, computes a numeric metric m for the received event message. In conditional step 1448, the cluster distributor determines whether the computed metric is close to the metric 1436 assigned to the first cluster. If the computed metric m for the second event message is sufficiently close to the metric 1436 assigned to the first cluster, then the second message is added to the first cluster 1450. Otherwise, a new cluster is created 1452 and the second event message is added to the new cluster 1454. The metric computed for the second event message m is assigned as the metric associated with the new, second cluster 1456. Subsequently received event messages are similarly processed. Either a subsequently received event message is assigned to an existing cluster, when a metric computed for the subsequently received event message is sufficiently close to a metric for an existing cluster, or a new cluster is created and the subsequently received event message becomes the first event message assigned to the new cluster. Thus, clusters are created dynamically as event messages are received and processed.

Figure 15:
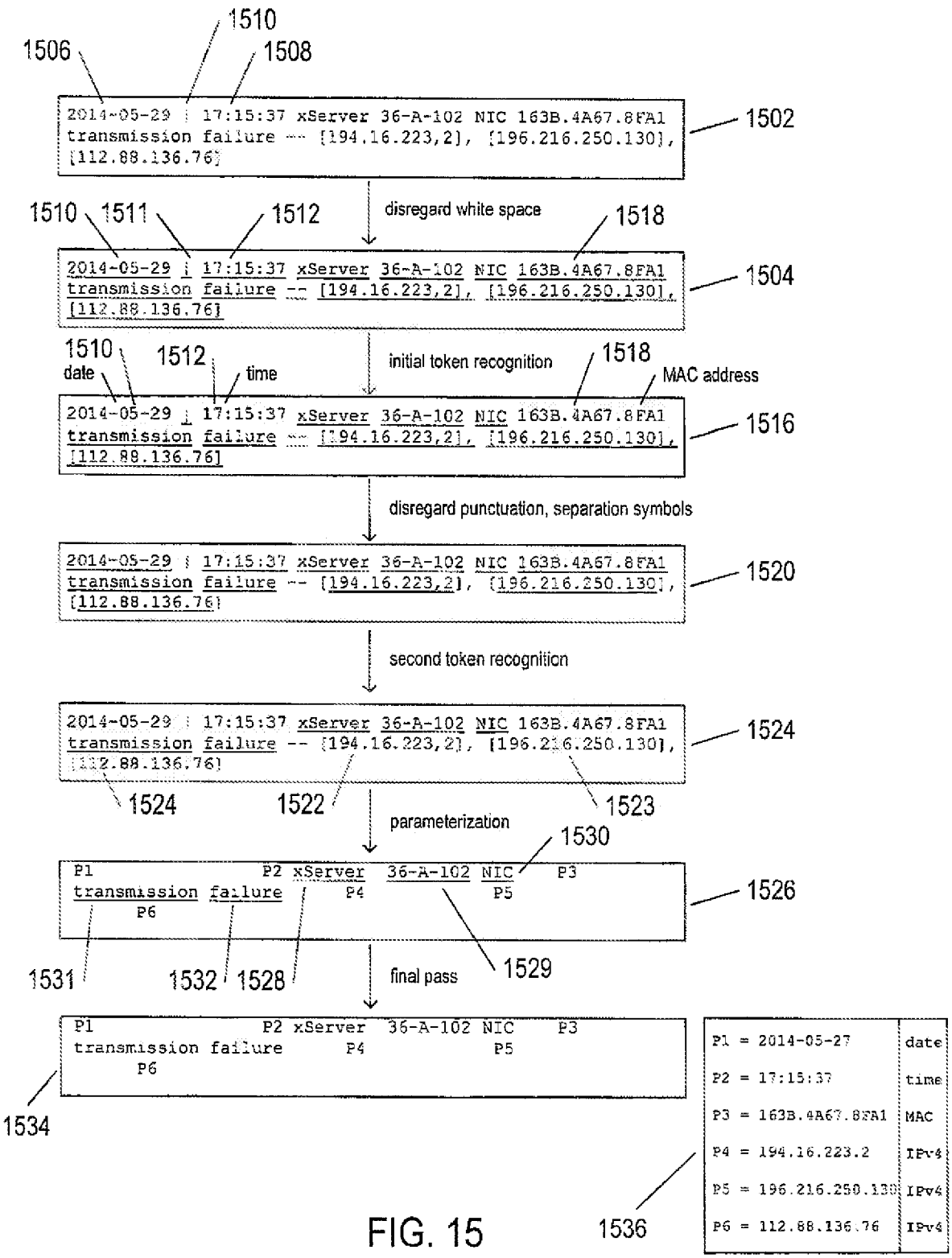

FIGS. 15-20 illustrate one implementation of the logic used by an event-message-clustering system to compute a metric for a received event message that allows the event message to be assigned to a particular existing cluster. FIG. 15 illustrates one implementation of an event-message-normalization procedure that is used to prepare an event message for computation of a metric. The received event message 1502 is first tokenized by considering the event message to consist of tokens separated by non-printing characters, referred to as "white space." In FIG. 15, this initial tokenization of the event message 1504 is illustrated by underlining of the printed or visible characters. For example, the date 1506, time 1508, and vertical bar 1510 at the beginning of the text contents of the event message 1502, following initial tokenization, become a first token 1510, a second token 1511, and a third token 1512, as indicated by underlining.

Next, an initial token-recognition pass is made to recognize any of the initial tokens as various types of parameter values. Parameter values are tokens or message fields that are likely to be highly variable over a set of messages of a particular type. Date/time stamps, for example, are nearly unique for each event message, with two event messages having an identical date/time stamp only in the case that the two event messages are generated within less than a second of one another. Additional examples of parameters include global unique identifiers ("GUIDs"), hypertext transfer protocol status values ("HTTP statuses"), universal resource locators ("URLs"), network addresses, and other types of common information entities that identify variable aspects of a type of event. By contrast, the phrase "transmission failure" in event message 1502 likely occurs within each of a large number of transmission-failure event messages. In FIG. 15, the recognized tokens in the event message following initial token recognition 1516 are indicated by shading. In the example shown in FIG. 15, initial token recognition determines that the first token 1510 is a date, the third token 1512 is a time, and the seventh token 1518 is a media access control address ("MAC address"). Various types of symbolically encoded values, including dates, times, machine addresses, network addresses, and other such parameter values can be recognized using regular expressions or programmatically. For example, there are numerous ways to represent dates. A relatively simple program or a simple set of regular expressions can be written to recognize symbolically encoded dates in any of the common formats. It is possible that the token-recognition process may incorrectly determine that an arbitrary alphanumeric string represents some type of symbolically encoded parameter when, in fact, the alphanumeric string only coincidentally has a form that can be interpreted to be a parameter value. The currently described methods and systems do not depend on absolute precision and reliability of the event-message-normalization process. Occasional misinterpretations generally do not result in mistyping of event messages and, in the rare circumstances in which event messages may be mistyped, the mistyping is most often discovered during subsequent processing. Relatively computationally straight-forward processing methods are adopted in the currently described methods and systems for normalization and typing of event messages, because event messages are generally continuously received at high rates, as a result of which the computational overhead associated with processing of each event message represents a significant constraint.

In certain implementations, normalization may terminate following initial token recognition. In the implementation illustrated in FIG. 15, the event message is subject to an additional token-recognition step after re-tokenizing the non-parameter portions of the event message by removing punctuation and separation symbols, such as brackets, commas, and dashes that occur as separate tokens or that occur at the leading and trailing extremities of previously recognized tokens, as shown by underlining in the event message 1520 in FIG. 15. After removal of the punctuation and separation symbols, an additional token-recognition pass in the example of FIG. 15 recognizes additional types of symbolically encoded parameter values, including the three version-4 Internet-protocol ("IPv4") addresses 1522-1524 in event message 1524.

Those tokens that have been recognized in the two token-recognition passes are considered to be parameters, denoted "P1," "P2," . . . "P6" in the parameterized event message 1526 in FIG. 15. The remaining tokens 1528-1532 represent the non-parameter tokens present within the event message. A final pass may involve promoting one or more of the non-parameter tokens to parameters based on certain criteria. For example, token 1529 in the parameterized event message 1526 might be considered to be a parameter value that represents the identifier of a server. In the example shown in FIG. 15, however, no additional tokens are promoted to the status of parameter values following the final pass 1534. The result of normalization is therefore a sequence of non-parameter tokens interspersed with parameter values 1534 and a table 1536 that shows the type and symbol encodings for the parameter values. There are many computational techniques for encoding a list of non-parameter tokens recognized within an event message including, as one example, a list of pointers and associated string lengths.

FIG. 16 illustrates the computation of the Adler cyclic redundancy check ("CRC") value from a token comprising a string of characters. As shown at the top of FIG. 16, the token can be thought of as an array of characters 1602 S. Two 16-bit values $A_n$ and $B_n$ are computed as indicated by the recursive expressions 1604 in FIG. 16. The high and low bytes of the two 16-bit values $A_n$ and $B_n$ are arranged 1606 into a 32-bit value that constitutes the Adler CRC for the token. The Adler CRC values are computed, in many cases, to recognize corruptions of a token following network transmission or other such operations. Small one-bit and two-bit transmission errors result in very different Adler CRC values computed for the original token and corrupted token received through an error-introducing communications medium. In one implementation of the currently described methods and systems, the Adler CRC is used for computing a metric m for an event message.

FIG. 17 illustrates computation of a metric m for an event message. In certain implementations of the currently described methods and systems, the metric m is a vector of integer values. This vector, referred to as a "feature vector," can be thought of as being computed by a matrix-multiplication-like operation. In FIG. 17, the feature vector v 1702 is produced by a matrix-multiplication-like operation in which a matrix-like vector of m functions 1704, each of which takes n arguments is multiplied by a vector of non-parameter tokens identified within an event message 1706 to produce the feature vector v 1702. The number of elements, or number of dimensions, of the feature vector v is equal to the number of functions in the matrix-like function vector f and the number of arguments supplied to each function n is equal to the number of non-parameter tokens n in the ordered set of non-parameter tokens T corresponding to an event message.

Figure 18C:
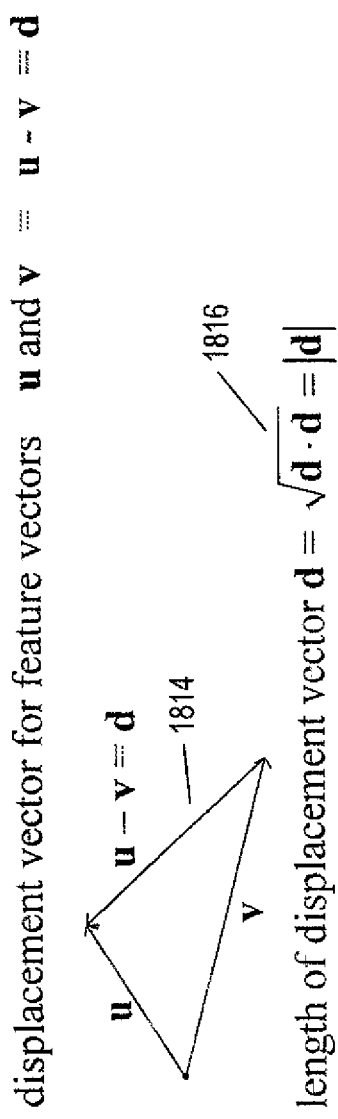

FIGS. 18A-C illustrate computation of the distance between two points represented by vectors. Vectors of dimension n can be thought of as directed distances in an n-dimensional space or as the coordinates for points in an n-dimensional space, where the ray between the origin and the point is equal to the directed distance represented by the vector. FIG. 18A illustrates vector subtraction, in which a vector v 1802 is subtracted from a vector u 1804 to produce the result vector u–v 1806. FIG. 18B shows the computation of the dot product u·v of two vectors u and v. The dot product 1808 can be viewed as a matrix multiplication between the transpose of the first vector 1810 and the second vector 1812. FIG. 18C illustrates computation of the distance between two points represented by two vectors u and v. First, a displacement vector d is computed as u–v 1814. Then, the length of the displacement vector is computed as the square root of the dot product of the displacement vector 1816. The distance between two event messages can be similarly calculated as the square root of the dot product of the difference, or displacement vector, computed from the two feature vectors corresponding to the two event messages. Thus, the metric m computed by one implementation of the event-message-clustering system, discussed in FIGS. 14A-C, is a feature vector and an event message is assigned to that cluster for which the distance between the event message and the first event message assigned to the cluster is minimal. In other words, the clusters represent regions in an m-dimensional space that contain similar event messages.

FIGS. 19 and 20 illustrate one particular implementation for computing feature vectors and the distance between event messages represented by feature vectors. As shown in FIG. 19, the function $f_i()$ for computing the value of element i of a feature vector, in the described implementation, is:

$$f_i(T) = \underset{j}{\arg\max} \, ([P_i^* \, \text{Adler}(t_i) + Q_i] \bmod \text{0xffffffff}).$$

In essence, the function $f_i()$ computes, for each non-parameter token $t_j$ in the event message T, the Adler CRC value, multiplies the Adler CRC value for $t_j$ by a first constant, and then adds a second constant to the product of the Adler CRC value for $t_j$ and the first constant. The result is truncated to a 32-bit value using a mod operation. The function $f_i()$ returns the maximum of these computed values for each of the non-parameter tokens. FIG. 19 provides an example using the example tokenized event message 1534 of FIG. 15. The non-parameter tokens together comprise an ordered set of tokens T 1904. The function $f_i()$ computes a 32-bit value $h_j$ for each non-parameter token $t_j$ as shown in the set of five expressions 1906. The function $f_i()$ returns the maximum of these computed values 1908.

FIG. 20 illustrates computing the distance between two event messages represented by two feature vectors computed for the two event messages. FIG. 20 shows a first feature vector u 2002 corresponding to one event message and a second feature vector v 2004 corresponding to another event message. To compute the distance between the two event messages, a displacement feature vector d 2006 is first computed. Because the values of the feature-vector elements are computed based on Adler CRC values, differences between elements do not correspond to distances in particular dimensions, since CRC functions tend to produce very different values for different, but similar tokens. Therefore, when two corresponding elements of two feature vectors are identical, and their differences equal to zero, then the distance-metric for these element values is zero, but when the difference between two corresponding feature-vector element values is non-zero, it can only be concluded that the corresponding feature-vector element values are different and thus are separated by some distance in the corresponding dimension. In the described implementation, all non-zero element values in the displacement vector 2006 are replaced by the value "1" to produce a modified displacement vector d' 2008. The square root of the dot product of the modified displacement vector 2010 is equal to the number of non-matching feature-vector elements in the two feature vectors u and v or, equivalently, to the number of non-zero elements in the modified displacement vector d'. However, the square root of the dot product of the modified displacement vector is a type of displacement-based metric, just not the familiar Euclidean, or L2, distance metric. Were a similarity-preserving hash function used, rather than the Adler CRC, in computing the feature vector, a stepwise distance metric closer to the L2 distance metric would be computable from the feature vectors representing two event messages.

Figure 21:
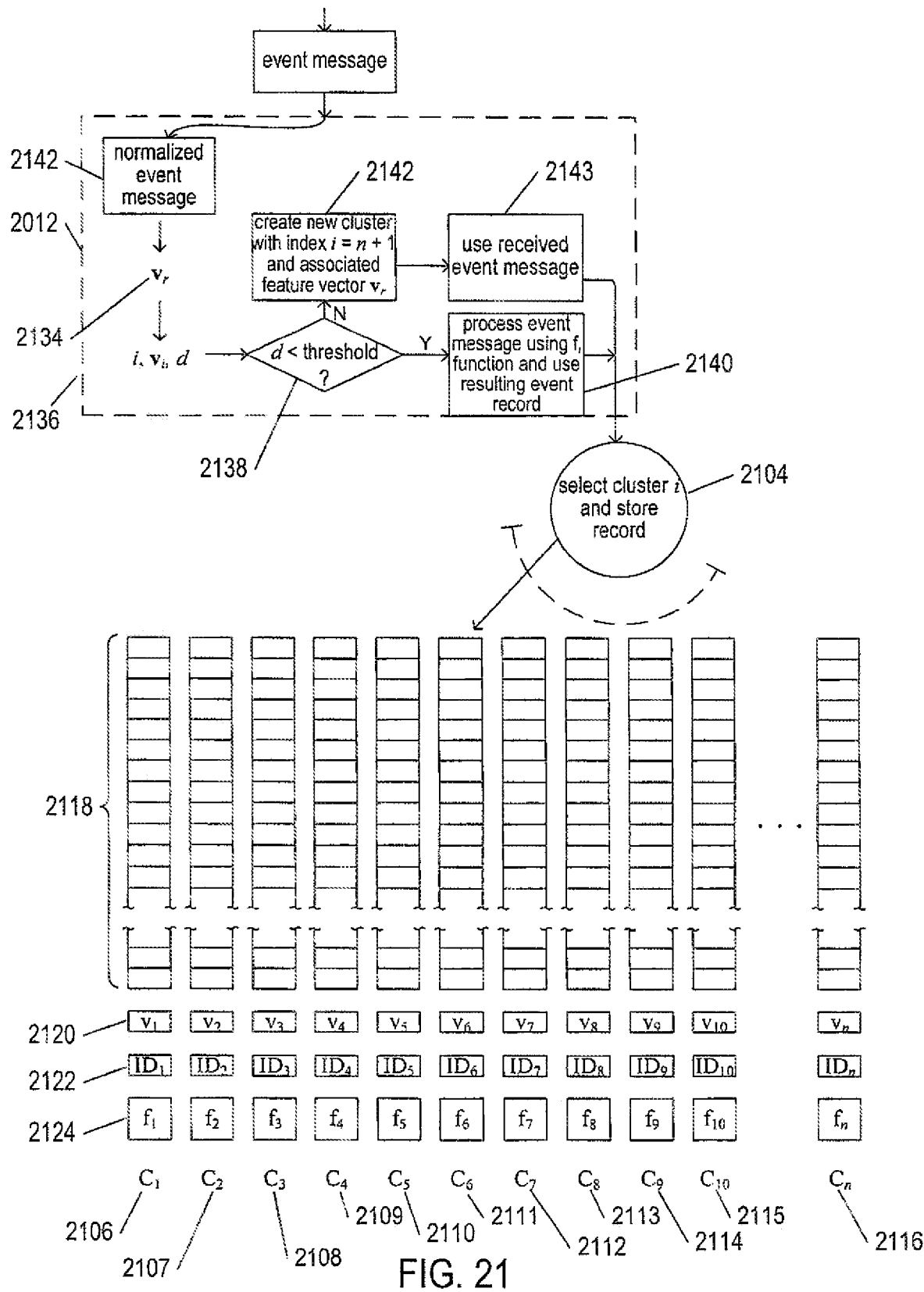
FIG. 21 illustrates an implementation of the event-message-clustering system to which the current document is directed at a greater level of detail than, but using the same illustration conventions as used in, FIG. 14A.

FIG. 21 illustrates an implementation of the event-message-clustering system to which the current document is directed at a greater level of detail than, but using the same illustration conventions as used in, FIG. 14A. In FIG. 21, the event-message-clustering system includes event-message-processing logic 2102, a distributor component 2104, and a set of n clusters 2106-2116. Each cluster includes a number of assigned event records, such as the assigned event records 2118 for cluster 2106, a feature vector for the cluster, such as feature-vector 2120 for cluster 2106, a cluster identifier, such as cluster identifier 2122 for cluster 2106, and a processing function, such as processing function 2124 for cluster 2106, that can be used by the event-message-clustering system to parse an event message in order to extract parameter values from the event message. As discussed above with reference to FIG. 14A, after a cluster is first created, the cluster temporarily stores event messages, rather than event records, and is associated with a temporary ID and no parsing function. However, once downstream analysis systems have analyzed an initial set of event messages associated with, or assigned to, the cluster, the downstream analysis systems provide a final identifier and parsing function for the cluster to the event-message-clustering system. When a next event message 2130 is received by the event-message-clustering system, the event message is normalized 2142, as discussed above with reference to FIG. 15, and a feature vector $v_r$ 2134 is computed for the normalized event message, as discussed above with reference to FIGS. 16-18. The computed feature vector $v_r$ is compared with all of the feature vectors for the n clusters to determine a cluster i associated with feature vector $v_i$ for which the distance d computed for $v_r$ and $v_i$ is minimal 2136. When d is less than a threshold value 2138, the event message is processed using function $f_i$ associated with cluster i to produce a corresponding event record which is output, along with the cluster index i, to the distributor subcomponent 2104. Otherwise, when d is not less than the threshold 2138, a new cluster is created with index i=n+1, the feature vector computed for the received event message $v_r$ is associated with this cluster 2142, and the received event message is passed, along with the cluster index, to the distributor subcomponent 2104. The distributor subcomponent 2104 then assigns the event message or event record to the cluster with index i. Again, the event messages and event records associated with clusters may be physically stored by the event-message-clustering system or may be stored by another component, with the event-message-clustering system either returning event messages and event records to requesting downstream components or references to event messages and event records stored in another component. Event records and event messages may be deleted form clusters, copied to other locations, and periodically archived.

The feature-vector-based typing of event messages provides a first estimate of event-message classification. However, downstream analytical components that analyze event messages may determine that two or more clusters represent a single event-message type and may therefore request that the clusters corresponding to these types be merged together. Similarly, downstream analytic components may determine that the event messages in a particular cluster actually have two or more different types and may therefore request the event-message-clustering system to split the cluster into two or more clusters. The merge and split operations thus allow a refinement or fine tuning of the initial feature-vector-based event-message typing carried out by the event-message-clustering system.

Figure 22:
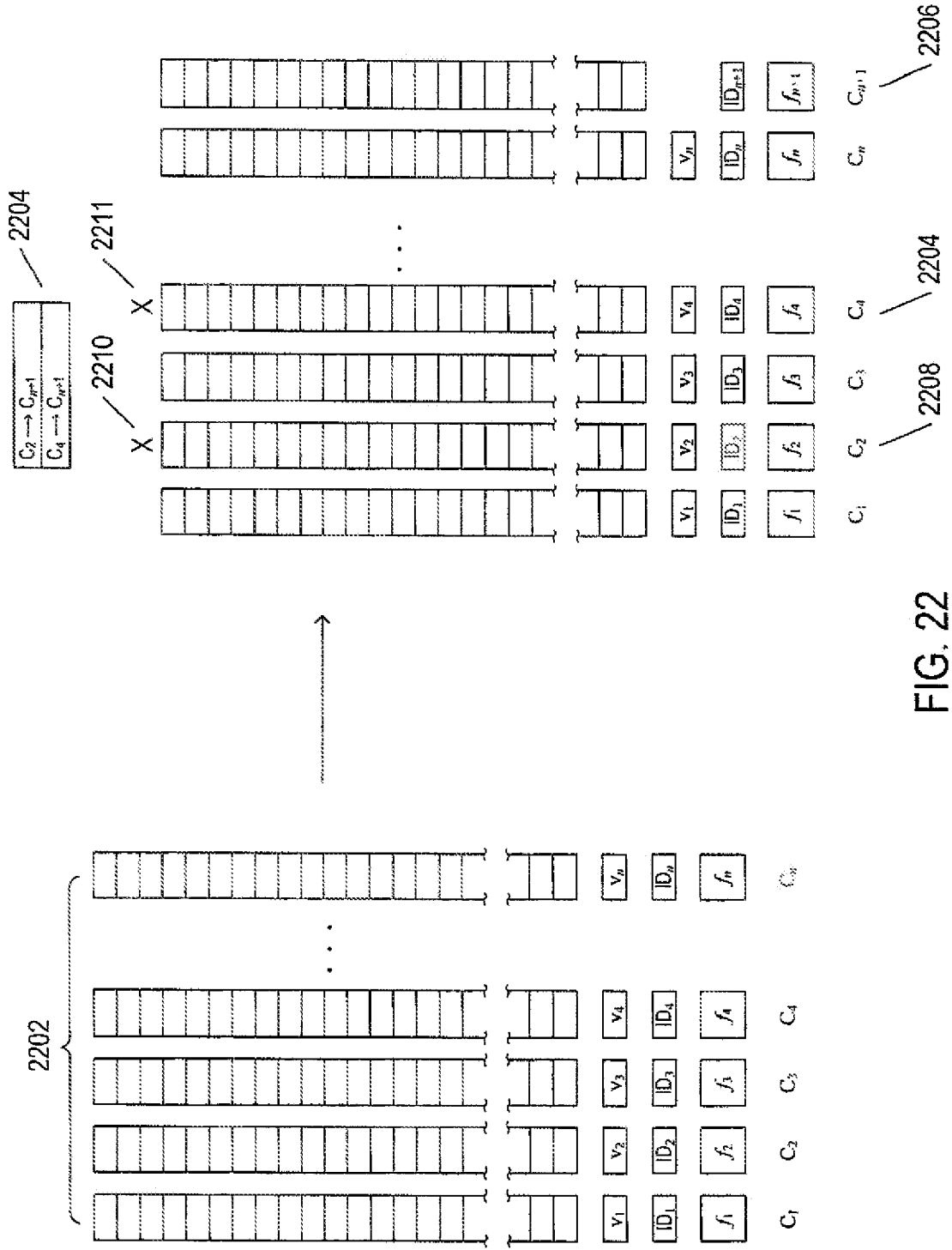
FIG. 22 illustrates a cluster-merge operation.

FIG. 22 illustrates a cluster-merge operation. The left portion of FIG. 22 shows n existing clusters 2202 within the event-message-clustering system. A downstream component requests that clusters $C_2$ and $C_4$ be merged together. As a result, the event-message-clustering system creates two rules 2204 that indicate that event messages initially typed to belong to $C_2$ and $C_4$ now belong to a new cluster $C_{n+1}$. The new cluster 2206 is created to store subsequently received event messages that were previously typed as belonging to clusters $C_2$ and $C_4$ and clusters $C_2$ and $C_4$ 2208-2209 are marked 2210 and 2211, respectively, to indicate that they will no longer be receiving event records and that, after a period of time, may be removed or returned to a pool for reallocation.

Figure 23:
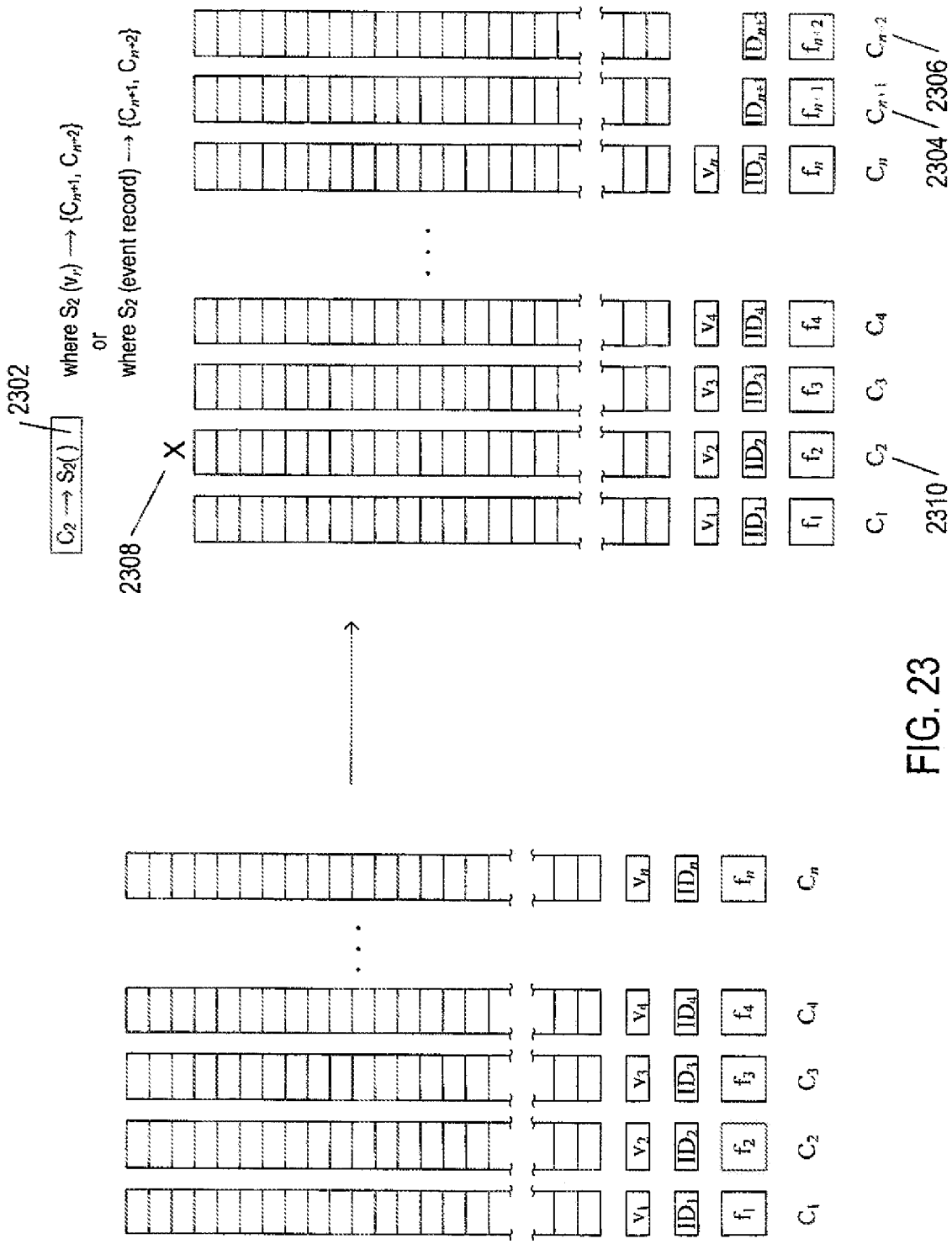
FIG. 23 illustrates a cluster-split operation.

FIG. 23 illustrates a cluster-split operation. In an example shown in FIG. 23, a downstream component requests that a cluster $C_2$ be split into two new clusters. The downstream component additionally provides a function $S_2(\ )$ that takes either a feature vector $v_r$ or an event record, as an argument, and returns an indication of which of two or more clusters to assign an event record. In response to the split request, an event-message-processing system adds a split rule 2302 to a set of stored rules that indicates that an event message assigned to cluster $C_2$ should now be assigned to the cluster returned by a call to the function $S_2(\ )$, where the function $S_2(\ )$ returns either $C_{n+1}$ or $C_{n+2}$. In addition, the event-message-clustering system creates the two new clusters $C_{n+1}$ and $C_{n+2}$ 2304 and 2306. Finally, the event-message-clustering system marks 2308 cluster $C_2$ 2310 as no longer receiving event records and as a candidate for removal or reallocation after some period of time. Note that, in the implementation described in FIGS. 22 and 23, new clusters created as a result of merge and split operations are not associated with feature vectors, since event records are directed to these clusters in two steps, the last of which involves applying a redirection rule, such as the redirection rules 2204 and 2302. In alternative implementations, rather than using CRC functions for computing feature vectors, similarity-preserving hash functions may instead be used, as a result of which distances computed as the magnitude of displacement computations on feature vectors may correspond to the degree of dissimilarity between event messages represented by the feature vectors. In this case, the event-message-clustering system may be able to use adjustable thresholding and newly computed feature vectors associated with merge and split clusters in order to direct event messages to appropriate clusters based on the computed feature vectors as in the logic 2102 discussed above with FIG. 21.

Figure 24:
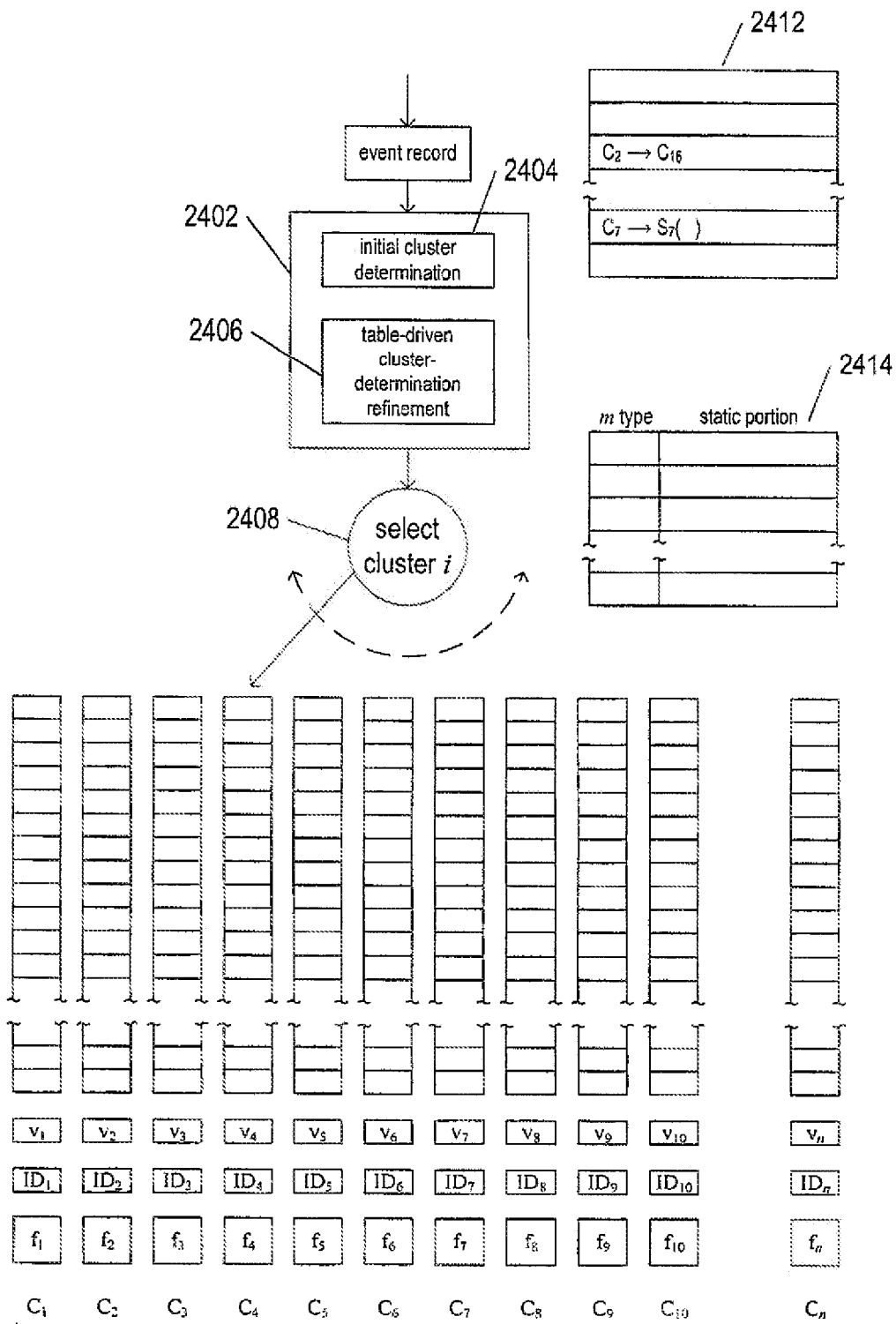
FIG. 24 provides a final illustration of one implementation of the event-message-clustering system to which the current document is directed.

FIG. 24 provides a final illustration of one implementation of the event-message-clustering system to which the current document is directed. FIG. 24 uses similar illustration conventions as used in FIGS. 21 and 14A. The event-message-clustering system includes event-message-processing logic 2402 which includes initial cluster determination logic 2104 and table-driven cluster-determination refinement logic 2406. The initial cluster determination logic 2404 normalizes an input event message, computes a feature vector from the non-parameter tokens within the normalized event message, and uses the feature vector to identify a cluster to which to assign the event message. The table-driven cluster-determination-refinement logic 2406 applies redirection rules in a table of redirection rules in order to carry out any specified redirection of the initial cluster determination that results from previous merge and split operations, as discussed above with reference to FIGS. 22 and 23. The distributor subcomponent 2408 and clusters 2410 are similar to those described with reference to FIG. 21. The event-message-clustering system additionally includes a table of redirection rules 2412 and a table of static portions for each message type 2414 that allow the event-message-clustering system to regenerate original event messages from event records should the original event messages be needed. The table of redirection rules 2412 includes at most one entry for each cluster identifier. A particular cluster may be associated with a single redirection rule or may not be associated with a redirection rule. As discussed above, the redirection rules either indicate to which cluster an event message initially designated as belonging to a first cluster should be forwarded or includes a rule that uses a function to determine to which cluster to forward an event message initially determined to belong to a cluster that was subsequently split. When a redirection rule is applied to a first cluster indication to generate a second cluster identification, the redirection-rule table is again accessed to determine whether there is another redirection rule that may be applied to the second cluster identification. In other words, redirection rules are iteratively applied until a cluster indication is obtained for which there is no redirection rule in the redirection-rule table.

Figure 25:
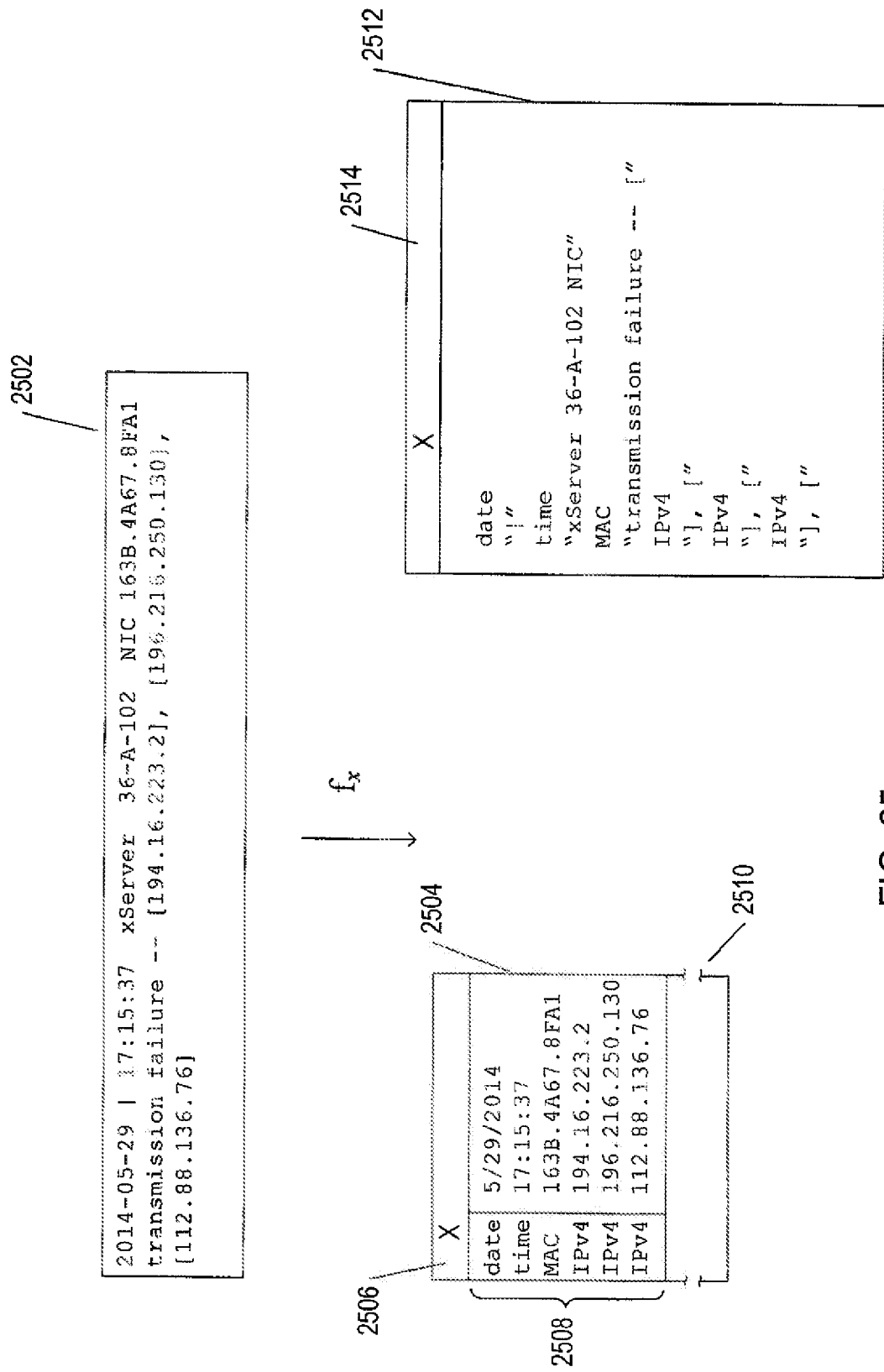
FIG. 25 illustrates a process that extracts parameter values from an event message.

FIG. 25 illustrates a process that extracts parameter values from an event message. As discussed above, each cluster is associated with a parsing function that allows the event-message-clustering system to extract parameter values from the event message. In the example shown in FIG. 25, the function $f_x$ associated with a cluster corresponding to event-message type x, when applied to a received event message of type x 2502, returns an ordered list of parameter values extracted from the message. The sorted list of parameter values can be assembled into an event record 2504 that describes the received event message. The event record may include a header with an indication of the event type 2506, a list of parameter values and associated parameter types 2508, and any additional information 2510 that an event-message-clustering system may choose to associate with event records, including details with regard to from where the event message was received. A representation of the static, non-parameter portion of the message 2512 along with an indication of the message type 2514 may be stored in the static-portion table (2414 in FIG. 24) to allow the original message 2502 to be reconstituted from the event record 2504 generated from the original event message.

Figure 26C:
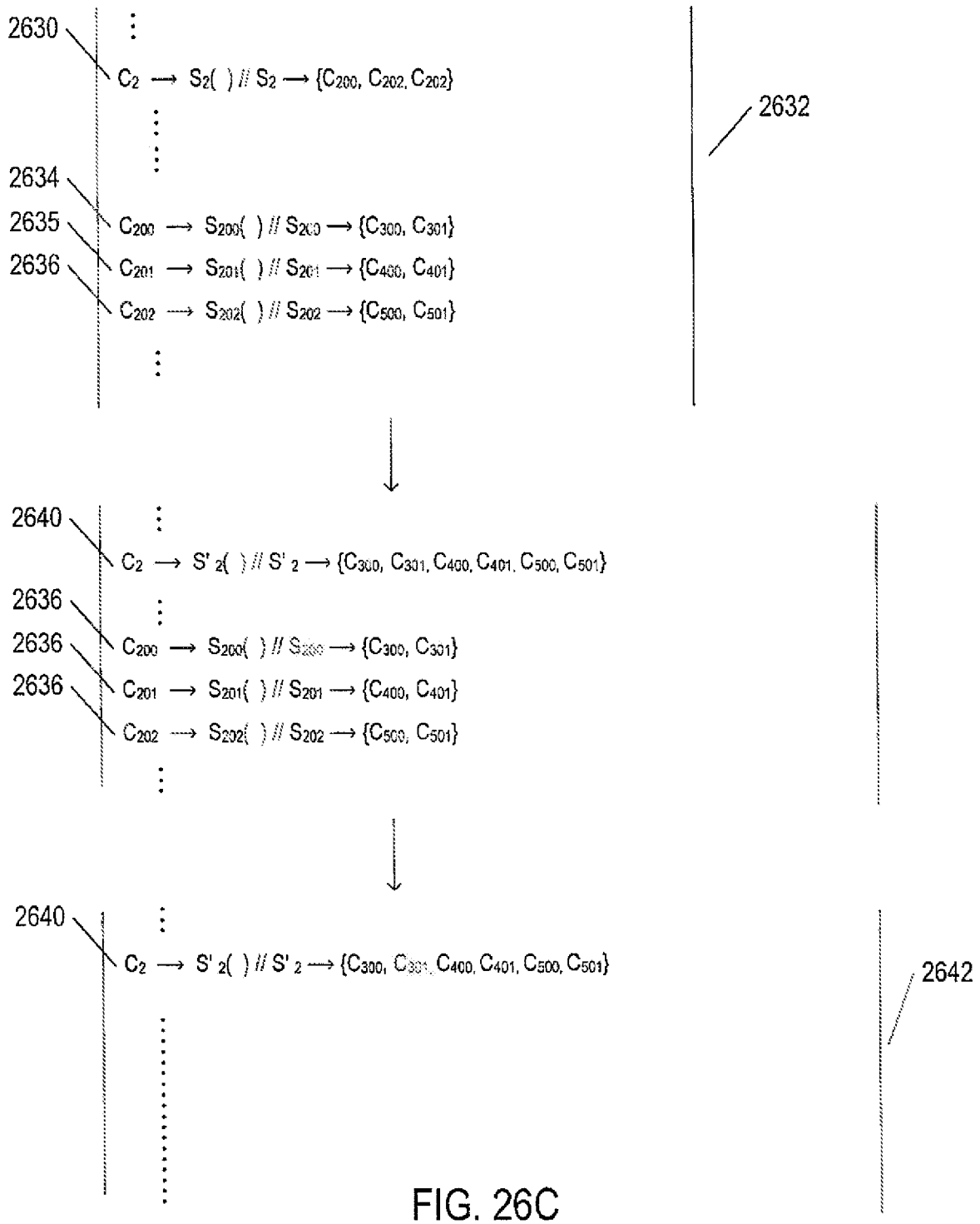

The redirection rules stored by the event-message-clustering system may be periodically analyzed in order to remove and archive unneeded redirection rules. In addition, this analysis may recognize situations in which some number of redirection rules can be replaced, often along with readjustments in the set of clusters managed by the event-message-clustering system. FIGS. 26A-C illustrate examples of editing of the redirection-rule table. In FIG. 26A, the redirection-rule table includes two merge redirection rules 2602 and 2604 and a subsequently added split redirection rule 2606. As it turns out, the split redirection rule 2606 essentially reverses the merge operation represented by the two merge redirection rules 2602 and 2604. In this case, the clusters $C_2$ and $C_{51}$ can be re-established and the two merge redirection rules 2602 and 2604 removed, temporarily leaving the split rule 2606 to allow event messages that were typed as belonging to cluster $C_{100}$ to be retyped during subsequent processing, as shown in the intermediate redirection-rule table 2610. Ultimately, once all event records typed as belonging to cluster $C_{100}$ have been flushed or archived, the split rule 2606 can be removed to completely restore the redirection table with respect to clusters $C_2$ and $C_{51}$ 2612.

FIG. 26B shows another example of redirection-rule-table editing. In this example, cluster $C_2$ was split, as a result of which the split rule 2620 was added to the redirection-rule table. Subsequently, merge rules 2622 that reverse the split operation were added to the redirection-rule table. In this case, the split rule 2620 can be removed and the original cluster $C_2$ re-established, producing an intermediary redirection-rule table 2624. Once all the event records typed as belonging to events $C_{100}$, $C_{101}$, $C_{102}$, and $C_{200}$ have been removed and archived from the event-message-clustering system, the merge rules and redirection rule can be removed to restore the redirection-rule table to its initial condition with respect to cluster $C_2$ 2626.

FIG. 26C shows yet an additional example of redirection-rule table editing. In this example, the cluster $C_2$ was split three ways, resulting in the addition of redirection rule 2630 to the redirection-rule table 2632. Subsequently, each of the new clusters created as a result of the split operation were again split, resulting in the addition of split redirection rules 2634-2636. This set of split redirection rules can be modified by creating a comprehensive split rule 2640 to directly split cluster $C_2$ into the six clusters $C_{300}$, $C_{301}$, $C_{400}$, $C_{401}$, $C_{500}$, and $C_{501}$. The three split redirection rules 2634, 2635, and 2636 are maintained until all event records typed as belonging to clusters $C_{200}$, $C_{201}$, and $C_{202}$ are removed and archived. Then, they can be removed leaving only the comprehensive split redirection rule 2640 in the redirection-rule table 2642. FIGS. 26A-C illustrate a few simple examples of redirection-rule-table editing and associated cluster reorganization. There are many additional, more complex examples in which chains and cycles of redirection rules can be removed from the redirection table. In addition, clusters can be periodically re-indexed in order to compress the range of active cluster indexes.

Figure 27A:
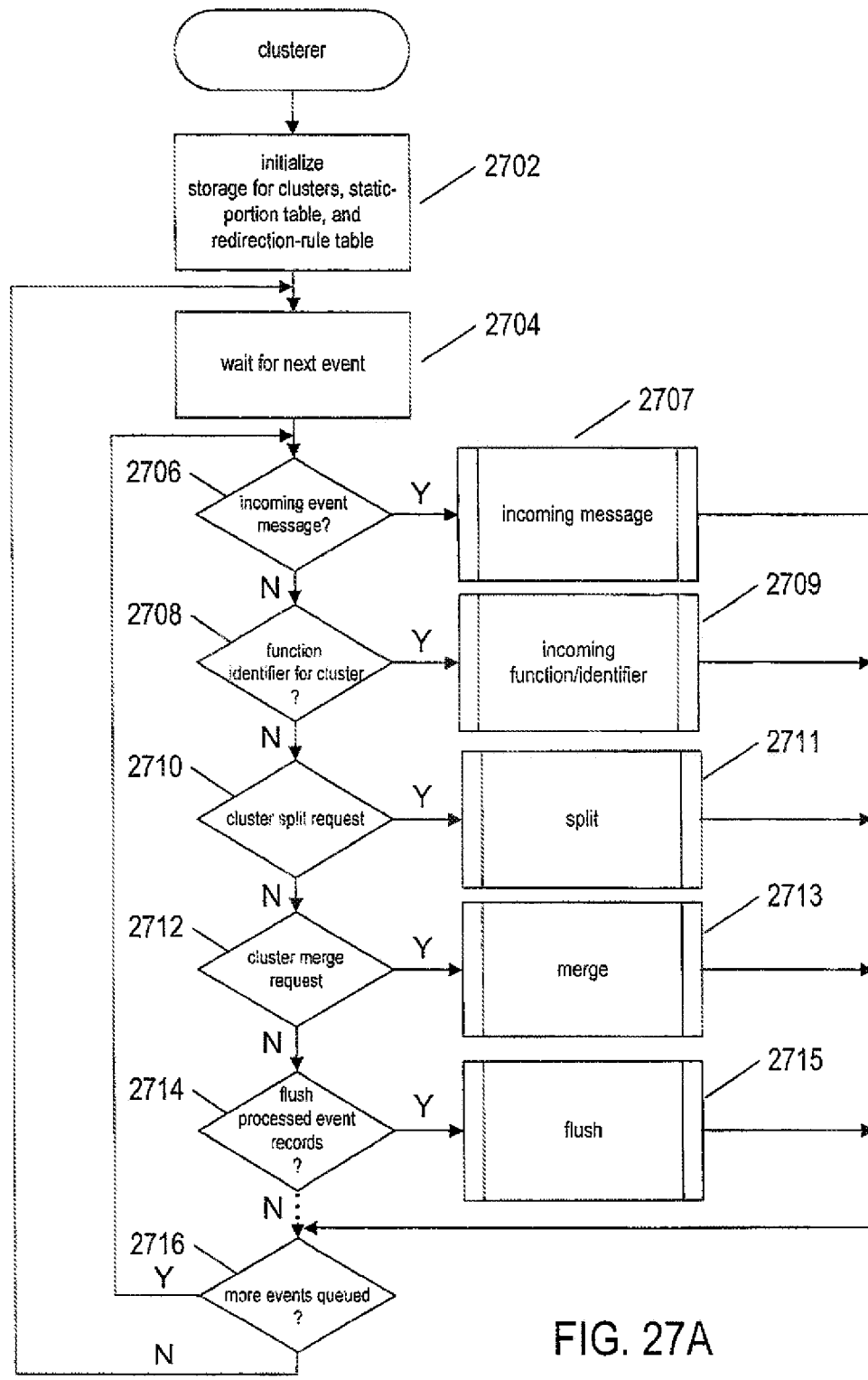
FIGS. 27A-G provide control-flow diagrams that illustrate one implementation of the event-message-clustering system and methods used within the event-message-clustering system to which the current document is directed.

FIGS. 27A-G provide control-flow diagrams that illustrate one implementation of the event-message-clustering system and methods used within the event-message-clustering system to which the current document is directed. FIG. 27A shows an event loop that continuously executes within the event-message-clustering system to process event-message-related events. In step 2702, the event-message-clustering system initializes storage for clusters, the static-portion table, and the redirection-rule table discussed above with reference to FIG. 24. Then, in step 2704, the event-message-clustering system waits for a next event to occur. When the next event occurs, the type of event is determined in a series of conditional steps 2706, 2708, 2710, 2712, and 2714. Once the event is handled, then, in step 2716, the event handler determines whether or not there are more events queued for handling. If so, control returns to step 2706: otherwise, control returns to step 2704. When the next-occurring event represents receipt of a next incoming event message, as determined in step 2706, the routine "incoming message" is called in step 2707. When the next-occurring event is receipt of a function and identifier for a cluster, as determined in step 2708, the routine "incoming function/identifier" is called in step 2709. When the next-occurring event is a cluster-split request, as determined in step 2710, the routine "split" is called in step 2711. When the next-occurring event is a cluster merge request, as determined in step 2712, the routine "merge" is called in step 2713. When the next-occurring event is a request to flush processed event records, as determined in step 2714, the routine "flush" is called in step 2715.

In general, the event-message-clustering system continuously executes and handles any events related to event messages that occur within a distributed computing system. As indicated by ellipses in FIG. 27A, there are many additional types of events that may occur. Calls to handlers that handle certain of the fully-automated clustering-related events that may occur are shown in FIG. 27A. The handlers are described below with reference to FIGS. 27B-G. However, may other events may occur and may be handled by various implementations of the event-message-clustering system. As one example, certain implementations support interaction with system administrators and other users. In these implementations, an interface provided by the event-message-clustering system on a system-administration computer or on remote systems allows system administrators and other authorized users to view event logs, edit event logs, archive event logs, monitor incoming event records in real time, and to issue commands to the event-message-clustering system. These commands include, in certain implementations, commands that direct the event-message-clustering system to merge two or more clusters into a single cluster, split a particular cluster into multiple clusters, add a new cluster, the new cluster defined by a feature vector, cluster identifier, and parsing function provided by the user, remove an existing cluster, and modify an existing cluster. In addition, in certain implementations, a user can identify types of classes of event messages that should be ignored and not processed and logged by the event-message-clustering system. In these systems, initial clustering may be driven largely by manual input from a system administrator and may, in fact, be manually driven over the entire course of event-record logging. For example, a manual configuration may direct event messages to a single cluster, initially, after inspection of the contents of which a system administrator my direct split operations and add additional clusters through the administration interface. Alternatively, a system administrator may manually specify initial clusters and monitor event-record logging for a sufficient time to ensure that the automated clustering has a useful and accurate set of initial clusters, after which automated clustering may increasingly assume responsibility for cluster management and event logging.

Figure 27B:
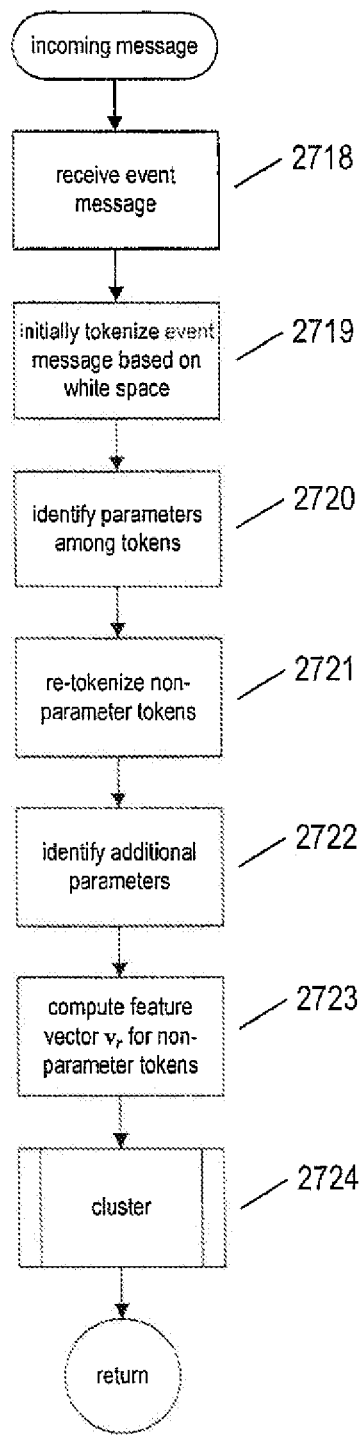

FIG. 27B provides a control-flow diagram for the routine "incoming message" called in step 2707 of FIG. 27A. In step 2718, the incoming event message is received. In step 2719, the event message is initially tokenized based on non-printing characters, as discussed above with reference to FIG. 15. In step 2720, a first pass of parameter identification is carried out on the tokens produced in step 2719. In step 2721, the non-parameter tokens may be re-tokenized to remove punctuation and characters used for separation purposes as well as to remove such characters from the leading and trailing extremities of non-parameter tokens. In step 2722, a second pass of parameter identification is carried out in order to attempt to identify additional parameter values among the non-parameter tokens. In step 2723, a feature vector $v_r$ is computed based on the remaining non-parameter tokens. Computation of feature vectors is discussed with reference to FIGS. 16-18, above. Finally, in step 2724, the routine "cluster" is called.

Figure 27C:
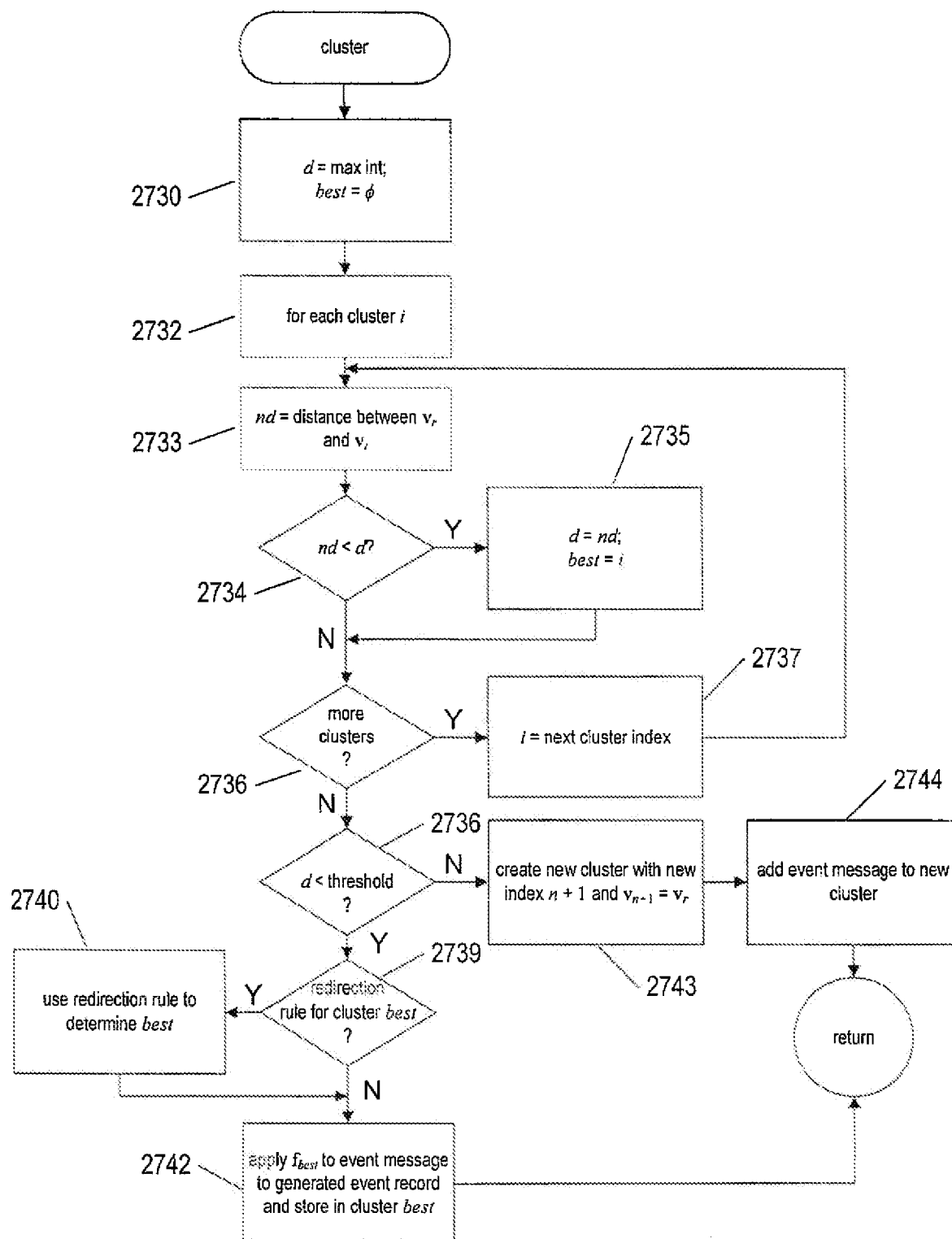

FIG. 27C provides a control-flow diagram for the routine "cluster" called in step 2724 of FIG. 27B. In step 2730, local variables d and best are set to a large number and to null, respectively. Then, in the for-loop of steps 2732-2737, each currently existing cluster identified by cluster index i is considered. In step 2733, the local variable nd is set to the computed distance between the event message represented by the feature vector $v_r$ and the feature vector $v_r$ associated with the currently considered cluster i. When nd is less than d, as determined in step 2734, the currently considered cluster is the best candidate cluster to which to assign the recently received event message. In this case, d is set to nd and best is set to i, in step 2735, in order to store the fact that a new best candidate cluster has been found. When there are more clusters to consider, as determined in step 2736, index i is set to the next cluster index in step 2737 and control returns to the top of the for-loop, in step 2733. When the value stored in local variable d is less than a threshold value, as determined in step 2738, then the redirection-rule table is checked to see if there is a redirection rule for the cluster identified by the contents of local variable best. When there is a redirection rule for this cluster, as determined in step 2739, then the redirection rule is used to determine a final value for best, the index of the cluster to which to assign the recently received event message, in step 2740. As stated above, whenever a redirection rule is applied to generate a new value for best, the redirection-rule table needs to again be accessed in order to determine whether there is a redirection rule for the cluster referenced by the new value of best and, when there is a redirection rule for the cluster referenced by the new value of best, the process continues until best references a cluster for which there is no redirection rule. In step 2742, the parsing function associated with the cluster identified by the contents of local variable best is used to process the recently received event message to generate an event record and the event record is then in the cluster identified by the contents of the local variable best, in step 2742. When d is not less than a threshold value, as determined in step 2738, then a new cluster is created and the feature vector $v_r$ computed for the recently received event message is associated with the new cluster, in step 2743. In step 2744, the recently received event message is added to the new cluster.

Figure 27D:
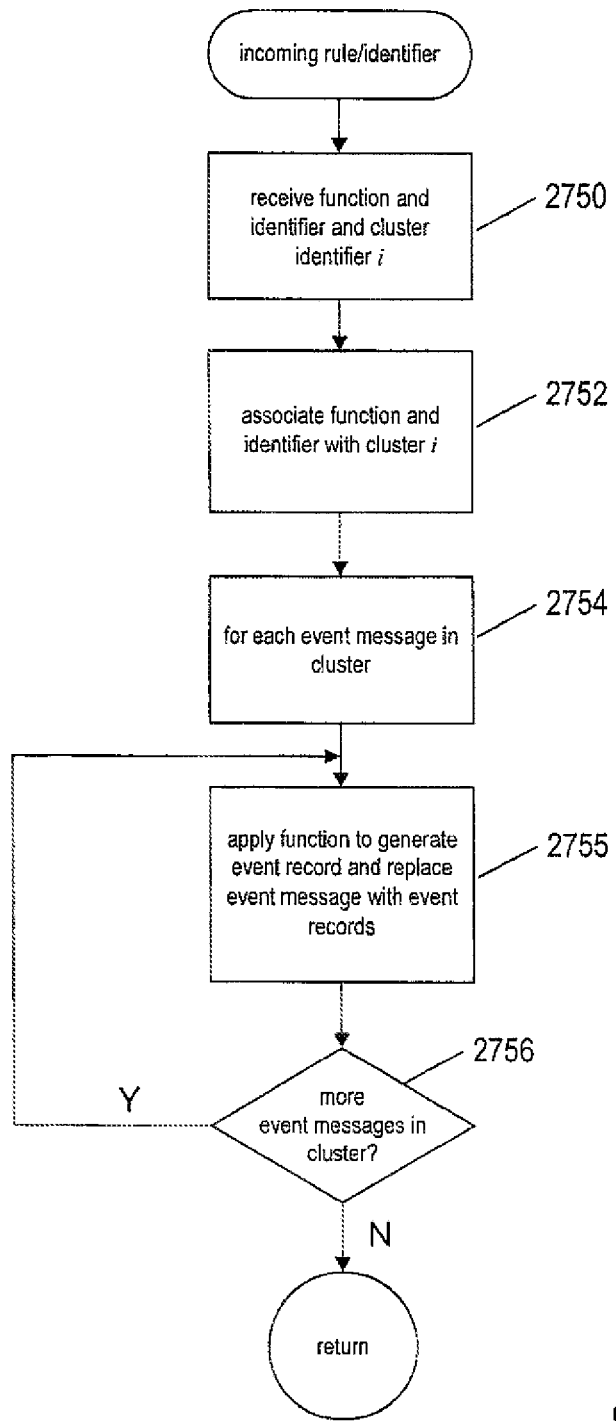

FIG. 27D provides a control-flow diagram for the routine "incoming rule/identifier," called in step 2709 of FIG. 27A. In step 2750, the routine receives a parsing function and cluster identifier from a downstream event-message analyzing component as well as a second identifier i that can be used to identify the cluster for which the new identifier and parsing function is provided. In step 2752, the routine associates the parsing function and new identifier with the cluster i. Then, in the for-loop of steps 2754-2756, the routine "incoming rule/identifier" applies the new function to the event messages associated with the cluster to transform the event messages into event records.

Figure 27E:
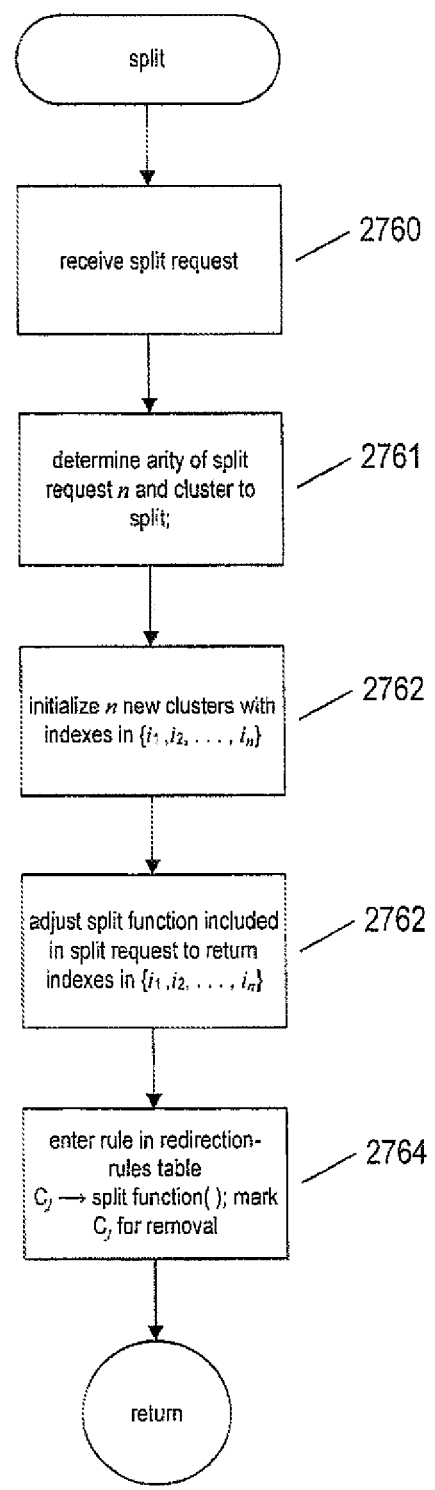

FIG. 27E provides a control-flow diagram for the routine "split," called in step 2711 in FIG. 27A. In step 2760, the routine "split" receives a split request from a downstream event-message-analysis system. In step 2761, the routine "split" determines the arity of the split request, n, and the cluster to be split from the split request. In step 2762, the routine "split" initializes n new clusters with a set of corresponding cluster indices. In step 2763, the routine "split" adjusts the split function included in the split request to return indexes for the newly created clusters in step 2763. Finally, in step 2764, the routine "split" enters a redirection rule in the redirection-rules table and marks the cluster being split for subsequent removal.

Figure 27F:
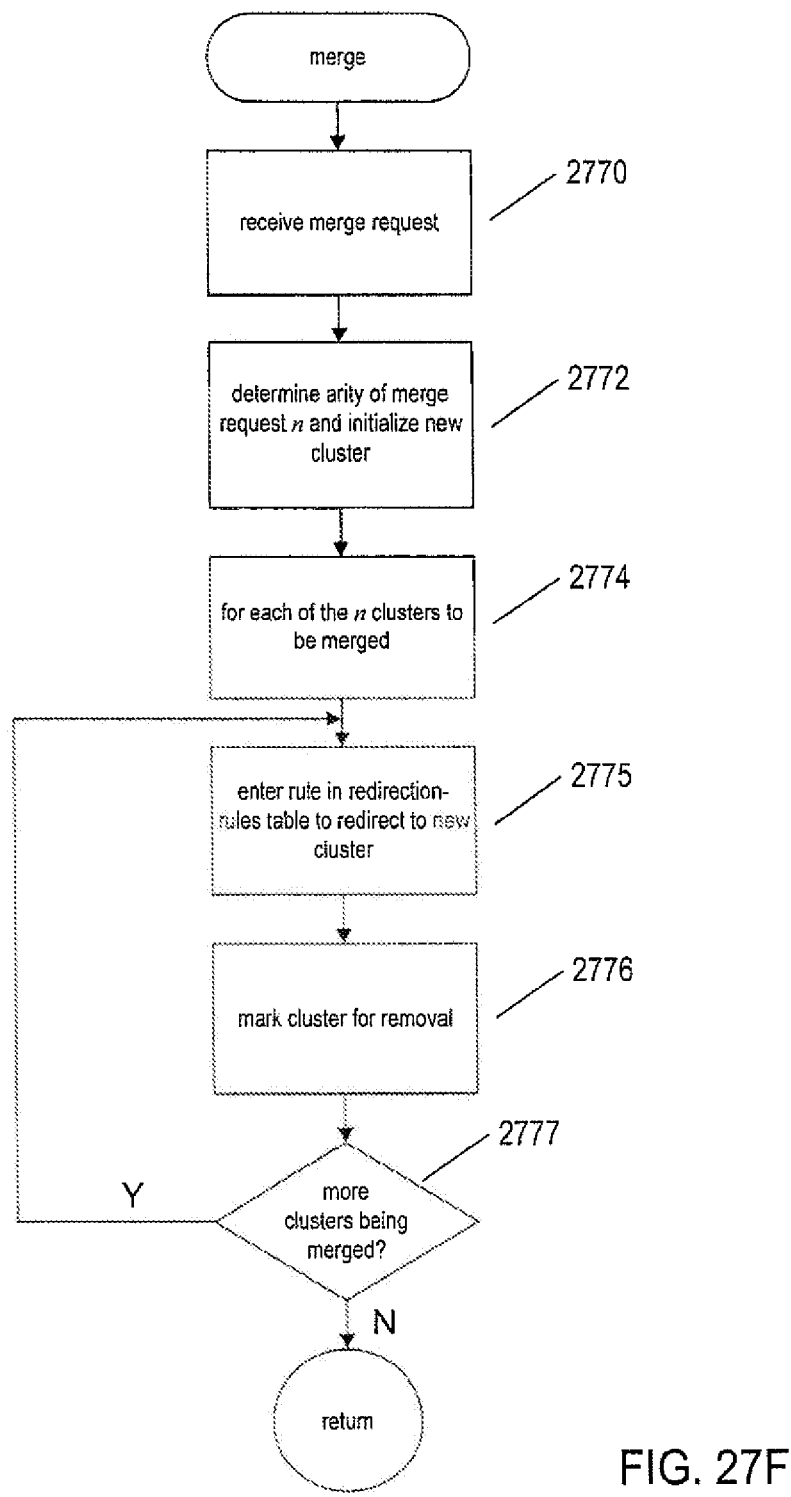

FIG. 27F provides a control-flow diagram for the routine "merge." In step 2770, the routine "merge" receives a merge request. In step 2772, the routine "merge" determines the arity of the merge request, n, and initializes a new cluster to receive event messages that would have otherwise gone to the clusters being merged. Then, in the for-loop of steps 2774-2777, the routine "merge" enters a merge redirection rule in the redirection-rules table to direct event messages that would have been directed to the clusters being merged to the new cluster. The currently considered cluster that is being merged is marked for removal in step 2776. For both merge and split operations, various types of error checking are carried out to ensure that inconsistent redirection rules are not added to the redirection-rule table. For example, when a cluster is already associated with a redirection rule, a split or merge operation directed to the cluster is considered to be an error, in many implementations.

Figure 27G:
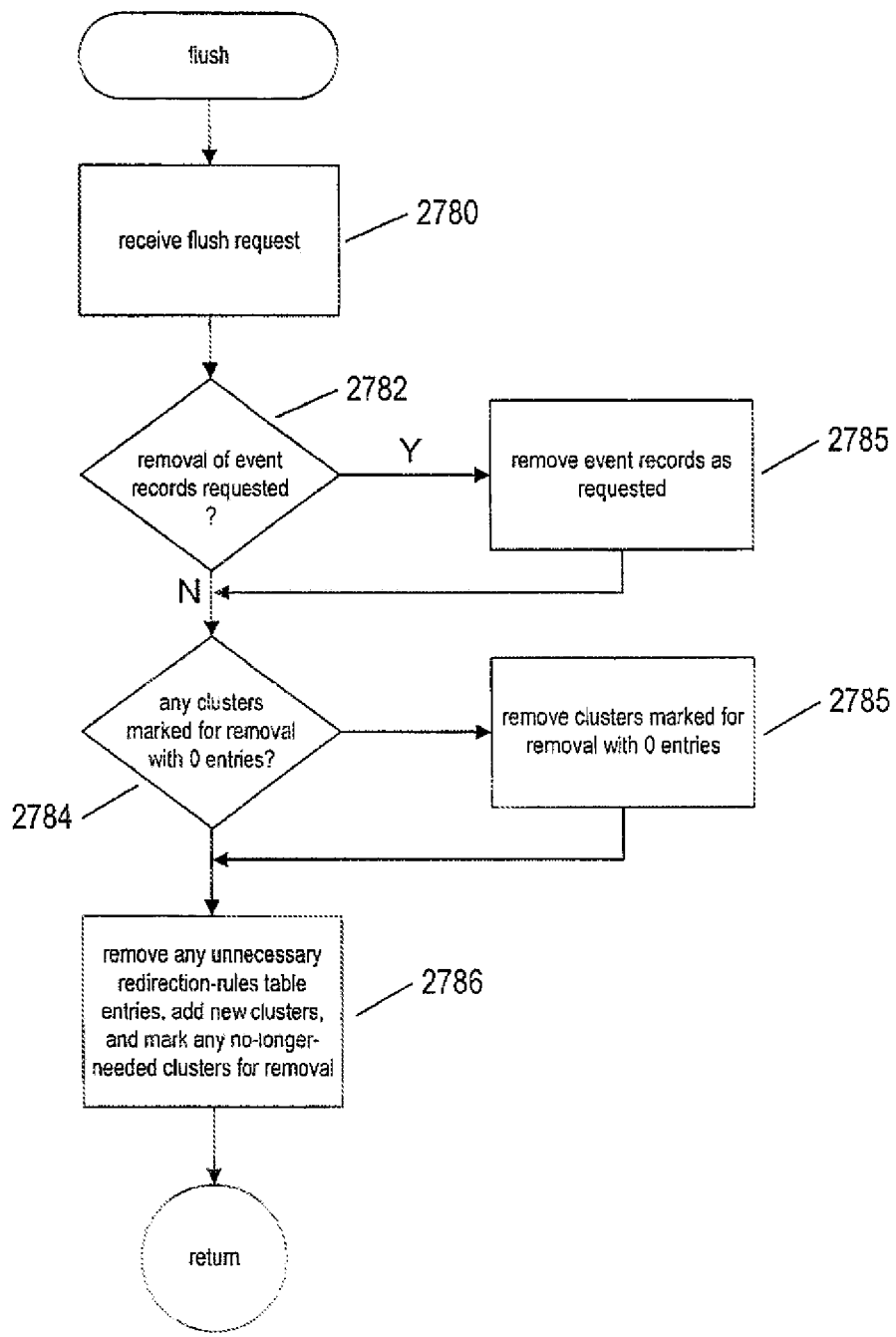

FIG. 27G provides a control-flow diagram for the routine "flush" called in step 2715 of FIG. 27A. In step 2780, the routine "flush" receives a flush request. When the flush request includes a request to remove event records, as determined in step 2782, then, in step 2783, the routine "flush" removes the event records from clusters as requested, in certain implementations archiving the removed event records or transferring the removed event records to another entity. Following event-record removal, the routine "flush" determines whether any clusters marked for removal now have no entries, in step 2784. When there are clusters marked for removal with no entries, those clusters are removed and potentially returned to a cluster pool for reallocation in step 2785. Finally, in step 2786, the redirection rule table is analyzed to remove unnecessary redirection rules, potentially adding new clusters and marking no longer needed clusters for removal as discussed above with reference to FIGS. 27A-C. The routine "flush" may be periodically called by a flush-timer expiration.

Parsing-Function Generation and Cluster Maintenance

One approach to identifying variables in event messages as well as to generating parsing functions for event-message clusters is to use regular expressions. FIG. 28A illustrates regular expressions corresponding to various types of formats in which dates may be encoded in event messages. In FIG. 28A, examples of numerous date formats are shown in a left column 2802 and corresponding regular expressions that can be used to identify substrings of symbols within a symbol string representing dates in the formats are provided in a right-hand column 2804. Regular expressions are generally symbolic encodings of search patterns that can be applied to text in order to identify substrings. The details regarding various regular-expression syntaxes can be found in numerous references. Regular expressions are widely used in text-processing programs and are included in many modern programming languages, including Perl, Ruby, Python, and C++11.

In one type of symbolic encoding of dates, a date 2806 can be expressed as a three-character indication of the month, followed by a space, followed by a one-digit or two-digit representation of the day of the month, followed by another space, and finally followed by a four-digit representation of the year. The regular expression 2808 represents a search pattern that can be used to find symbolic encodings of dates, in the format described with reference to date 2806 in FIG. 28A, in text and symbol strings. The parenthesized list of vertical-bar-delimited three-character month specifications 2810 indicates that any of these three-character month specifications may occur as the first part of the symbolic encoding of a date. The "is" 2811 indicates a single whitespace character, the bracketed digit range 2812 indicates that one of the digits 0, 1, 2, or 3 may next occur, but the question mark 2813 indicates that the digit may or may not be present, the "/d" 2814 indicates that a single digit next occurs, the substring "20" 2815 indicates that the digits 2 and 0 next follow, and the pair of "/d" substrings 2816 indicate that two additional digits next occur.

In general, there is not a unique one-to-one mapping between date formats and regular expressions. Many different regular expressions can be developed to represent a search pattern for any particular data-encoding symbol format. Furthermore, more complex regular expressions can be devised to more exactly specify the substrings that can represent a particular date format. For example, regular expression 2808 would identify "Feb. 31, 2014" within a symbol string as a date, but, of course, February 31$^{st}$ is not a valid date. A more complicated regular expression can be devised to exclude such invalid dates.

FIG. 28B illustrates construction of generalized regular expressions that identify two or more types of date formats. For example, regular expression 2820 can be used to identify substrings representing dates encoded in either of the first and third date formats shown in the left-hand column 2802 of FIG. 28A. These two different types of date formats are similar, differing in that the month is fully spelled out in the third format 2822 in FIG. 28A, rather than abbreviated, as in the first format 2806 and the third format includes a comma following the day, while the first format does not. Regular expression 2824 can be used to identify dates encoded in any of the first three formats 2806, 2826, and 2822 illustrated by example in FIG. 28A. A generic regular expression can be developed to recognize dates encoded in any of a very large number of different possible date-encoding formats. However, in general, the more different formats recognized by a regular expression, the larger and more complex the regular expression. In many cases, it is more computationally efficient to develop a number of regular expressions to recognize a corresponding number of classes of date formats and to apply the number of regular expressions iteratively to text in order to identify all the possible dates within the text. The methods described below employ table-driven searching in which regular expressions are successively extracted from a table and applied to an event message in order to identify data encoded in particular formats associated with particular data types.

FIG. 28C illustrates an example of the use of regular expressions in text processing. First, as shown by expression 2830 in FIG. 28C, it is well known that a regular expression 2832 can be transformed into a non-deterministic finite automata 2834. A non-deterministic finite automata can, in turn, be transformed into a deterministic finite automata 2836, and deterministic finite automata 2836 can be implemented as a computer routine 2838. In other words, a computer routine can be developed to recognize substrings within text specified by any given regular expression. These computer routines can be embedded within text-processing routines, many examples of which can be found in text-processing applications and included in programming languages. One example is a routine "find" that returns the indices of substrings within an input string identified by an input regular expression. FIG. 28C shows a declaration for the function "find" 2840. The function returns the number of substrings 2842 identified within an input string 2844 that correspond to an input regular expression 2846 and additionally returns, in an array of indices 2848, the indices of the starting positions within the string of each identified substring corresponding to the input regular expression. For example, when the input regular expression indicates a succession of three digits 2850, input of the string 2852 to the function "find" returns the number 2 (2854 in FIG. 28C) and the indices 2856 of two three-digit substrings. The initial symbols, or digits, of the two three-digit substrings are shown by arrows 2858-2859 in FIG. 28C.

FIG. 28D shows a representation of the deterministic finite automata 2860 corresponding to the regular expression 2850 in the example shown in FIG. 28C. The deterministic finite automata is a state-transition diagram that includes an initial state 2862, a non-digit state 2864, and three digit states, the last 2866 of which represents identification of a three-digit substring. Arrows represent transitions between states that occur on input or consideration of a next symbol of a symbol string. The identification of a three-digit substring can be recorded upon reaching the final digit state 2866.

Figure 29A:
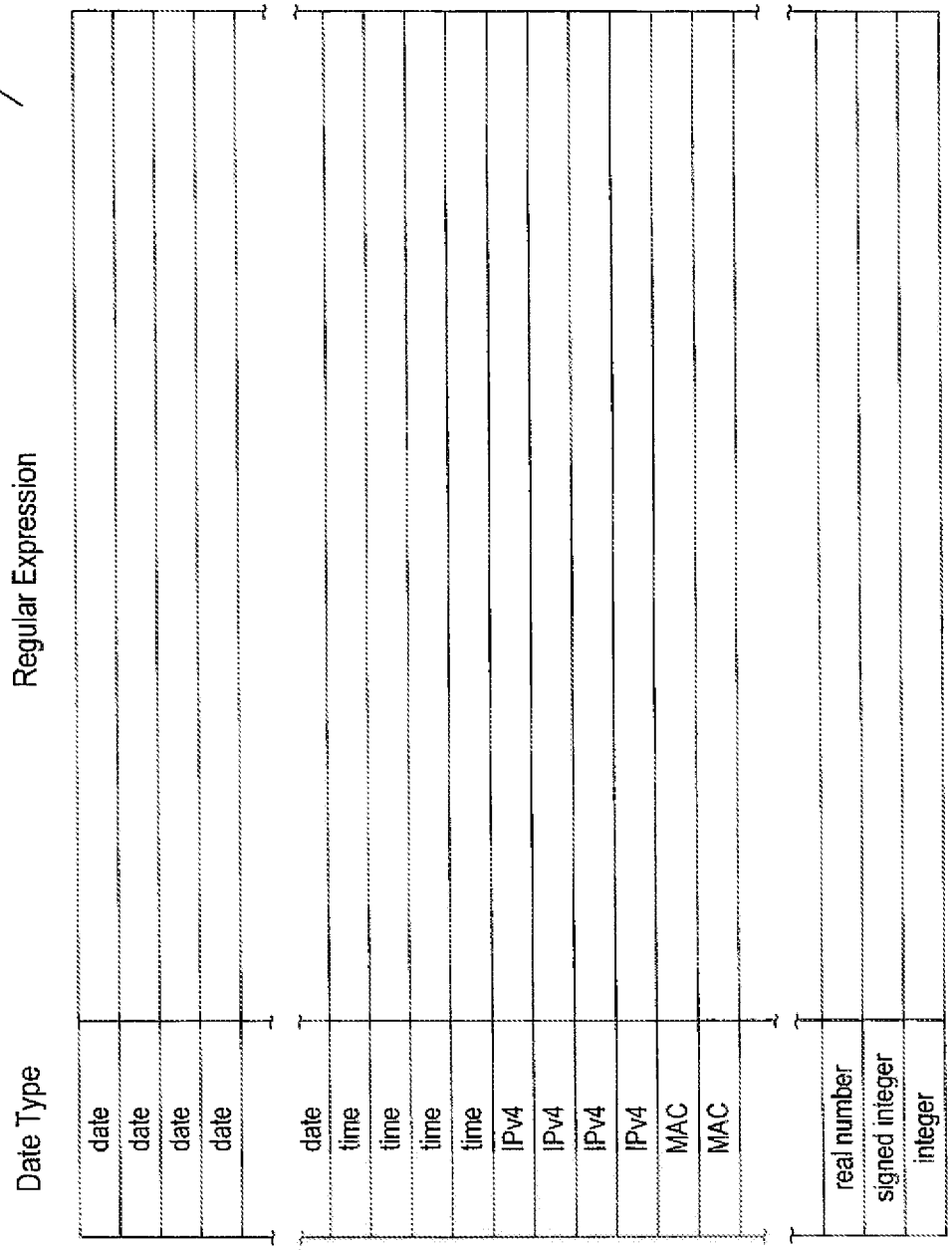
FIGS. 29A-C illustrate implementation of a regular-expression-based variable-finding subsystem.
Figure 29B:
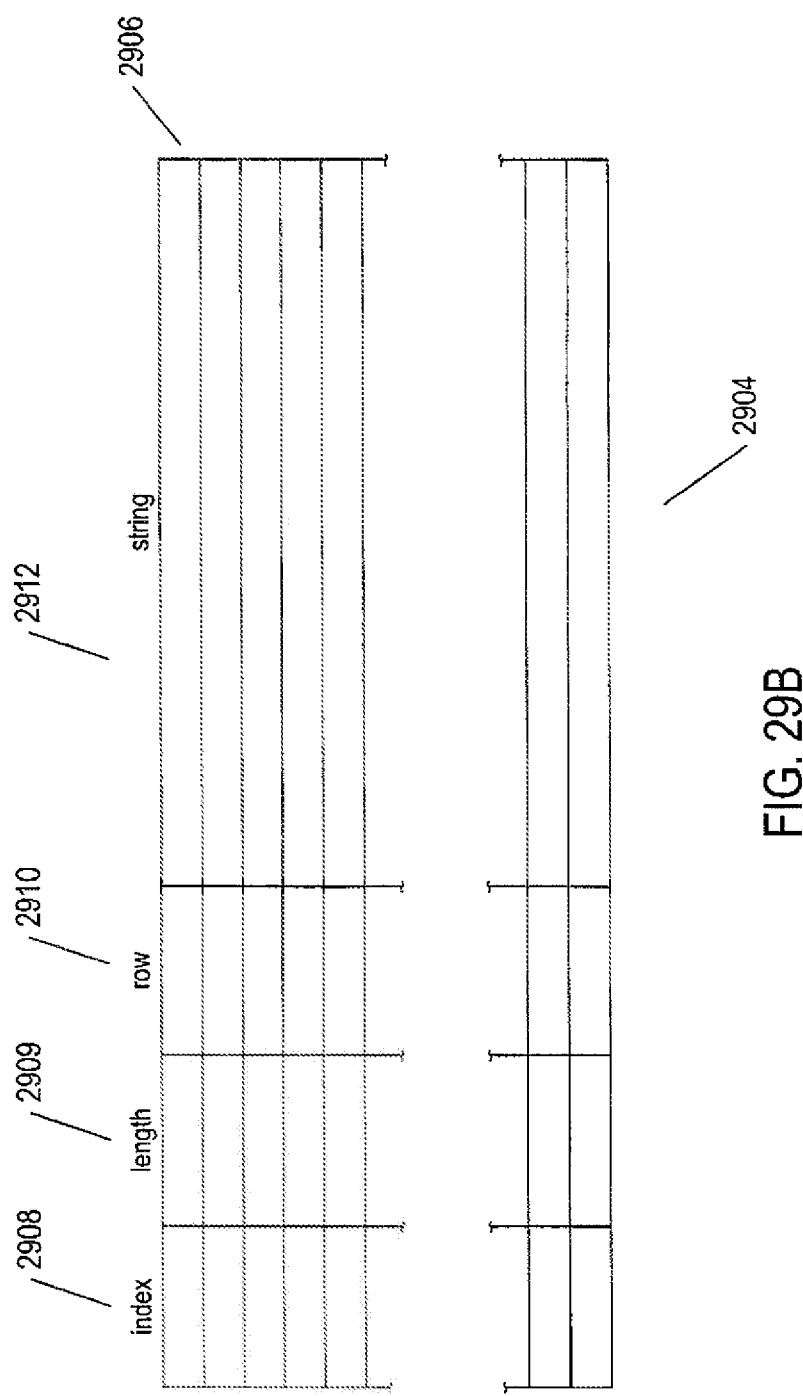
Figure 29C:
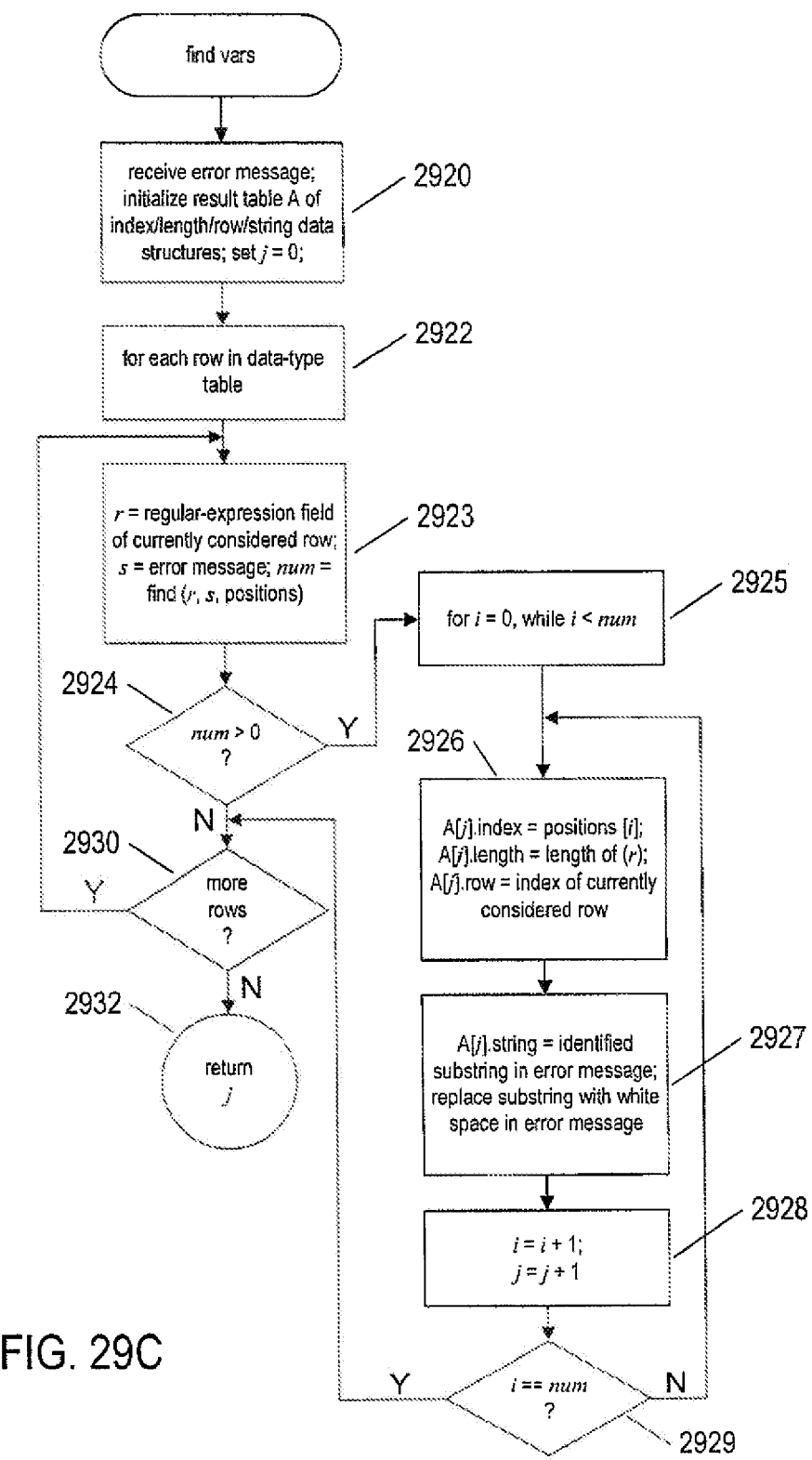

Regular expressions can be used, in one implementation of the currently described event-message-clustering subsystem, to identify variables within an event message. FIGS. 29A-C illustrate implementation of a regular-expression-based variable-finding subsystem. FIG. 29A shows a table of data-type/regular-expression pairs 2902 that provides a basis for variable identification. For each format or class of formats for each different data type of variables in event messages, a regular expression is stored in the table. In general, the table is ordered, with more specific data types occurring before, or higher in the table than, more generic encoded data. For example, date and time formats are generally readily recognized in text and are not ambiguous with respect to formats for other data types, and therefore occur higher in the table than more generic data types, such as integers. FIG. 29B shows a results table in which results of the variable-identifying subsystem are stored for a particular processed event message. Each row in the results table 2904, such as row 2906, represents an identified variable within an event message. The variable is characterized by an index of the starting symbol of the variable 2908, the length of the symbol string corresponding to the variable 2909, the row of the data-type table (2902 in FIG. 29A) corresponding to the data type of the variable 2910, and the substring that encodes the variable within the event message 2912.

FIG. 29C provides a control-flow diagram for a routine "find vars" that identifies variables within an event message. In step 2920, the routine "find vars" receives an event message to process, initializes a result table A, such as result table 2904 shown in FIG. 29B, and sets a local variable j to 0. Then, in the for-loop of steps 2922-2930, the regular expressions in the data-type table (2902 in FIG. 29A) are successively applied to the received event message. In step 2923, a next regular expression is extracted from the data-type table and used as input to the above-described "find" function. When the number returned by the function "find" is greater than 0, as determined in step 2924, then all identified occurrences of the data type corresponding to the regular expression are entered into the result table in the inner for-loop of steps 2925-2929. Upon completion of the outer for-loop of steps 2922-2930, the value stored in variable j is returned, in step 2932, as the number of variables found in the event message. Note that, once a variable is identified and recorded in the result table, the symbol string corresponding to the variable is replaced with white space in the event message, in step 2927, preventing identification of overlapping variables within the event message. It is for this reason that the data-type/regular-expression pairs are ordered by descending specificity in the data-type table.

Figures 30A, 30B:
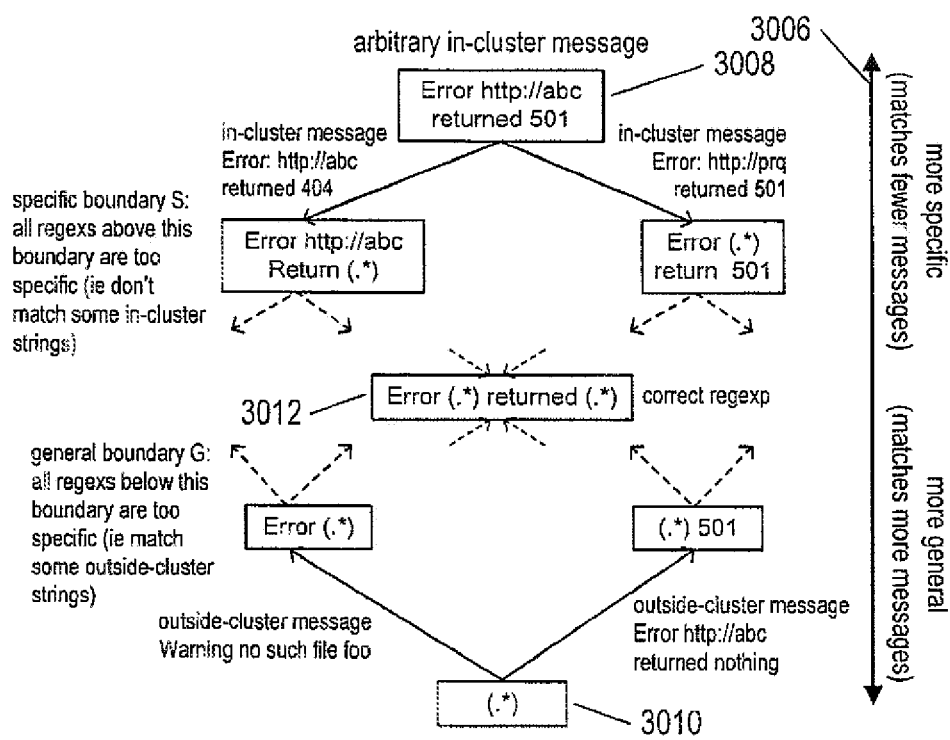
FIGS. 30A-B illustrate a general approach to generating a parsing function for an event-message cluster.

FIGS. 30A-B illustrate a general approach to generating a parsing function for an event-message cluster. FIG. 30A shows four very short event messages of a particular event-message cluster 3002-33005. FIG. 30B illustrates a variety of different regular-expression-based parsing functions for the event-message cluster positioned along a vertical dimension of specificity 3006. The most specific parsing function 3008 is the literal string corresponding to the first event message 3002. This parsing function would be very effective for recognizing the first event message, but would fail to recognize any of the other event messages in the cluster. Thus, parsing function 3008 is far too specific to be used as the parsing function for a cluster containing the four event messages. By contrast, the most generalized parsing function 3020 would return success for all four of the event messages 3002-3005 in the cluster. However, this generic parsing function would return success when applied to any event message. A useful parsing function for the cluster 3012 represents a balance, in specificity, between the most general parsing function 3010 and the most specific parsing function 3008. In the useful parsing function 3012, a regular expression that can be applied to event messages, the common static portions of the event messages within the cluster are represented by literals, including the substring "Error" and the substring "returned." The variable substrings within the event messages are represented, in the regular expression 3012, by the regular sub-expression "(.*)," which matches any substring, including an empty substring. Finding an appropriate regular-expression-based parsing function for a cluster of event messages thus involves generating a regular expression that represents a specificity balance and that can be used to extract the variable portions of the event messages of a cluster.

Figure 31A:
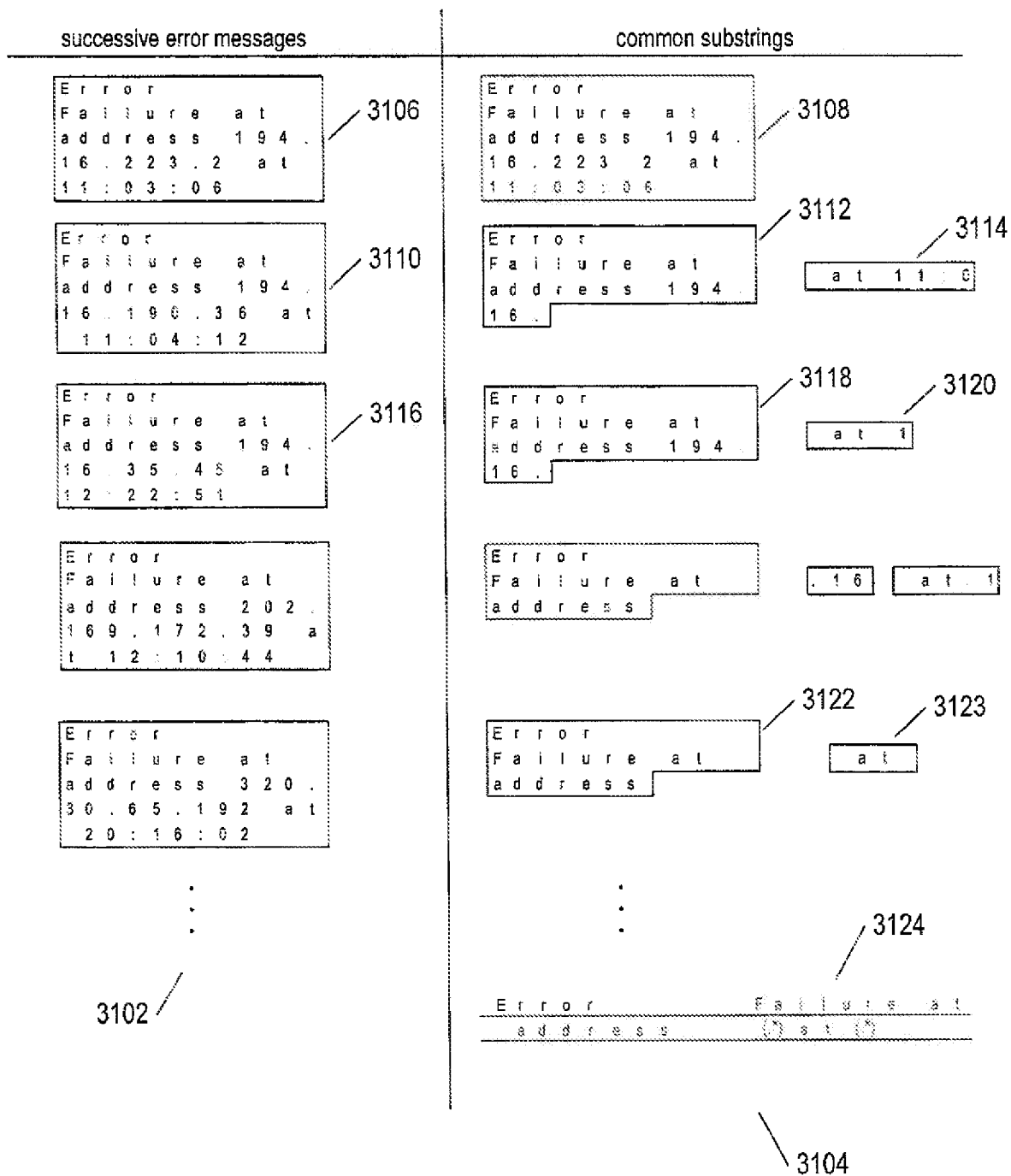
FIGS. 31A-C illustrate a computational method for identifying the static or conserved substrings within a cluster of event messages.
Figure 31B:
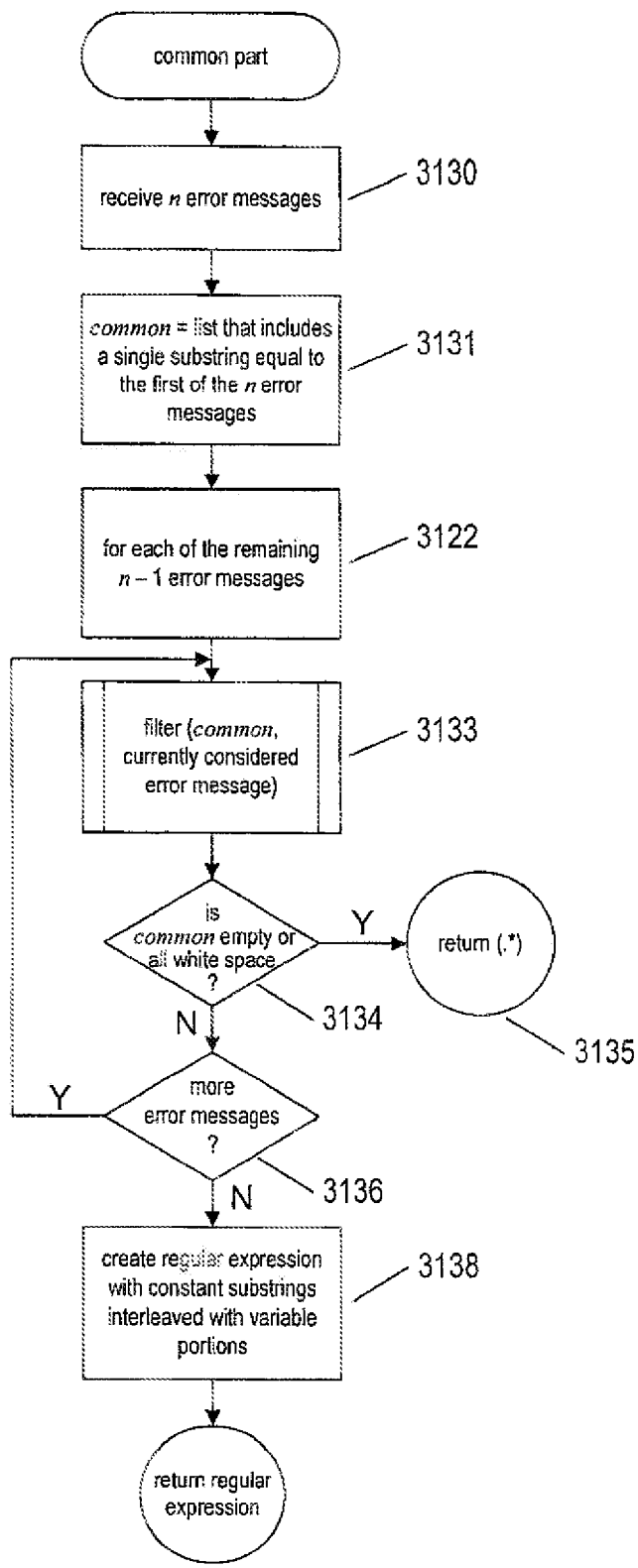
Figure 31C:
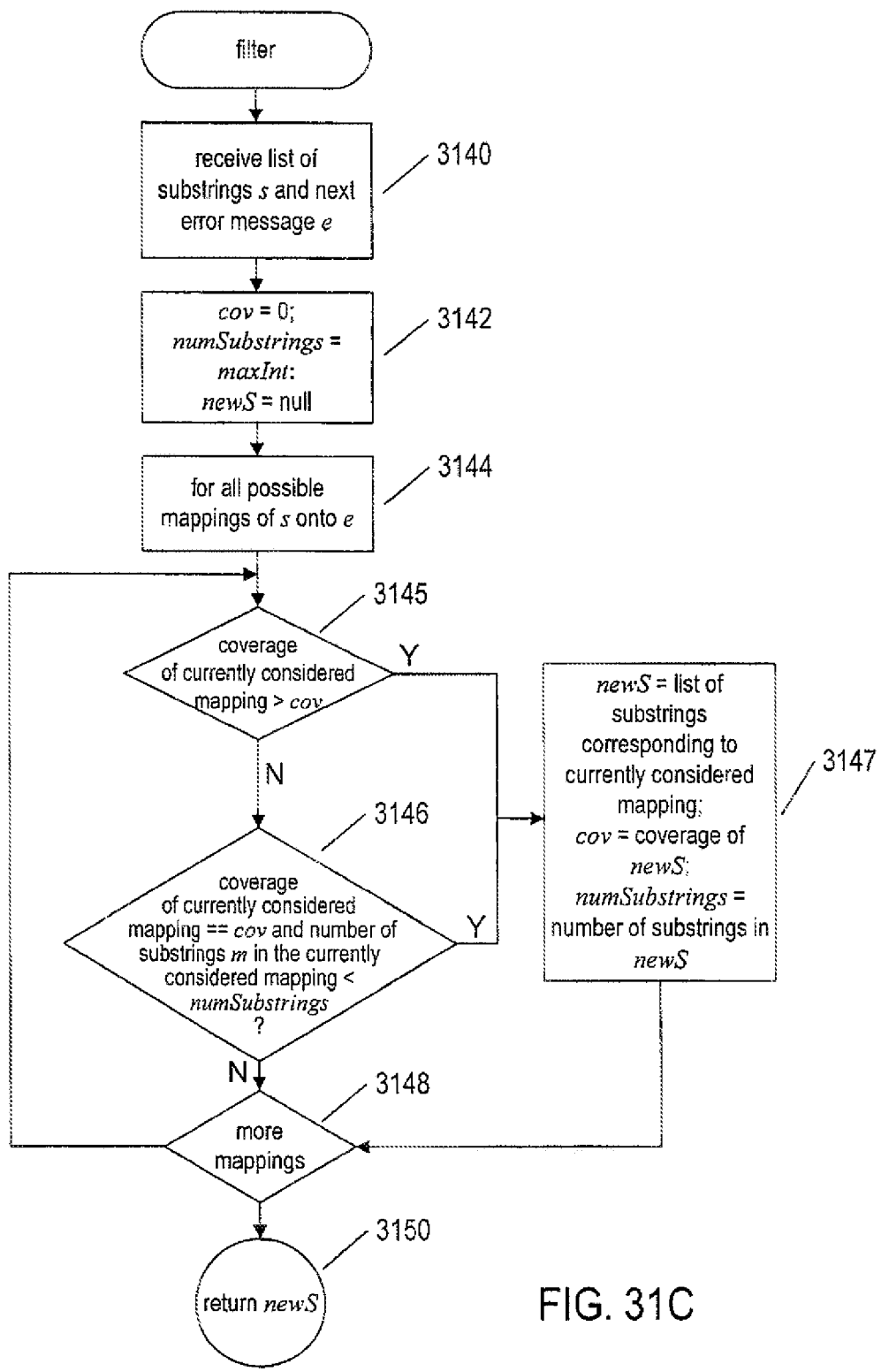

Next, one approach to generating useful parsing functions for event-message clusters is described. FIGS. 31A-C illustrate a computational method for identifying the static or conserved substrings within a cluster of event messages. FIG. 31A provides an illustrated example of the common-substring-recognizing method. In a left column 3102 of FIG. 31A, successive event messages within an event-message cluster are shown. A right-hand column 3104 of FIG. 31A shows a currently recognized common substring for the cluster as the method considers, in turn, each successive event message within the cluster. Following consideration of the first event message 3106, the common substring is the entire first event message 3108. This common substring 3108 is next considered with respect to the second event message 3110. Comparison of the common substring 3108 to the second event message 3110 reveals that, following consideration of the first two event messages in the cluster, there are two common substrings 3112 and 3114. These two common substrings 3112 and 3114 represent the common portions of previous common substring 3108 and the second event message 3110. Next, the common substrings 3112 and 3114 are compared to the third event message 3116. As a result of this comparison, two new common substrings 3118 and 3120 are produced. This process continues with consideration of subsequent event messages to produce common substrings 3122 and 3123 which, should the remaining event messages in the cluster follow the same pattern followed by the initial five event messages in the cluster, represent the common or static portions of all of the event messages within the cluster. These two common substrings 3122-3123 can then be used to create an initial regular expression 3124 as the basis for a parsing function for the event messages of the cluster. This initial regular expression includes the literal strings for the two common substrings and regular-expression sub-expressions "(.*)" for the variable portions of the event messages.

FIGS. 31B-C provide control-flow diagrams that illustrate the method, described above with reference to FIG. 31A, for finding the common or static portions of the event messages of a cluster and creating a regular expression, such as regular expression 3124 in FIG. 31A, as the basis for an initial parsing function for the event messages of the cluster. FIG. 31B provides a control-flow diagram for the routine "common part," which implements the method illustrated in FIG. 31A. In step 3130, the routine "common part" receives n event messages of a cluster. In step 3131, the routine "common part" sets a list of substrings, common, to the first event message in the received event messages of the cluster. Then, in the for-loop of steps 3132-3136, a routine "tilter." described below, is iteratively applied to the list of substrings common and the next or currently considered event message of the cluster in order to continue to reduce the one or more substrings in the list of substrings "common" to only the static or conserved portions of all of the event messages of the cluster, as discussed above with reference to FIG. 31A. The list of substrings, common, is set to the list returned by the routine "filter" in each iteration. Finally, in step 3138, a regular expression, such as regular expression 3124, is created from the substrings remaining in the list of substrings common, as discussed above with reference to FIG. 31A.

FIG. 31C provides a control-flow diagram for the routine "filter" called in step 3133 of FIG. 31B. In step 3140, the routine "filter" receives a list of substrings s and a next event message e. Next, in step 3142, the routine "filter" sets local variables cov to 0, numSubstrings to a large integer, and newS to null. The variable newS references a list of substrings produced by comparing the input list of substrings s with a next event message e. In the for-loop of steps 3144-3148, all possible mappings of the substrings in the received list of substrings s onto the next event message e are considered. These mappings represent attempts to partially or fully overlay the ordered list of substrings onto the event message. The coverage of such a mapping is the number of symbols in the event message overlaid with corresponding symbols in the substrings. The substrings may be fractured into multiple, smaller substrings, in order to carry out a mapping. When either the coverage of the currently considered mapping is greater than a coverage value stored in the local variable cot, as determined in step 3145, or when coverage of the currently considered mapping is equal to the value stored in the local variable cov and the number of substrings m in the currently considered mapping is less than the value stored in the local variable numSubstrings, as determined in step 3146, the local variable newS is set to a list of substrings corresponding to the current mapping, cov is set to the coverage of the current mapping, and numSubstrings is set to the number of substrings in the current mapping, in step 3147. Following completion of the for-loop of steps 3144-3148, the list of substrings newS is returned in step 3150. Note that is possible for newS to be null or the empty substring.

Figure 32A:
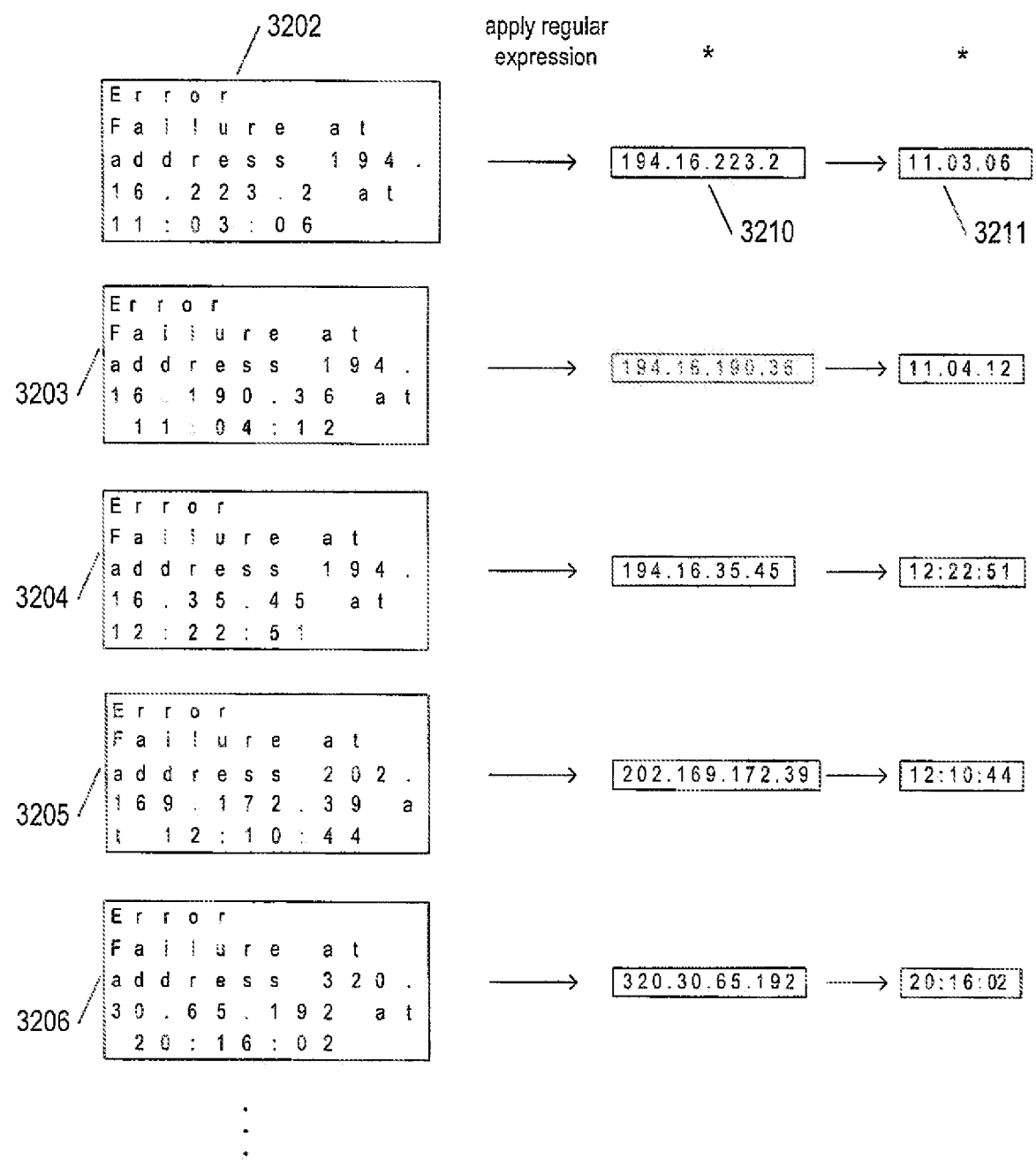
FIGS. 32A-B illustrate the process of obtaining a more specific regular expression by identifying encoded data within the variable portions of the event messages.
Figure 32B:
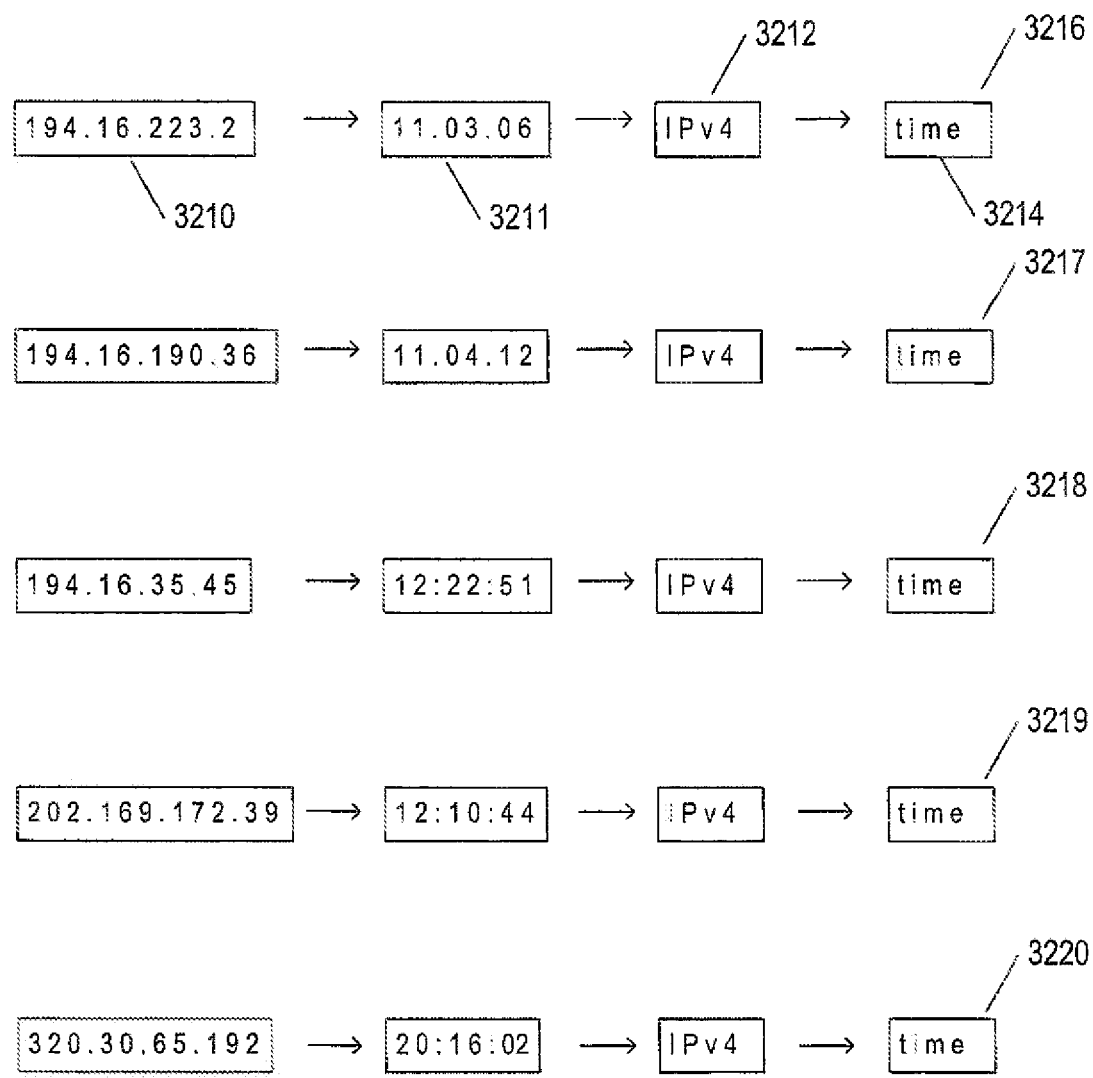

Following generation of an initial regular expression, as discussed above, a more specific regular expression can be obtained by identifying encoded data within the variable portions of the event messages. FIGS. 32A-B illustrate this process. In FIG. 32A, the same event messages 3202-3206 used in the example of FIG. 31A are again shown. The initial regular expression obtained using the method discussed above with reference to FIGS. 31A-C can be applied to each event message, using a function similar to the previously described "find" function, to identify substrings corresponding to sub-regular expressions within the initial regular expression. In the example shown in FIG. 32A, the find-like function is used to identify those substrings within each event message corresponding to the variable portions specified by the sub-regular expressions "(.*)" in the initial regular expression. These substrings are linked together as a list. For example, applying the initial regular expression to the first event message 3202 produces the list of two substrings 3210-3211 that contain the variable portions of the first event message.

FIG. 32B illustrates a next step in the process of creating a more specific regular expression. In FIG. 32B, the lists of substrings representing variable portions of event messages, such as the list that includes substrings 3210 and 3211, are converted into lists of data types contained within the variable portions. In the current example, substring 3210 is recognized as an IP address 3212 and substring 3211 is recognized as a time 3214. In this case, there are no remaining non-data-type-encoding symbols in the substrings. As shown in FIG. 32B, all of the lists of substrings corresponding to variable regions of the five event messages 3202-3206 are converted into corresponding lists of data types 3216-3220. Thus, the variable portions of the event messages have been transformed into lists of data types, allowing the initial regular expression to be transformed into a more specific regular expression that can serve as the basis for a parsing function that can be used to extract variable data from each event message of a cluster.

Figure 33A:
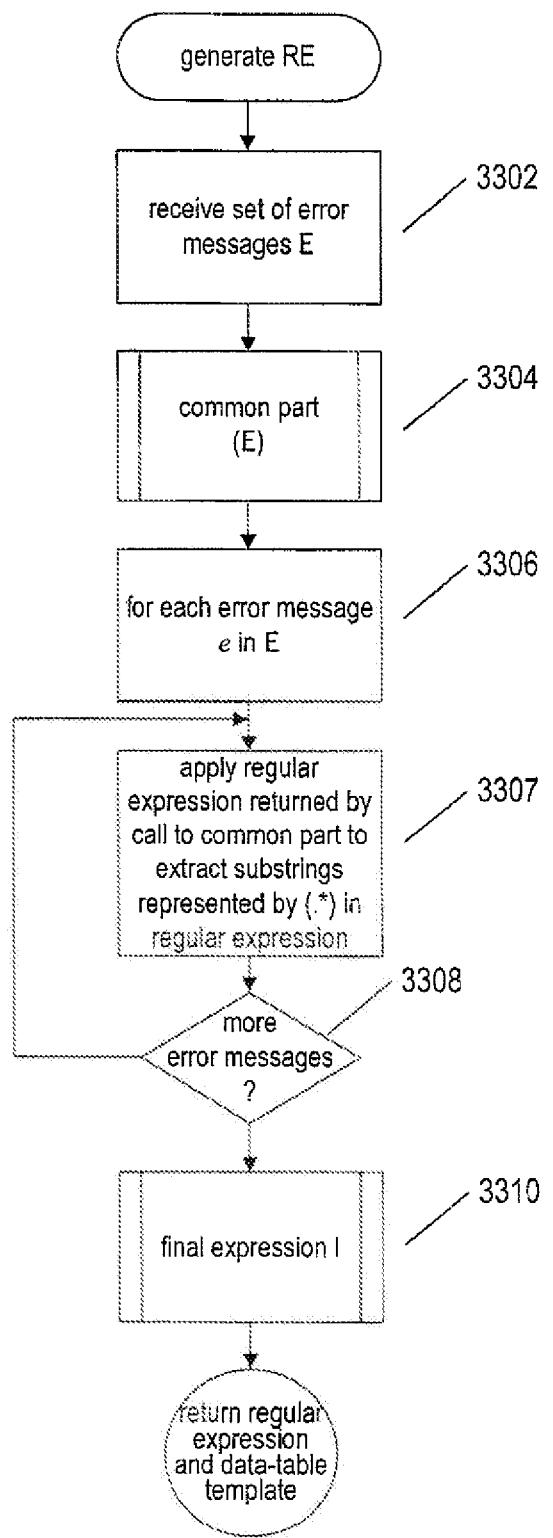
FIGS. 33A-C provide control-flow diagrams for a function "generate RE" that generates a parsing function, based on a regular expression, for a number of event messages within a cluster.
Figure 33B:
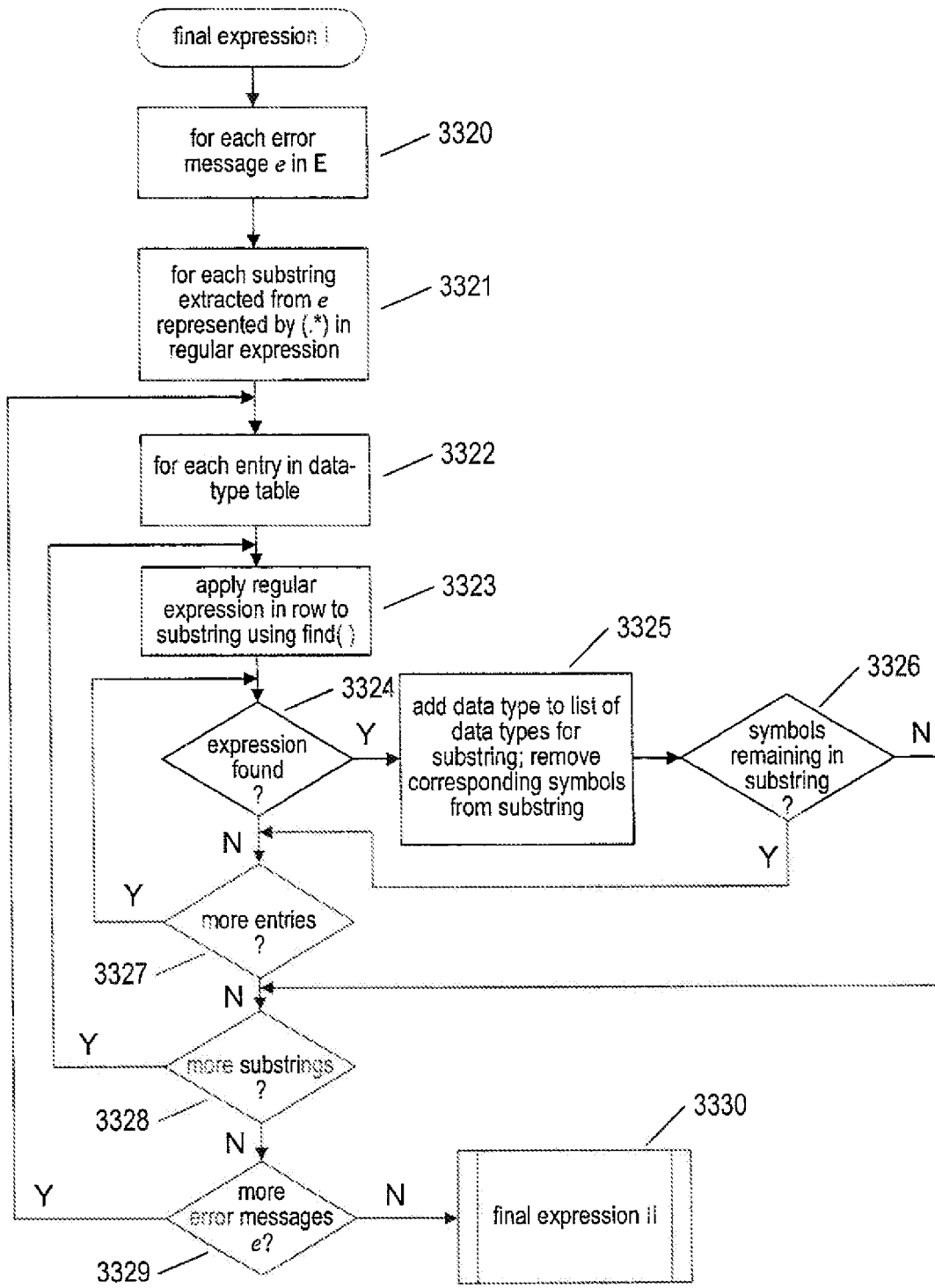
Figure 33C:
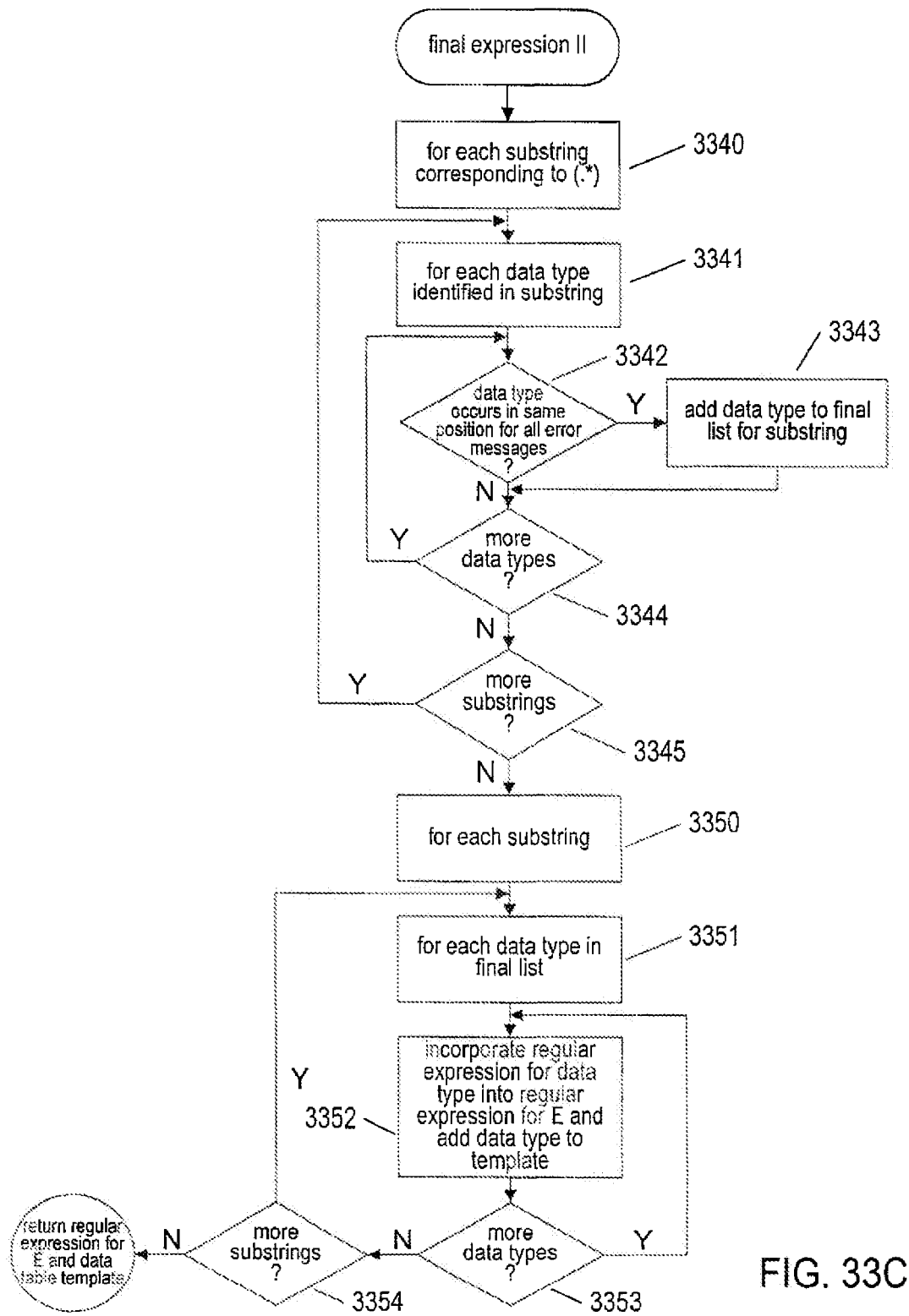

FIGS. 33A-C provide control-flow diagrams for a function "generate RE" that generates a parsing function, based on a regular expression, for a number of event messages within a cluster. FIG. 33A provides a control-flow diagram for the highest level of the function "generate RE." In step 3302, the function "generate RE" receives a set of event messages E. In step 3304, the function "generate RE" calls the previously described function "common part" to obtain an initial regular expression that can be used to extract the variable substrings from the event messages, as discussed above with reference to FIG. 32A. In the for-loop of steps 3306-3308, the routine "generate RE" applies the initial regular expression to each of the event message in E to extract lists of substrings corresponding to the variable regions in the event messages. Then, in step 3310, the routine "generate RE" calls a routine "final expression I" to process the lists of variable substrings in order to generate a final regular expression and a data-table template that together represent a basis for a parsing function applicable to the event messages of a cluster.

FIG. 33B provides a control-flow diagram for the routine "final expression I," called in step 3310 of FIG. 33A. The routine "final expression I" includes three nested for-loops. The outer for-loop, comprising steps 3320-3329, considers each event message e in E. A middle-level for-loop of steps 3321-3328 considers each variable substring extracted from the currently considered e. The inner for-loop of steps 3322-3327 considers each entry in the data-type table previously discussed, above, with reference to FIG. 29A. In these three nested for-loops, any encoded data recognized by application of a regular expression for the encoded data to a currently considered variable substring is added to a list of data types for the currently considered variable substring and the symbols that the encode the data are removed from the currently considered variable substring. Following completion of the nested loops, the routine "final expression II" is called, in step 3330.

FIG. 33C provides a control-flow diagram for the routine "final expression II," called in step 3330 of FIG. 33B. In the nested for-loops of steps 3340-3345, any of the data types in the lists of data types prepared for each of the event messages of a cluster that occur in the data list for each cluster are added to a final data-type list for each substring in the list of substrings for the event messages. In other words, only those data types identified in the variable portions of all event messages of the cluster are used for preparing a final regular expression. An initial set of nested for-loops, not shown in FIG. 33C, may be used to determine which of the data types in the list of data types are present in a substring of each of the event messages, to allow for the determination, in step 3342, of whether or not a currently considered data type is found at the same position in the same substring of every event message. Then, in the nested for-loops of steps 3350-3354, all of the data types that were found at the same positions in the variable portions of all of the event messages are incorporated into a final regular expression for the cluster and are additionally entered as separate entries of a data-table template that is used, along with the final regular expression, for parsing event messages of a cluster.

Figure 34A:
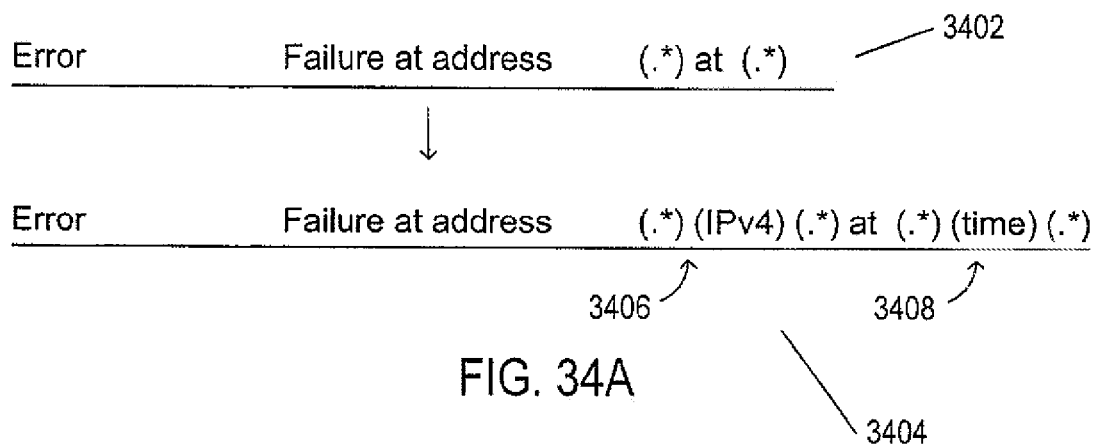
FIGS. 34A-B illustrate a final regular expression and data-table template prepared by the method illustrated in FIGS. 33A-C for the example of FIGS. 31A and 32A.
Figure 34B:
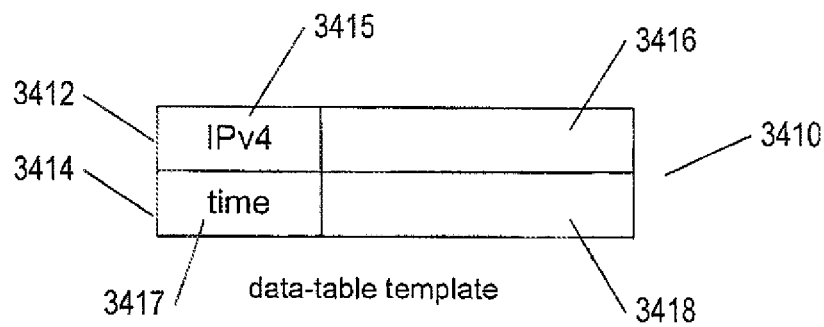

FIGS. 34A-B illustrate a final regular expression and data-table template prepared by the method illustrated in FIGS. 33A-C for the example of FIGS. 31A and 32A. The initial regular expression 3402 for the example is transformed, as indicated in FIG. 34A, into a final expression 3404 by adding sub-regular expressions 3406 and 3408 for the IP-address and time encoded data, bracketed by sub-regular expressions "(.*)," for each of the variable portions represented in the initial regular expression 3402 by the sub-regular expression "(.*)." Note that the actual sub-regular expressions for IP addresses and times are not shown in FIG. 34A, but instead are symbolically represented by "(IPv4)" and "(time)," respectively. In general, the event messages of a cluster consistently use the same data-type formatting for each variable data value included in the event messages of the cluster, so that only a single sub-regular expression for each variable is needed in the final regular expression for the cluster. The data-table template 3410 consists of two rows 3412 and 3414. The first row 3412 includes an indication that the row represents an IP address, in a first column, and includes a field 3416, in a second column, to hold the encoding of an IP address extracted from an event message. Similarly, the second row 3414 includes an indication that the row is a time value 3417 and a field 3418 to contain a time value extracted from an event message. The final regular expression combined with the data table obtained by applying the final regular expression to an event message together represent the same information as represented by the data structures shown in, and discussed with reference to FIG. 25. Thus, a final regular expression prepared by the above-discussed methods and data-table template, together, can be used as the parsing function for a cluster.

As discussed in preceding subsections, the parsing function for a cluster may be generated by downstream analytic subsystems and furnished by these downstream subsystems to a clustering subsystem. Similarly, these downstream analytic subsystems may provide indications to the clustering subsystem for when to apply split and merge operations to clusters. FIGS. 35A-E provide control-flow diagrams to illustrate a simple implementation of an event-message processing system in which a portion of the logic previously described as being included in downstream analytic subsystems may be incorporated within the framework of the previously described clustering subsystem.

Figure 35A:
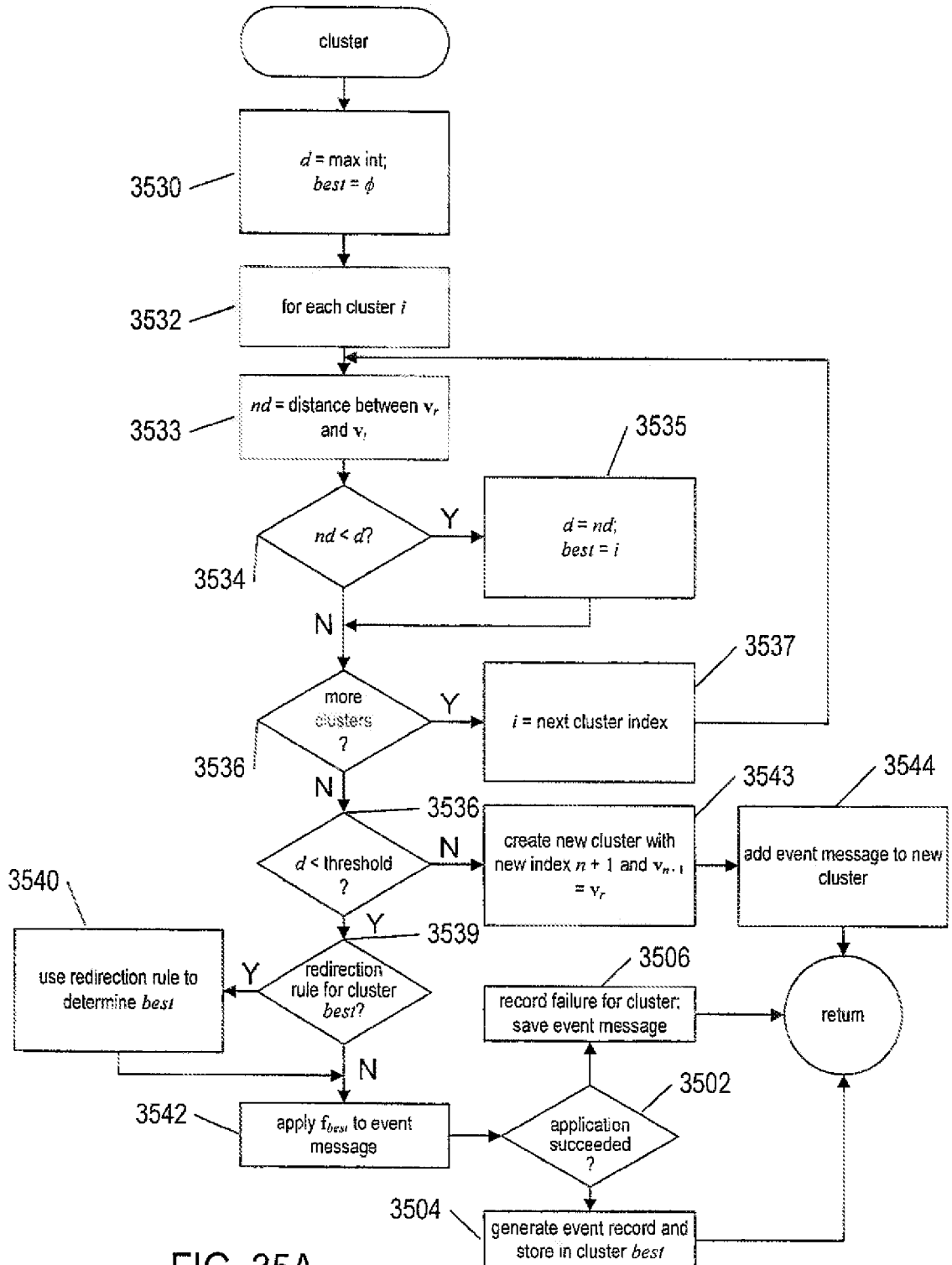
FIGS. 35A-E provide control-flow diagrams to illustrate a simple implementation of an event-message processing system in which some of the logic of previously described downstream analysis subsystems may be incorporated within the framework of the previously described clustering subsystem.

FIG. 35A illustrates small modifications made to previously discussed FIG. 27C in order to allow for detecting failed parsing of event messages. Previously, in step 2742, the parsing function $f_{best}$ was applied by the routine "cluster" to the event message and assumed to succeed. In the modified function "cluster," shown in FIG. 35A, that assumption is no longer made. In step 3502, the modified function "cluster" determines whether or not application of the parsing function succeeded. As discussed above, a parsing function succeeds when the regular function on which it is based is matched to an entire event message or a portion of an event message. When application of the parsing function succeeds, then, in step 3504, the modified function "cluster" generates an event record and stores the event record in the cluster best. Otherwise, in step 3506, the failure of the parsing function is recorded and the event message is saved for subsequent processing.

Figure 35B:
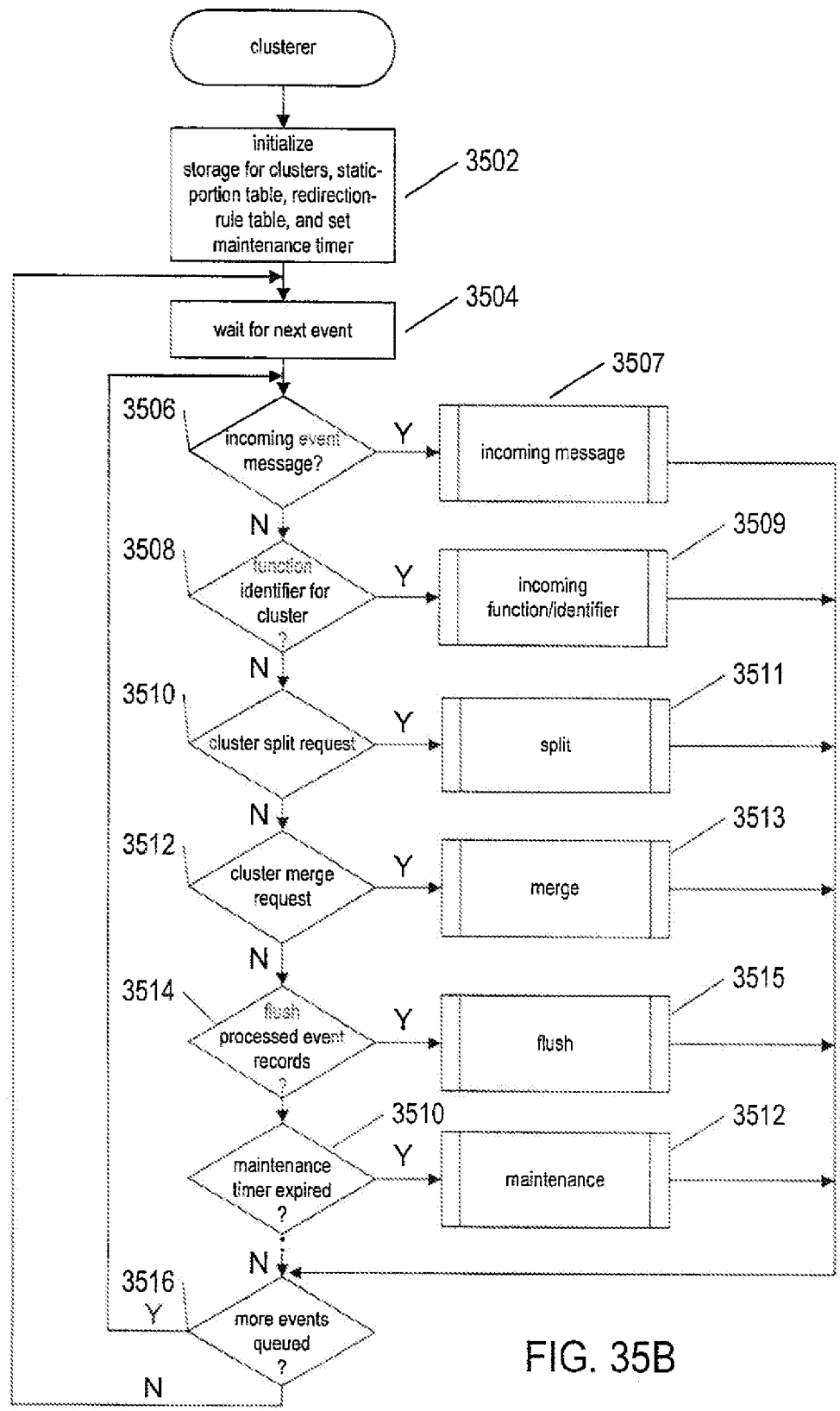

FIG. 35B illustrates modifications to previously discussed FIG. 27A to allow for a maintenance routine to be periodically called in order to carry out various types of maintenance on the current set of clusters for event messages. Step 2702 is modified to include setting of a maintenance timer. Step 3510 is added to detect a maintenance-timer-expiration event. When that event is detected, the function "maintenance" is called in step 3512.

Figure 35C:
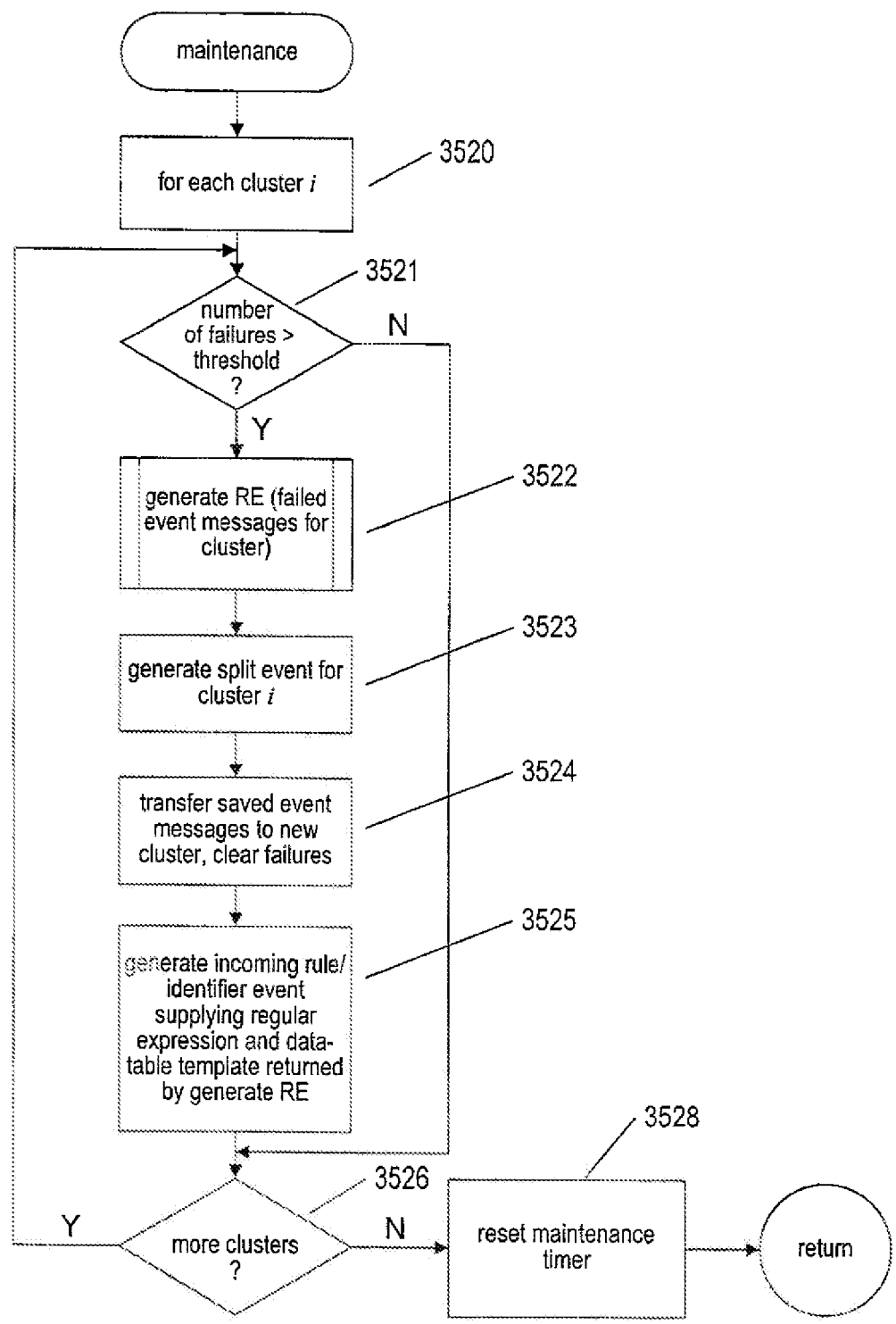

FIG. 35C provides a control-flow diagram for the routine "maintenance," called in step 3512 of FIG. 35B. In a for-loop of steps 3520-3526, each current cluster is considered. When the number of parsing failures recorded for the cluster exceeds a threshold value, as determined in step 3521, the routine "maintenance" call the previously discussed function "generate RE" to determine a new parsing function for the failed messages, in step 3522, generates a split event for the cluster in step 3523, transfers the saved event messages to the new cluster in step 3524, and generates an incoming rule/identifier event, in step 3525, to supply the regular expression obtained in step 3522 as a parsing function for the new cluster. The transfer of the saved event messages, in step 3524, may need to be asynchronous so that the transfer is completed once the cluster subsystem has created the new cluster. The parsing-failure record is erased, as well, in step 3524, for the original cluster. After completion of the for-loop of steps 3520-3526, the maintenance timer is reset in step 3528.

Figure 35D:
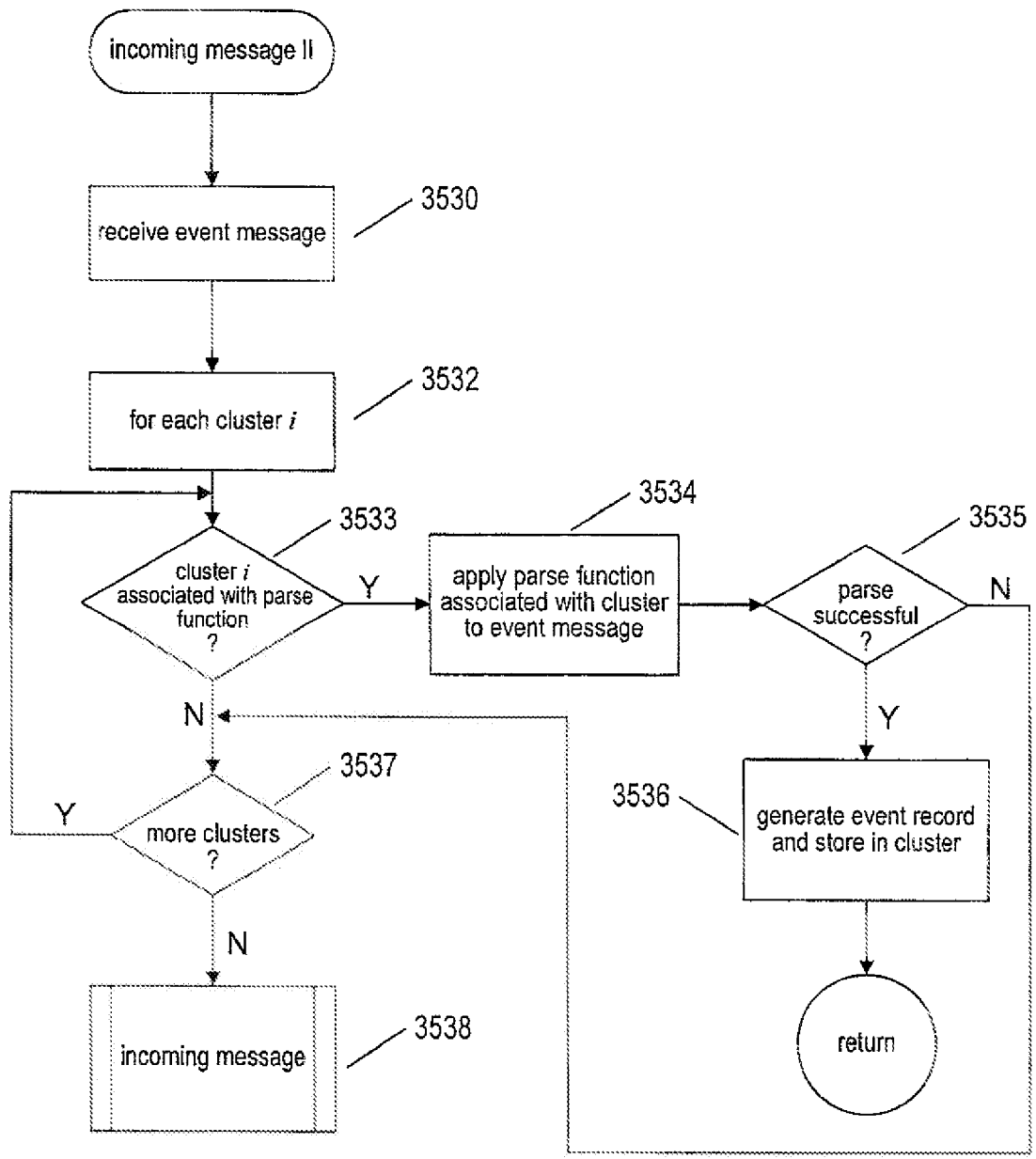

The association of parsing functions with clusters provides an additional approach to processing incoming event messages. FIG. 35D provides a control-flow diagram for a modified incoming-message routine called "incoming message II." The new modified incoming-message routine is called in step 2707 of FIG. 27A in place of the original incoming-message routine. In step 3530, an event message is received. In the for-loop of steps 3532-3537, each current cluster i is considered. When the current cluster is associated with a parsing function, as determined in step 3533, the parsing function is applied to the received event message in step 3534. When the parse is successful, as determined in step 3535, an event record is generated from the parsing function and data table obtained by applying the parsing function to the event message and the event record is stored in the currently considered cluster, in step 3536. When no parsing function of any current cluster can successfully be applied, the event message is passed on to the original function "incoming message" in step 3538 for processing by the original clustering method.

Figure 35E:
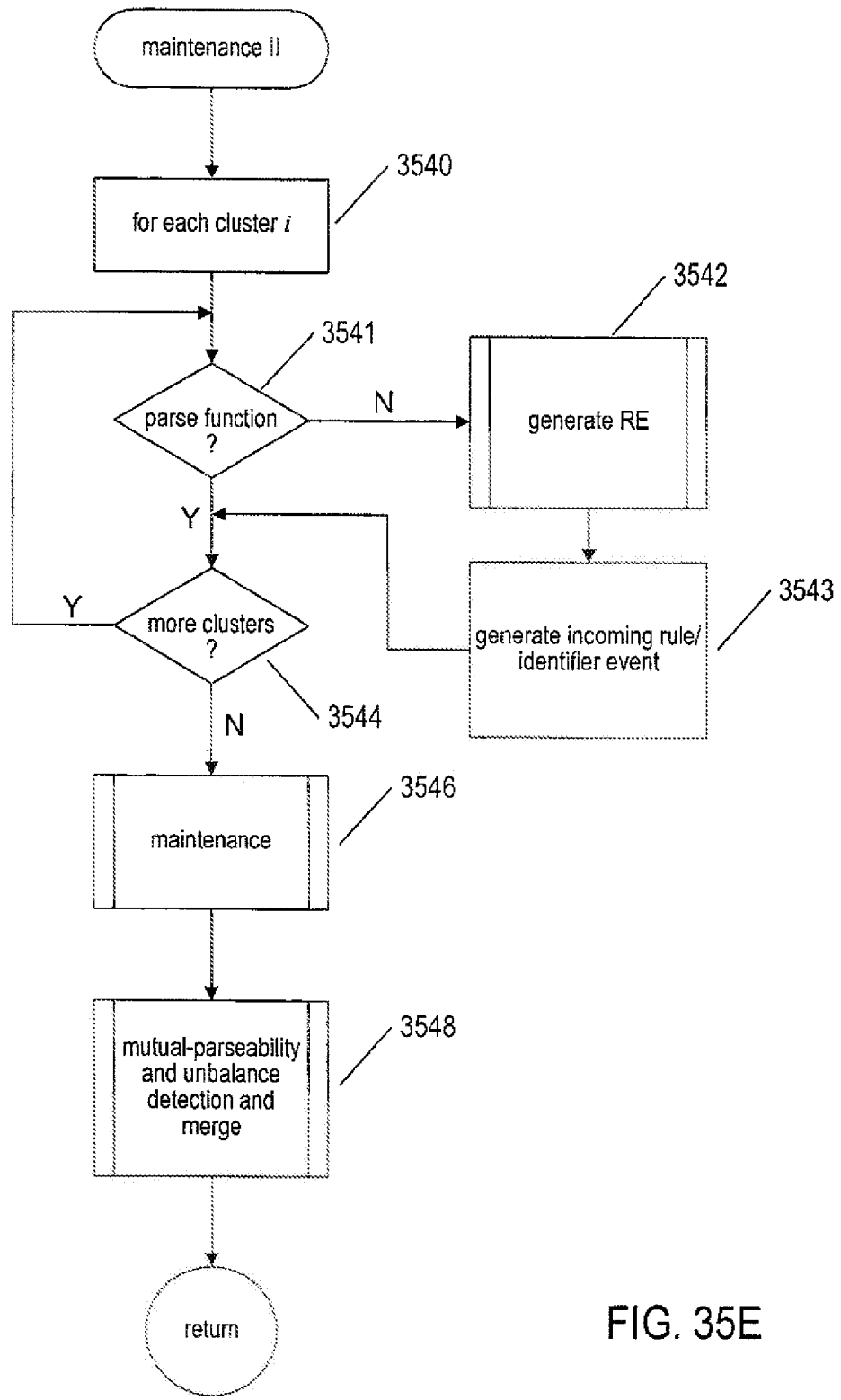

FIG. 35E provides a control-flow diagram for a second version of the maintenance routine. The second version is called "maintenance II." In the for-loop of steps 3540-3544, any cluster that is not currently associated with a parsing function is processed to generate a parsing function for the cluster. Thus, the routine "maintenance II" detects relatively recently created clusters and generates parsing functions for them. Of course, the function "maintenance II" may defer generating a parsing function until there are a sufficient number of event messages associated with a cluster to provide an acceptable probability of generating an appropriate parsing function for the cluster. In step 3546, the routine "maintenance II" calls the original maintenance routine, discussed above with reference to FIG. 35C, to split clusters that have more than a threshold amount of parsing failures. Finally, in step 3548, the routine "maintenance II" calls an additional function to detect unbalanced clustering and/or multiple clusters that are mutually parseable by their respective parsing functions. These may be indications of clusters that should be merged into a single cluster. When analysis by this routine indicates that the two clusters should be merged, the routine generates a merge event for subsequent handling by the previously discussed merge function.

Figure 36A:
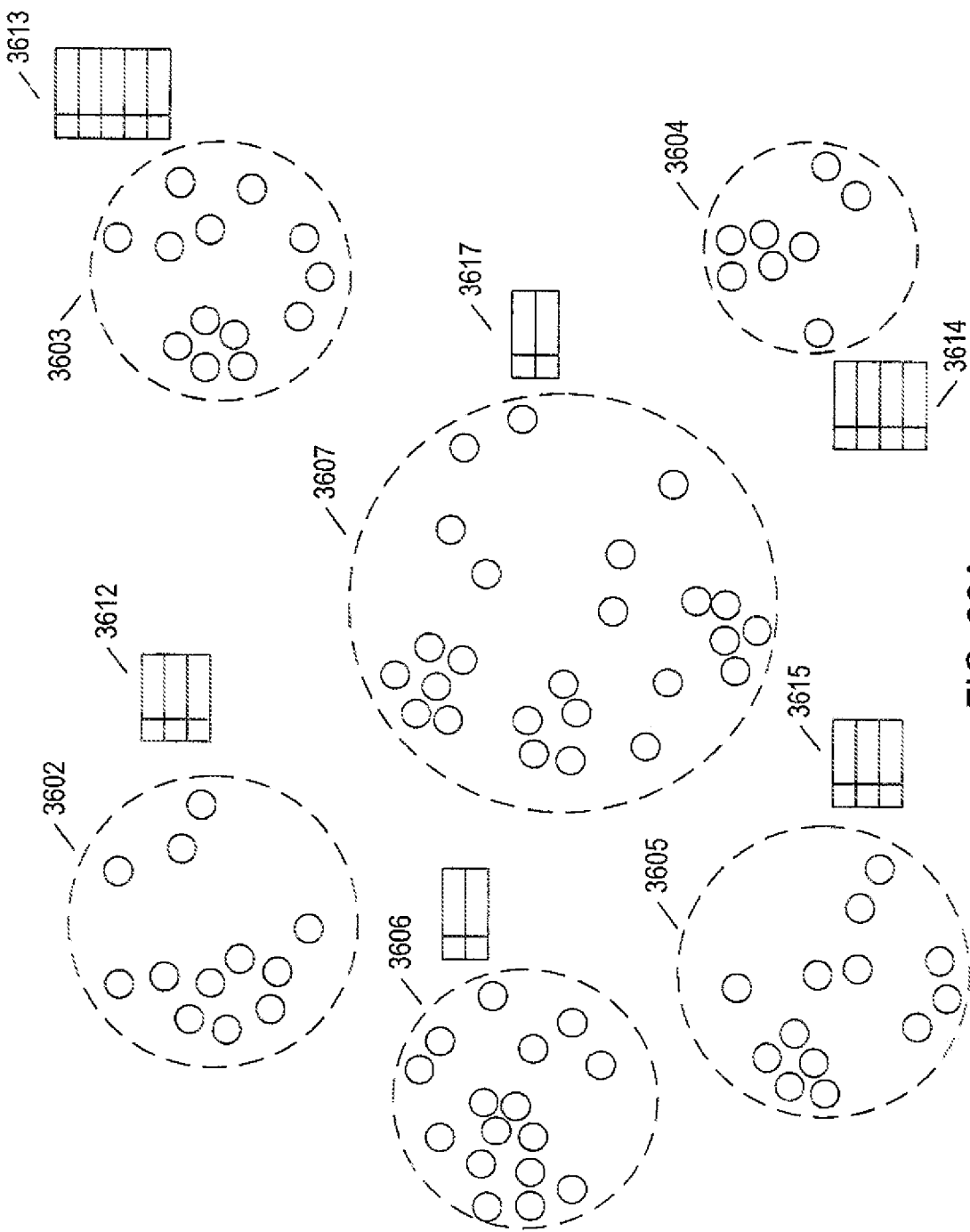
FIGS. 36A-B illustrate the information provided by the clustering subsystem about event messages that can be used to assign significance values to event messages which, in turn, can be employed for various types of event-message prioritization.
Figure 36B:
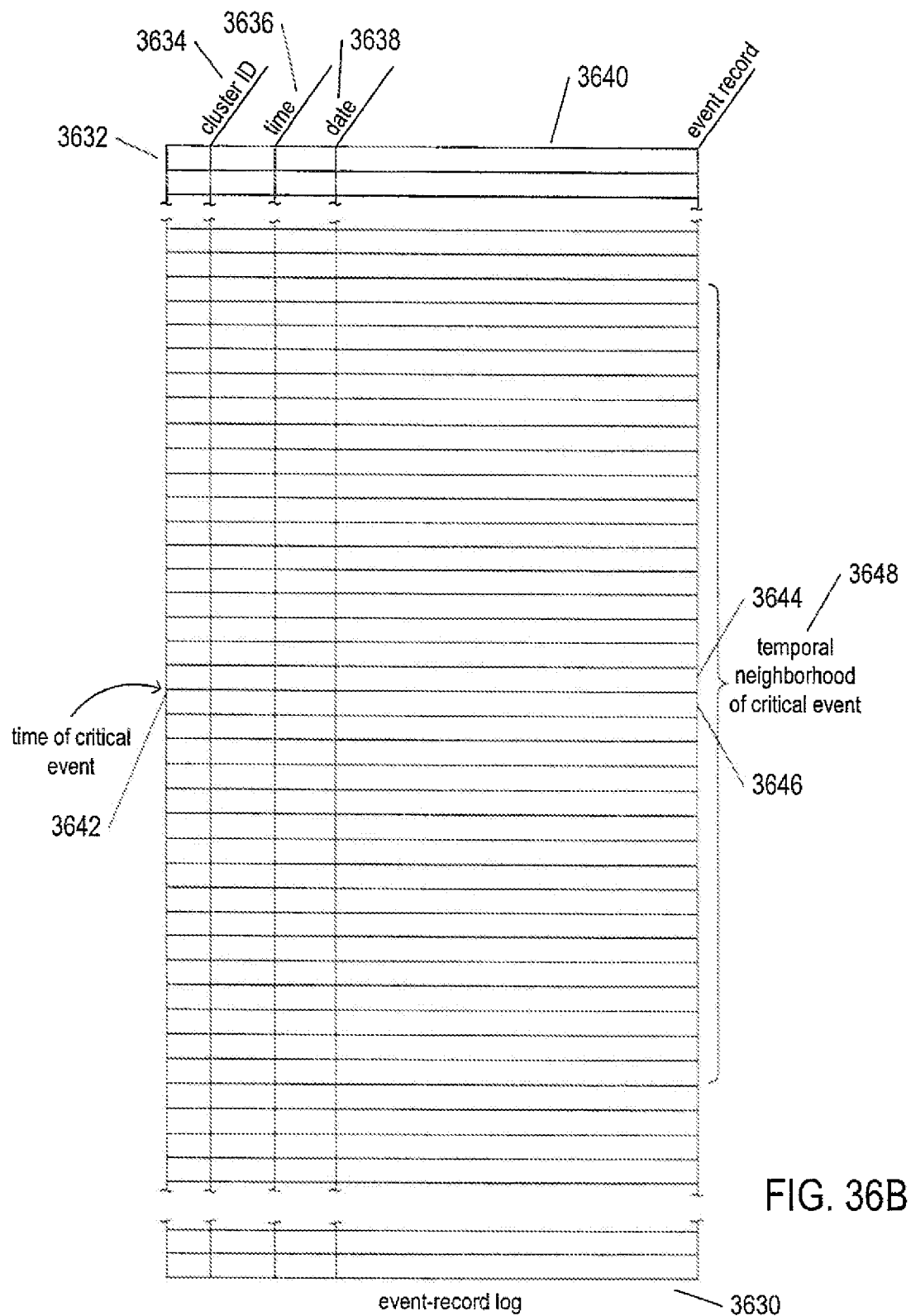

FIGS. 36A-B illustrate the information provided by the clustering subsystem about event messages that can be used to assign significance values to event messages which, in turn, can be employed for various types of event-message prioritization. As shown in FIG. 36A, and as discussed, in detail, in the preceding subsection, the clustering subsystem organizes event messages into clusters, illustrated in FIG. 36A by dashed circles 3602-3607. Within these clusters, the various types of event messages within the cluster are represented by small disks, such as disk 3610 within cluster 3602. Each event-message type is associated with a feature vector as are the clusters. In general, the event-message types are not evenly or uniformly distributed within a hyper-dimensional sphere about the cluster position represented by the feature vector associated with the cluster. Thus, in FIG. 36A, the event types are shown as non-uniformly distributed within the disks of the clusters. Of course, the feature vector space is a generally high-dimensional space rather than a two-dimensional disk, but the non-uniform distribution of positions corresponding to feature vectors associated with event-message types is analogously non-uniformly populated with positions corresponding to event-message feature vectors. The clustering subsystem additionally provides data-table templates 3612-3617 for each cluster for storing the values of encoded data extracted from event messages via the parsing function associated with a cluster. The data-table templates include indications of the data types of the encoded data.

In addition to the clustering-subsystem-provided information shown in FIG. 36A, the event records generated from event messages are stored in event logs. The event log 3630 can be considered to be a very long table or file that contains a series of time-ordered event records. In FIG. 36A, each event record is represented by a row in the event log 3630, such as the event record corresponding to the first row 3632 of the event log. The event records may, as shown in FIG. 36B, include a cluster-ID field 3634, a time field 3636, a date field 3638, and a field that contains the event record prepared from a corresponding event message by the clustering subsystem 3640.

Another type of information may be used for event-message prioritization. As shown in FIG. 36B, the distributed computing system may independently keep track of the time of various critical system events that occur. It may be possible to determine the position of these critical events within the timeline represented by the event log. As shown in FIG. 36B, for example, a critical event occurred at a time 3642 that falls between the times associated with event record 3644 and event record 3646. Because the event records are time ordered in the event log, a temporal neighborhood 3648 may be defined to extend, in time, above, below, or both above and below the time point 3642 of the critical event. In certain cases, the critical events may, in fact, themselves be identified event-log entries. In other cases, the critical events may be identified, manually, by system administrators, or by other types of data stored by the distributed computing system.

FIG. 37 illustrates computation of the significance of an event message. First, as shown in equation 3702, an event message has a type that can be considered to be computable as a function of the cluster ID of the cluster to which the event message is assigned by the clustering subsystem, the feature vector computed for the event message by the clustering subsystem, and the data values for any of the variables extracted by the clustering subsystem from the event message using the parsing function and associated data-table template. Alternatively, the type of event message may be considered to be a multi-dimensional vector 3704 with elements including the cluster ID, feature vector, and variable values, or a multi-dimensional sub-vector of the multi-dimensional vector 3704.

The next equation 3706 in FIG. 37 illustrates a generalized computation of a significance for an event message. The significance can be considered to be a function of the significance assigned to single elements of vector 3704, as represented by arguments 3708, as well as the significance assigned to all possible combinations of the elements, as represented in FIG. 37 by arguments 3710. For example, there may be a significance associated with the cluster to which an event message is assigned, a significance associated with the feature vector corresponding to the event message, a significance associated with each of the variable values, when considered independently, and significances associated with various combinations of these elements, such as a significance associated to a cluster-ID, feature-vector pair. In practice, it is unlikely that the significance associated with each possible combination of elements of vector 3704 are computed. Instead, the significance of an event message is practically estimated from some sparse set of significances computed for elements and/or combinations of elements in the event-message-type defining vector 3704.

FIGS. 38A-E illustrate various distance-based and density-based methods for estimating the significance of an event message based on the feature vector computed for the event message. As shown in FIG. 38A, the positions represented by the feature vectors computed by the clustering subsystem for event-message types occupy a volume in n dimensions, where n is the number of elements in each feature vector, populated by points corresponding to feature vectors 3802. For example, the point or position 3804 for event message i is defined by the feature vector 3806 computed for event message i. As discussed in preceding subsections, depending on the method used to generate feature vectors, the feature-vector space may or may not be Euclidean and distances between points in the feature-vector space may or may not be computed by the well-known Euclidean distance metric. However, regardless of how the feature vectors are computed, the feature-vector space is generally associated with a well-defined distance metric that allows distances between points represented by feature vectors to be computed. These computable distances form the basis for a variety of different significance computations, four of which are illustrated in FIGS. 38B-E. As shown in FIG. 38B, one estimate of the significance of a feature vector $v_e$ computed for event message e is the distance 3808 between the position represented by the feature vector $v_e$ 3810 and the position 3812 represented by the feature vector $v_e$ associated with the cluster to which event message e is assigned. Another potential estimate of significance, as shown in FIG. 38C, is the ratio of the average density of positions corresponding to feature vectors within the entire feature-vector space (3802 in FIG. 38A) to the local density of feature-vector positions in the neighborhood of the position 3814 corresponding to feature vector $v_e$ computed for event message e. As shown in FIG. 38D, yet another estimate of the significance of the feature vector $v_e$ corresponding to event message e may be based on the distance $d_k$ 3816 between the position represented by feature vector $v_e$ 3818 computed for event message e and the position represented by feature vector $v_k$ 3820 computed for the $k^{th}$ nearest neighbor to the position represented by feature vector $v_e$ 3818. Finally, as shown in FIG. 38E, another estimate of the significance of feature vector $v_e$ for event message e is the distance d 3822 between the positions represented by $v_e$ 3824 and the centroid of the feature vectors of event-message types associated with the cluster [$v_e$] 3826. There are many additional distance-related metrics that may be used to estimate the significance of a feature vector.

Figure 39:
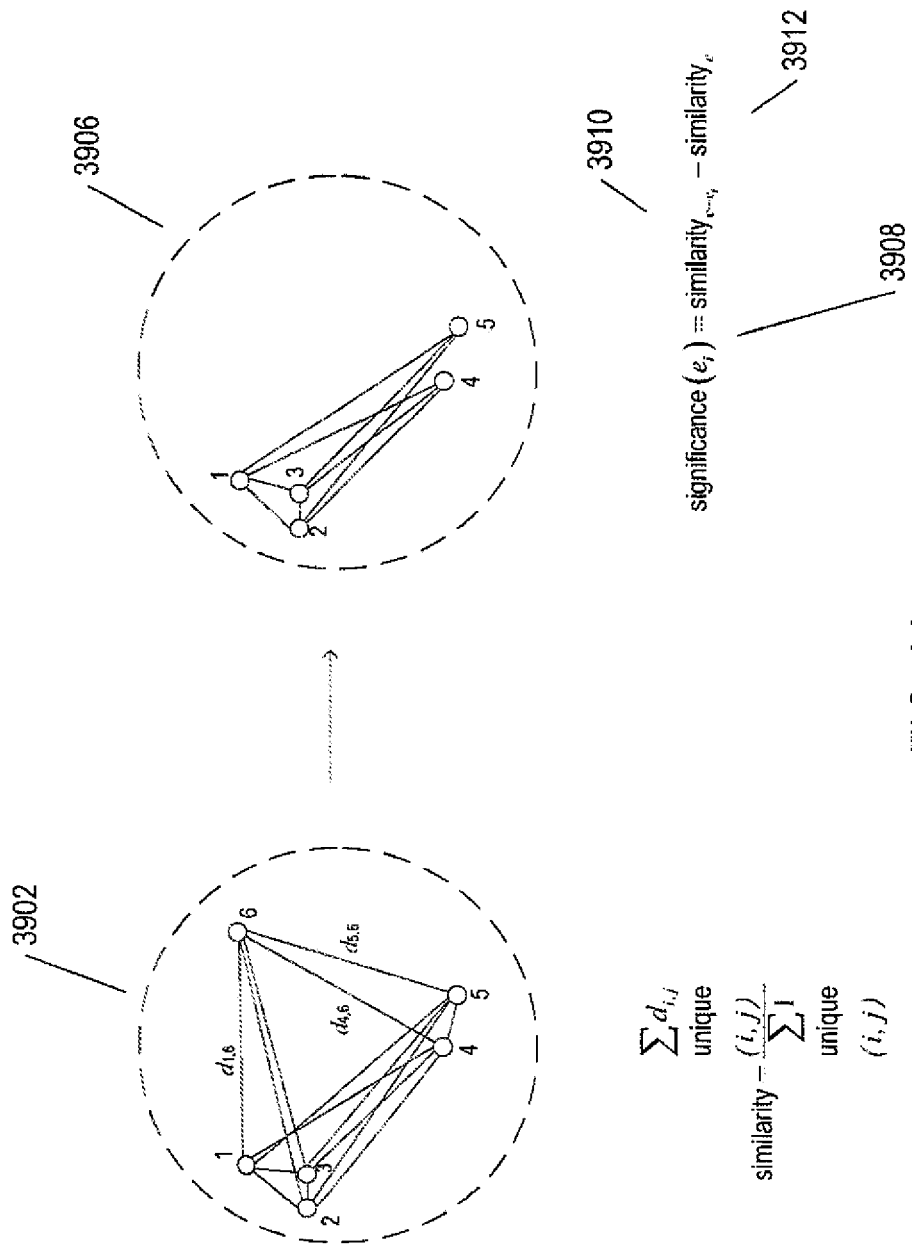
FIG. 39 illustrates another approach to estimating significance of an event message $e_i$.

FIG. 39 illustrates another approach to estimating significance of an event message $e_i$. Given some type of similarity metric for pairs of event messages, such as various types of distance metrics computed from feature-vector positions of the event messages of a pair, a total pair-wise similarity for the event messages of a cluster can be computed both for a cluster containing all of the event messages as well as a cluster from which one of the event messages is removed. In FIG. 39, the pair-wise similarity for the complete cluster 3902 is computed as an average distance between the positions of pairs of event-message types within the cluster 3904. A similar computation is carried out for the cluster from which one of the event-message types has been removed 3906. When the removed event-message type is the type of event message $e_i$, then a significance value for the event-message type $e_i$ can be computed 3908 as the pair-wise similarity computed for the cluster without event-message-type $e_i$ 3910 minus the pair-wise similarity metric computed for the full cluster 3912. When the similarity computed for the full cluster is less than the similarity computed for the cluster without event-message type $e_i$, then event $e_i$ has a positive significance. The magnitude of the significance is proportional to the difference between cumulative pair-wise similarity metrics 3910 and 3912.

Figure 40:
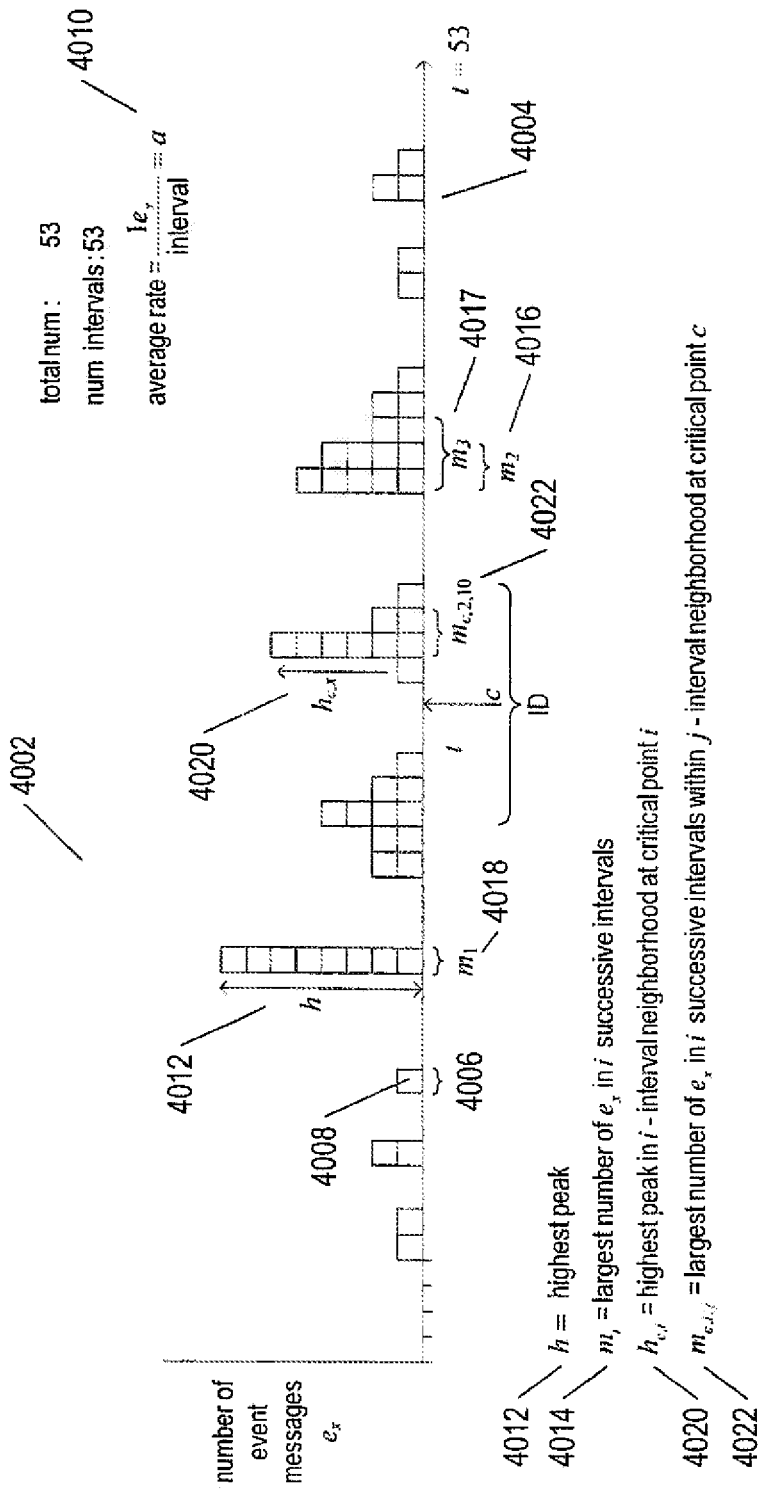
FIG. 40 illustrates a variety of other types of significance factors that can be computed based on analysis of event logs.

FIG. 40 illustrates a variety of other types of significance factors that can be computed based on analysis of event logs. In FIG. 40, a plot 4002 is shown for the number of event messages of a particular type $e_x$ that occur within small intervals of time along a temporal axis 4004. For example, during time interval 4006, a single occurrence of event message $e_x$ 4008 is observed in the event log. In the example shown in FIG. 40, there are 53 time increments along the temporal axis 4004 and a total of 53 observed occurrences of the event message $e_x$. Thus, the average rate of occurrence of event messages of type $e_x$ per time interval is 1, with the average symbolically represented by a 4010. The temporal axis 4004 represents a time window within the event log during which various types of significance factors are computed. This time window may, for example, include the most recently logged event messages. Various different characteristics computable from plot 4002 are illustrated in FIG. 40. These include: (1) the highest peak h 4012; (2) the largest number of $e_x$ messages within i successive time intervals, $m_i$ 4014, examples of which include $m_1$, $m_2$, and $m_3$ 4016-4018, the highest peak in an i-interval neighborhood about a critical point c, $h_{c,i}$ 4020; and (3) the largest number of messages of type $e_x$ in i successive intervals within a j-interval neighborhood about a critical point c, $m_{c,i,j}$ 4022. As mentioned above, either one-sided or symmetrical or asymmetrical two-sided neighborhoods about a critical-event time can be used. Then, from these characteristics, a number of different types of significance factors 4024 can be computed, such as:

$$\frac{h}{a}, a, \frac{m1}{a}, \frac{m2}{a}, \frac{\Sigma_i m1}{i \cdot a}, \frac{\Sigma_{c,x} h_{c,x}}{\Sigma_{c,x} a}, \text{ and } \frac{\Sigma_c m_{c,3,ID}}{\Sigma_c a}.$$

The various types of significance metrics illustrated in FIGS. 38B-E, 39, and 40 can be used to compute one or more significance metrics for individual elements and various possible combinations of the elements of the event-message-type specifying vector. For example, event-log-based metrics may be computed for messages of types specified by various sub-vectors of vector 3704. The computed significance values for individual elements and various possible combinations of the elements of the event-message-type specifying can then be combined as a weighted sum to provide an estimate of the significance of an event-message type e defined by values of some number of elements $x_1, x_2, x_3, \ldots x_n$ of the event-message-type-defining vector 3704, as shown in the following equation, in which $\alpha_i$ are weighting factors:

$$\text{significance } e[x_1, x_2, x_3, \ldots, x_n] = \frac{\alpha_1 sig(x_1) + \alpha_2 sig(x_2) +}{\alpha_3 sig(x_3)} + \cdots +$$
$$\frac{\alpha_{12} sig(x_1, x_2) +}{\alpha_{13} sig(x_1, x_3)} + \cdots +$$
$$\frac{\alpha_{123} sig(x_1, x_2, x_3) +}{\alpha_{124} sig(x_1, x_2, x_4)} + \cdots +$$
$$\vdots$$
$$\alpha_{123\ldots n} sig(x_1, x_2, x_3, \cdots, x_n).$$

Many of the weighting factors $\alpha_i$ may be 0, so that event-message-type significances can be estimated in a computationally efficient fashion from a subset of all possible significance terms.

FIGS. 41A-D illustrate, using control-flow diagrams, prioritization of event messages based on the above-discussed significance metrics. In step 4102, the routine "cluster" has been modified to include setting of an analysis timer. When the routine "cluster" detects expiration of the analysis timer, in step 4110, the routine analysis is called in step 4112. This modification provides for periodic analysis of event logs in order to compute significances of various elements used to identify event-message types, as discussed above.

Figure 41A:
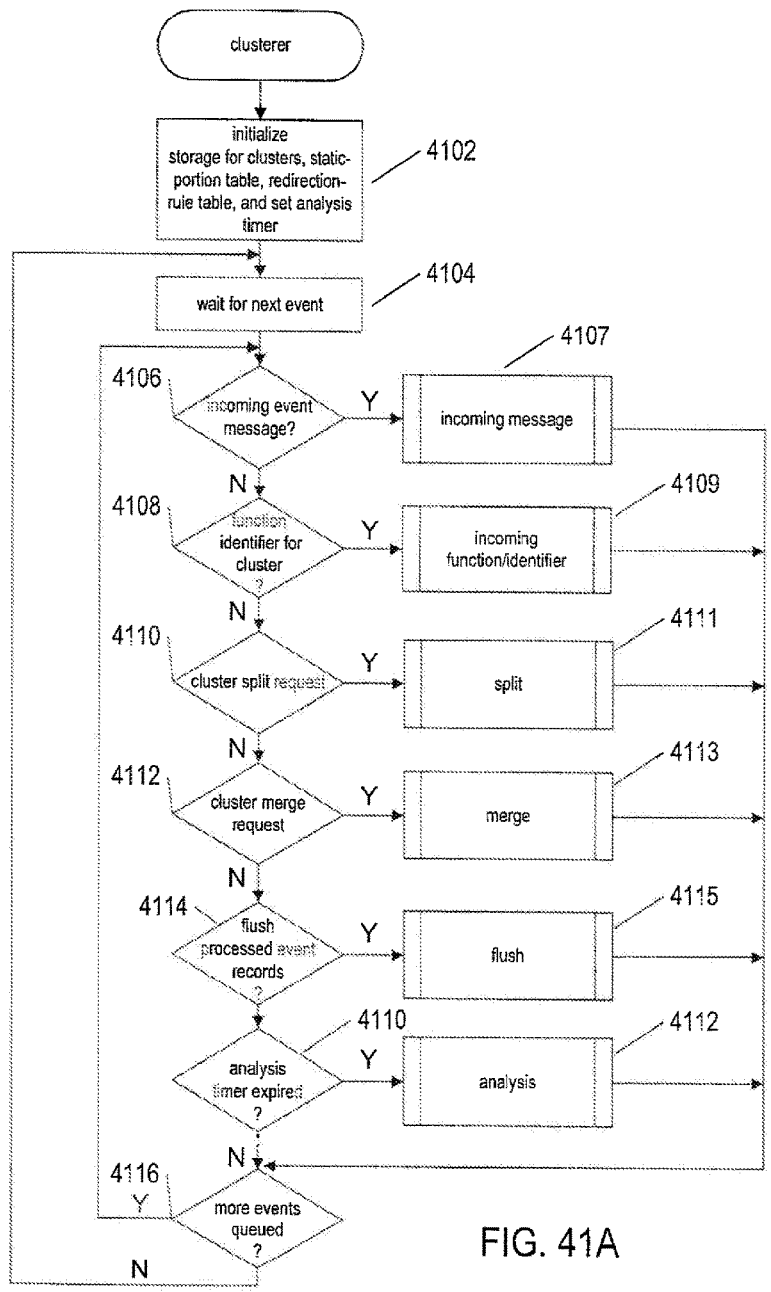
FIGS. 41A-D illustrate, using control-flow diagrams . . . prioritization of event messages based on the above-discussed significance metrics.
Figure 41B:
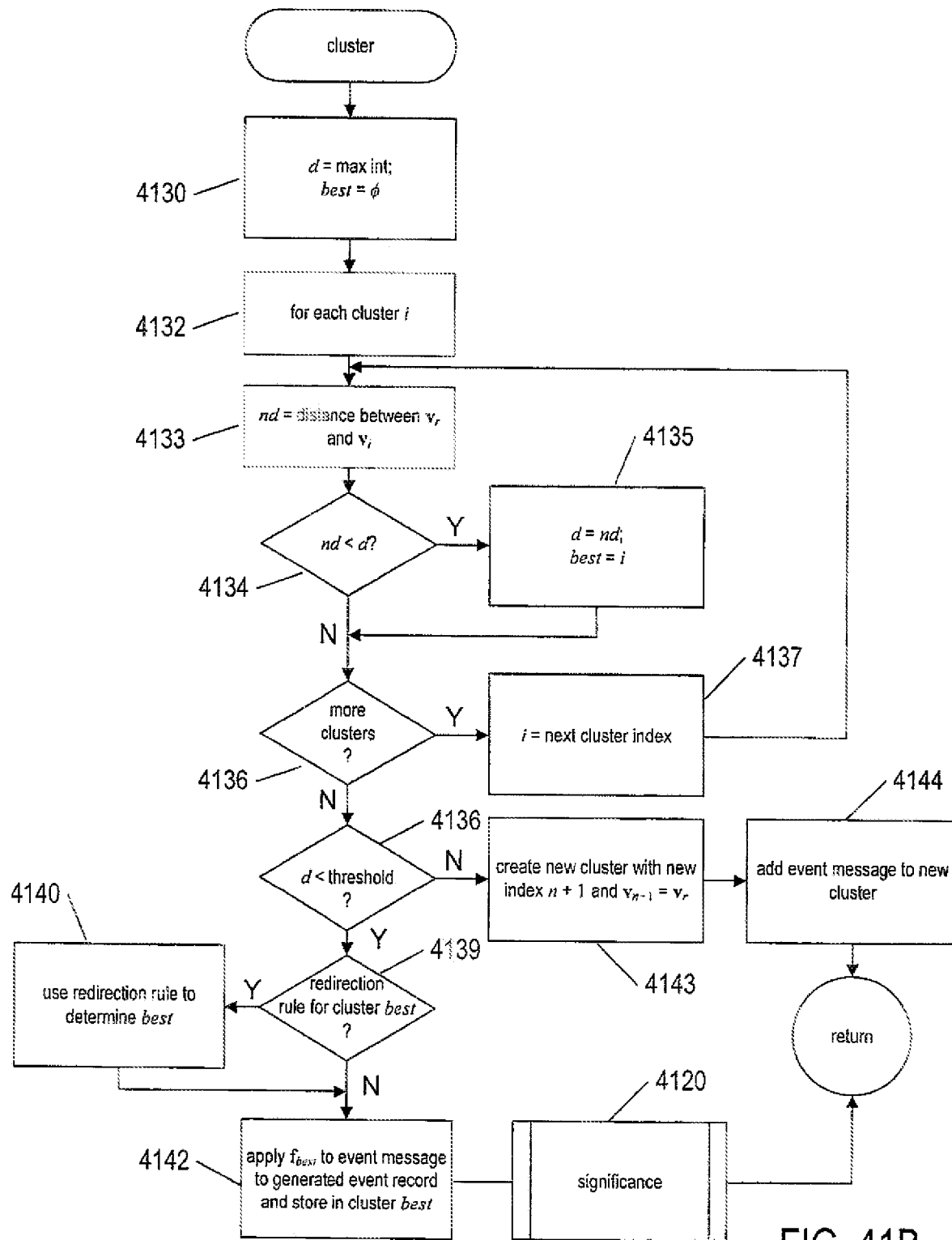

FIG. 41B illustrates a modification to the "cluster" routine. In the modification shown in FIG. 41B, a call to a routine "significance" is made, in step 4120, following preparation of an event record for an incoming event message.

Figure 41C:
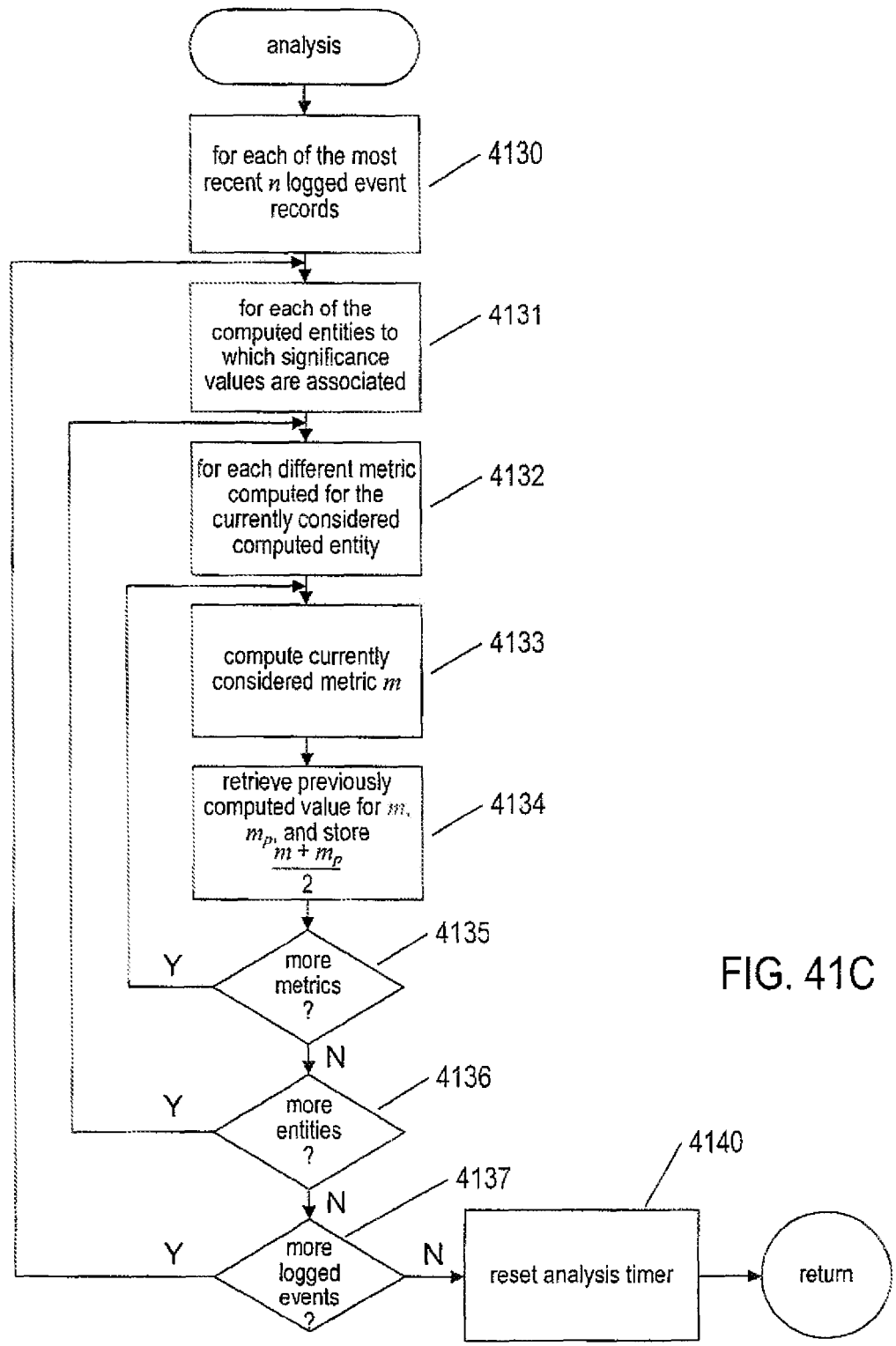

FIG. 41C provides a control-flow diagram for the routine "analysis." called in step 4112 of FIG. 41A. The routine "analysis" computes various significance metrics for various combinations of the elements of the event-message-type defining vector used to compute the significance of an event message, as discussed above with reference to the equation representing the weighted sum of computed significances. The outer for-loop of steps 4130-4137 considers each of the most recent n logged event records. An intermediate for-loop of steps 4131-4136 considers each of the various computed entities, or elements, to which significant values are associated, including single elements and combinations of elements of the event-message-type-defining vector. An innermost for-loop of steps 4132-4135 considers each different metric that may be computed for a particular single element or combination of elements. Once all the significances are computed, in nested for-loops 4133-4137, the analysis timer is reset in step 4140. It should be noted that the weighting factors $\alpha_i$ in the above-discussed equation for computing the significance of an event-message type are generally constant parameters supplied manually but, in more sophisticated, adaptive systems, may themselves be periodically recomputed based on an optimization-type analysis constrained to offer a best possible prediction of significant events with respect to some objective criteria.

Figure 41D:
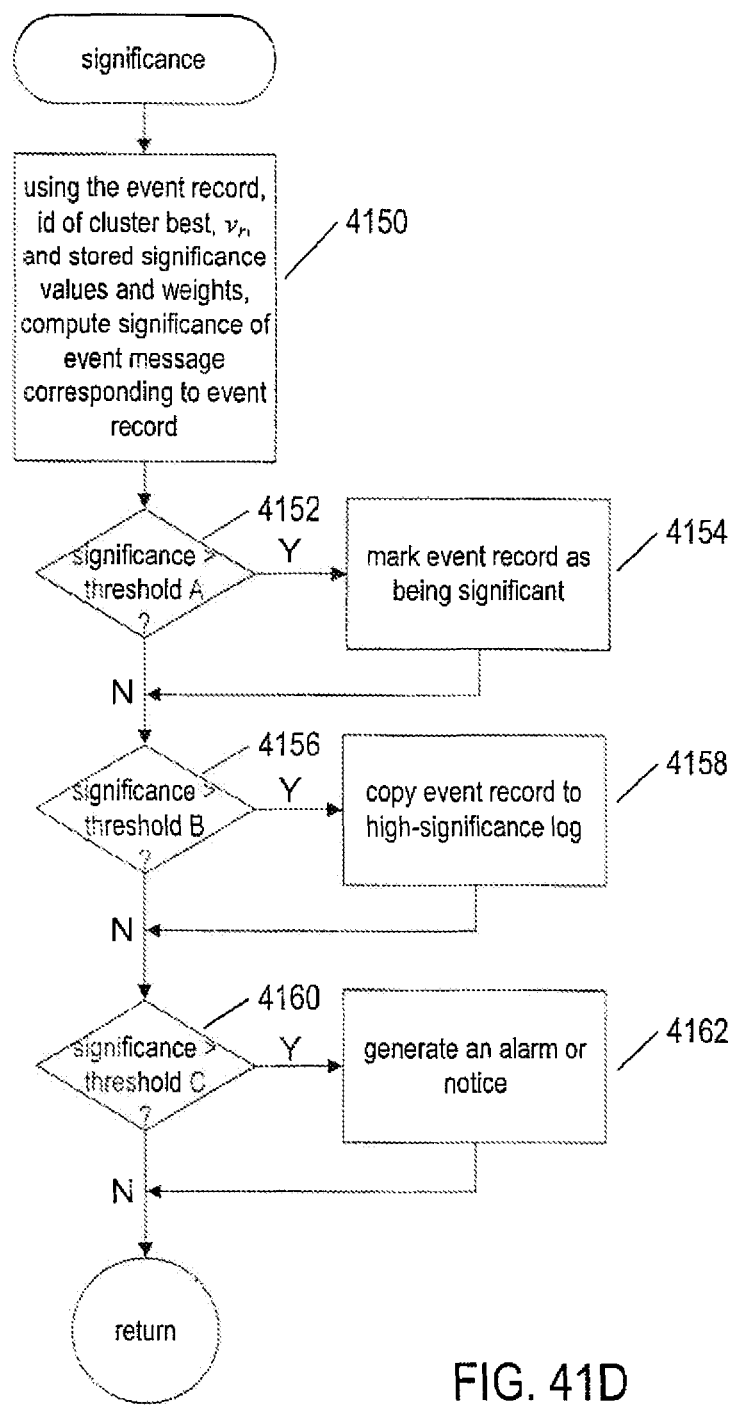

FIG. 41D provides a control-flow diagram for the routine "significance," called in step 4120 of FIG. 41B. In step 4150, the routine "significance" computes the significance for an incoming event message for which an event record has been prepared. This computation may use specific values for the cluster ID, feature vector, variables extracted from the event message, and other such elements to look up computed significances for those elements previously computed by the routine "analysis." These stored significance values are then multiplied by corresponding weight factors and combined together to compute the significance for the event message. When the computed significance is greater than a first threshold value, as determined in step 4152, then the routine "significance" marks the event record as being significant in step 4154. In certain implementations, the actual significance value may be included in the event record. In other implementations, a field within the event record may be set to indicate that the event record corresponds to a significant event. In yet additional implementations, the event record may have a field that can be set to a number of discrete values corresponding to increasing significance. When the computing significance is greater than a second threshold as determined in step 4156, the routine "significance" copies the event record to a high-significance event log, in step 4158. The high-significance event log may be much smaller than the event log that contains all event messages, and therefore may be easier to monitor and more efficient to store for long periods of time. When the computed significance for the event message is greater than a third threshold, as determined in step 4160, the routine "significance" generates an alarm or notice, in step 4162, which may be transmitted to an automated system-administration subsystem or to a human system administrator. Thus, reception of certain types of event messages may automatically generate alarms, notices, and other notifications within the distributed computing system.

Figure 42A:
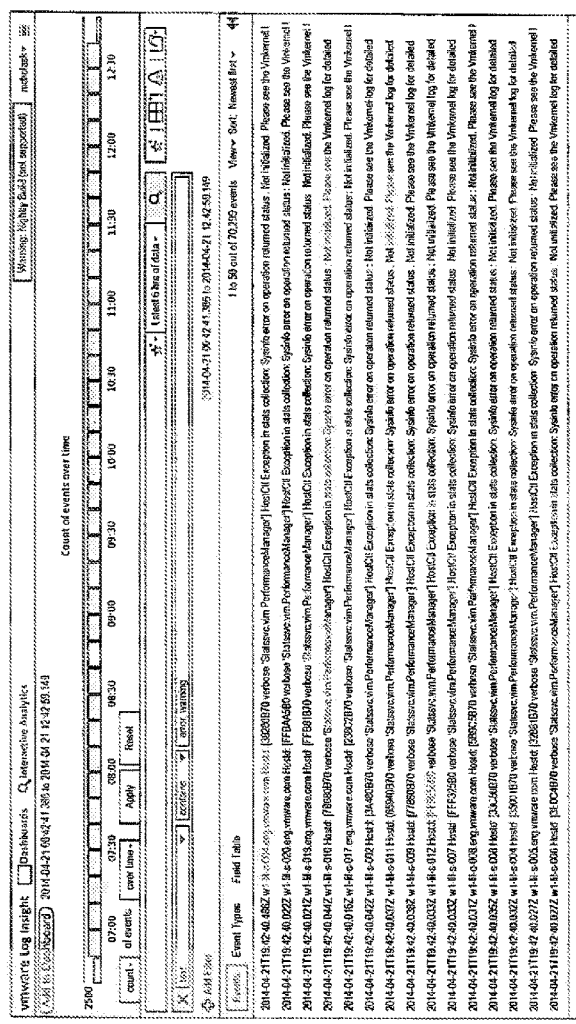
FIGS. 42A-B illustrate certain advantages provided by event clustering, discussed in previous subsections, related to display of event-log and log-file entries, which can be clustered into event-type categories by the above-discussed clustering methods.
Figure 42B:
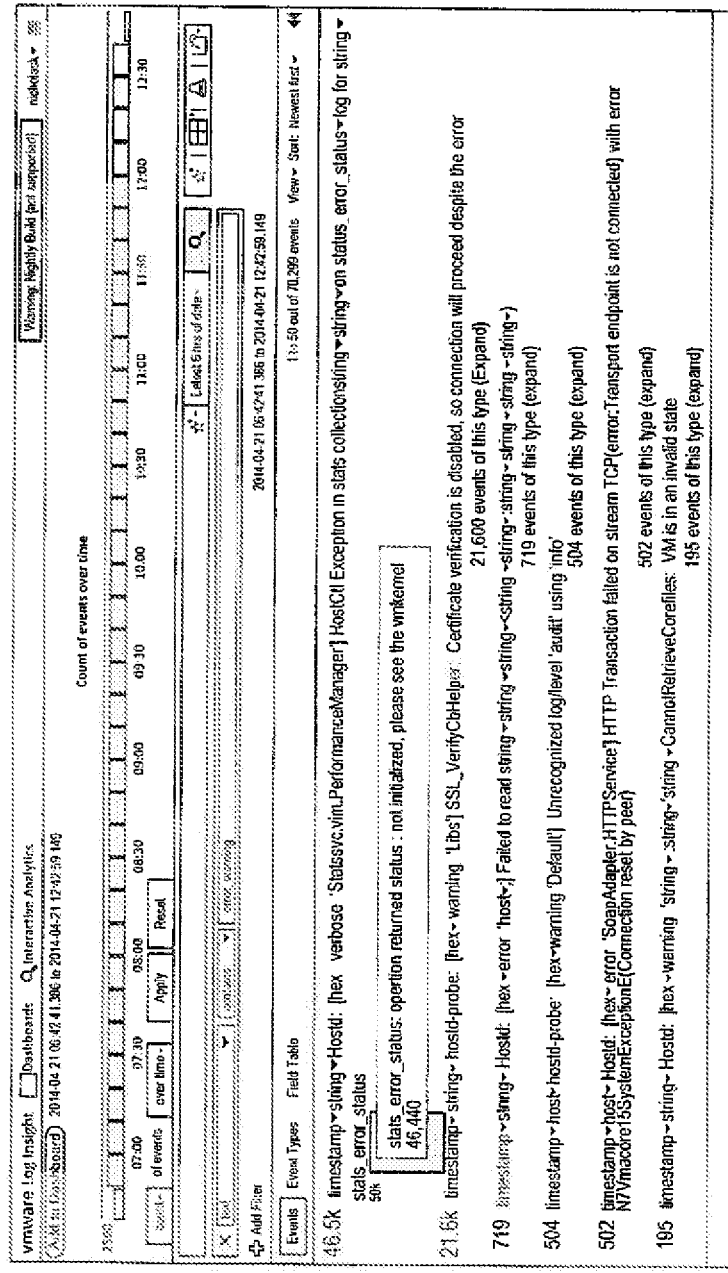

Automated Displayed Event-Message Annotation Methods and Subsystems to which the Current Document and Claims are Directed FIGS. 42A-B illustrate certain advantages provided by event clustering, discussed in previous subsections, related to display of event-log and log-file entries, which can be clustered into event-type categories by the above-discussed clustering methods. FIG. 42A shows an event-log-display-application user interface in which information about numerous logged events is displayed. The display window 4202 is sufficiently large to display textual representations of only 15 events. The actual number of events, in this example, is over 70,000, as a result of which a user would need to scroll through many pages of displayed events and carry out extensive mental analysis in order to attempt to draw conclusions as to underlying states of, and problems associated with, the computer system in which the events are generated. When the above-described methods are used to cluster events into event types, and when a customer elects to display information about the event types in the log file, rather than discrete events, a much more accessible display of information is provided, as shown in FIG. 42B. In this case, the display window 4204 displays information related to those event types to which the discrete events, displayed in FIG. 42A, belong. In the example from which FIGS. 42A-B were generated, two-thirds of the over 70,000 discrete events belong to just 19 event types. In this case, when the event types are displayed in descending order based on the number of events in the event log belonging to the event types, a user can quickly ascertain the predominant event types recorded in the event log and, from the identities and order of the event types, can often immediately begin to propose hypotheses as to the state of, and problems associated with, the computer system in which the events were generated.

While it is clear that event typing, alone, provides enormous advantages in the display of event-log entries, as discussed above with reference to FIGS. 42A-B, display of event types, alone, is not a complete solution to the problems faced by developers, systems administrators, and other professionals who need to analyze the contents of event logs and/or monitor textual representations of events in real time in order to ascertain the state and various operational characteristics of a computer system as well as to identify and diagnose particular problems. For example, presented with the displayed representations of the event types to which the most frequently occurring events belong, as in the displayed event types within the display screen shown in FIG. 42B, a user may still need to access specific events in order to develop a set of search terms that the user can then input to various types of search engines in order to find additional information about certain specific types of events and/or error messages, various groups of events and or error messages, and types of events. This information may include blog pages, FAQ pages from various forums, web-page articles, knowledge-based articles, links to various different types of documents, identifiers for on-line documents available from various archives and libraries, articles or specifications for various types of system components, including hardware and software components, and even postal addresses, email addresses, or telephone numbers for particular developers or diagnostic experts who may be able to assist an analysis or diagnosis related to particular events, groups of events, or types of events. Currently, developing search criteria and carrying out searches is a time-consuming, tedious, and often imprecise approach to gathering additional information about various types of system states, operational characteristics of a system, particular problems, and specific component values.

Figure 43A:
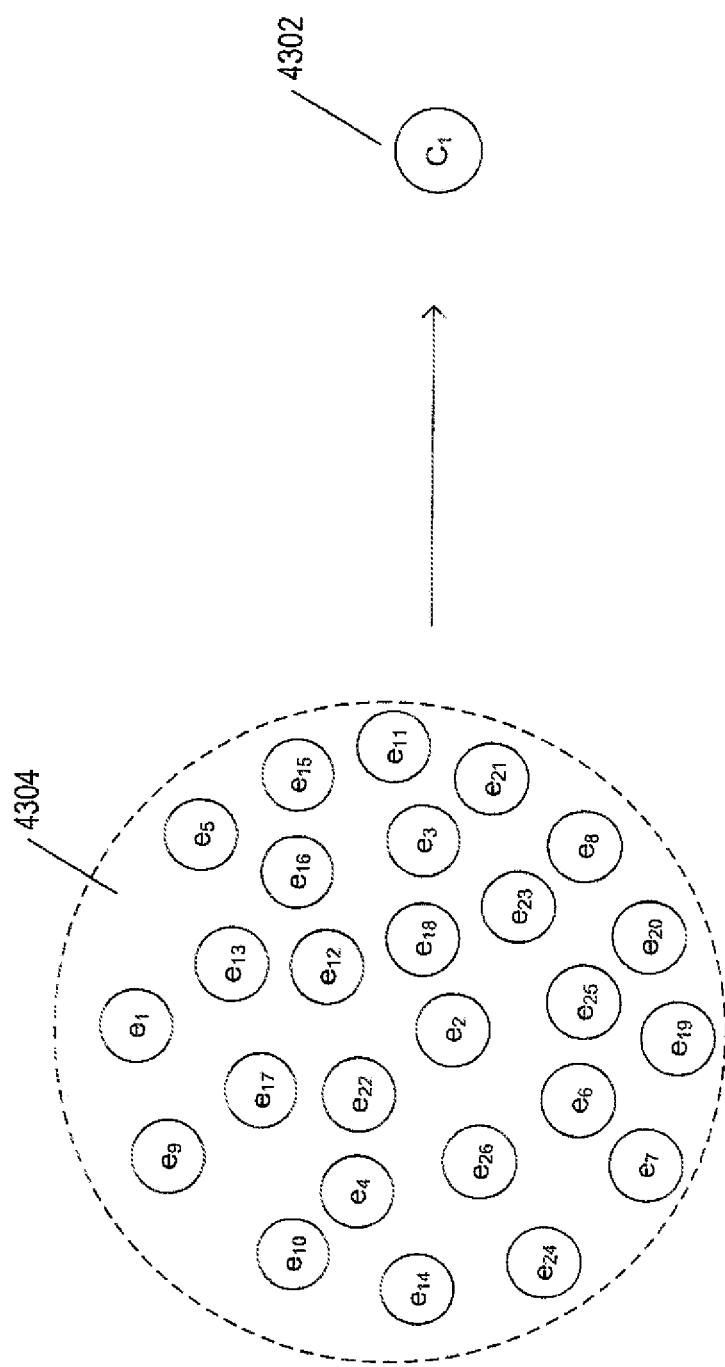
FIGS. 43A-D illustrate the basis for an automated approach to efficiently obtaining additional information about event types, displayed to a user by an event-log-analysis system, such as in the display screen shown in FIG. 42B.
Figure 43B:
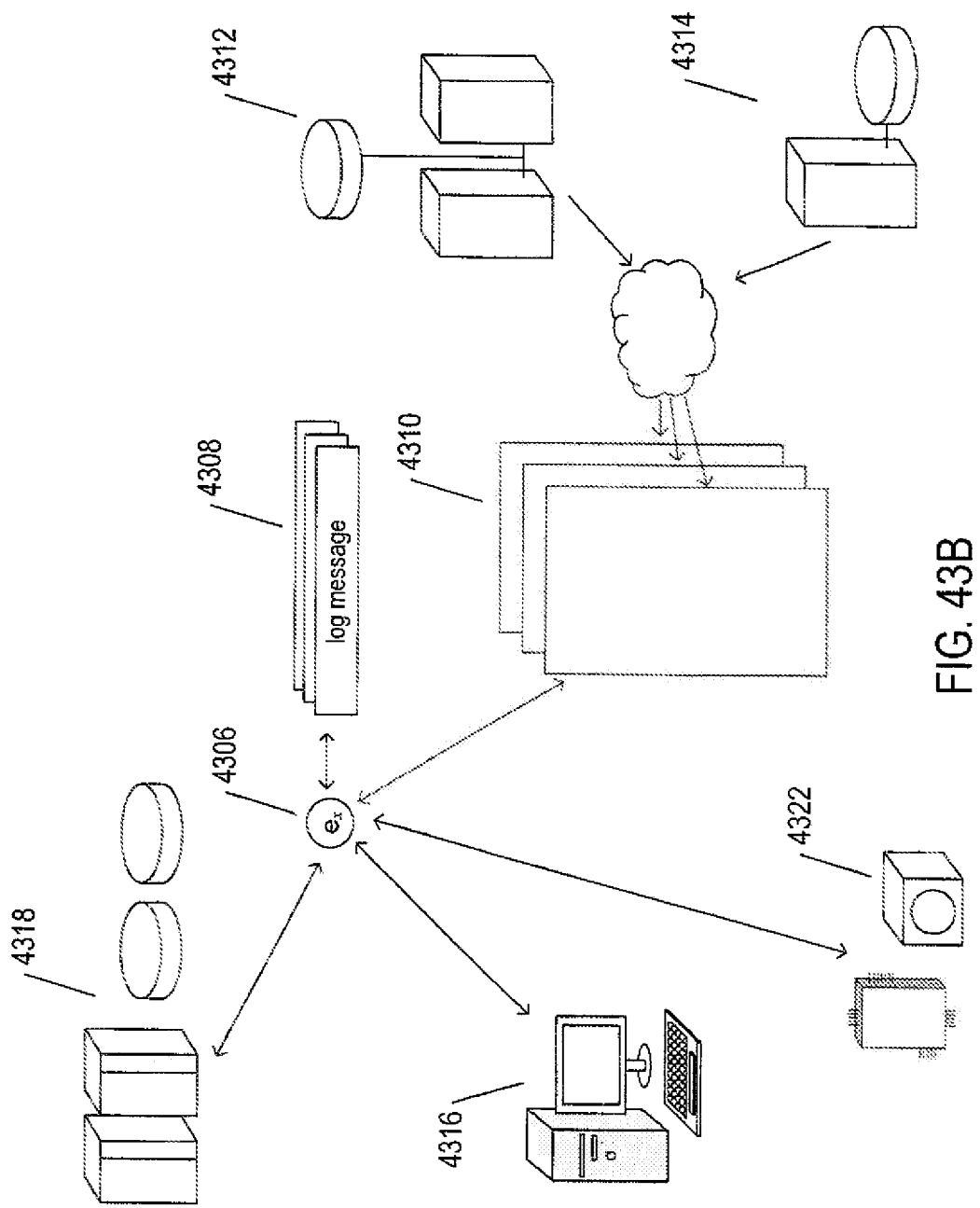

FIGS. 43A-D illustrate the basis for an automated approach to efficiently obtaining additional information about event types, displayed to a user by an event-log-analysis system, such as in the display screen shown in FIG. 42B. As shown in FIG. 43A, a particular cluster or event type 4302 represents a collection of specific events 4304, such as specific entries found in event-log files or reported through various types of event-reporting subsystems and displays. The event type, or cluster 4302, may represent anything from a handful of specific events to thousands or more different events, as discussed in previous subsections. Any given specific event may be associated with many different types of additional information. As shown in FIG. 43B, a specific event 4306 may represent a number of different log messages 4308, such as a particular parameterized log message in which parameterized entities, such as dates or system names may vary. The specific parameterized event 4306 may be well known and described in a variety of different types of information sources. These may include documents, such as articles, blog pages, messages accumulated in a FAQ, web pages, documents obtained through online document-retrieval systems, and many other types of documents 4310 obtained from many different types of remote systems, archives, data centers, libraries, and other information sources 4312 and 4314. In addition, the specific parameterized event 4306 may be known to various individuals, such as developers, system administrators, diagnostic experts, component vendors, and other such individuals that can be reached on their personal computer systems via email 4316 and/or by other types of electronic communications, including text messages and phone calls. The specific parameterized event 4306 may be associated with various types of information in specific libraries, archives, or knowledge bases 4318, the various types of information retrievable by easily encoded addresses or search criteria. Finally, the parameterized event 4306 may be discussed in product specifications or online information associated with particular types of system components, including processors 4320, data-storage devices 4322, and many other types of components, both hardware and software. These are but a few of the many different types of additional information that may be associated with a particular specific parameterized event.

Figure 43C:
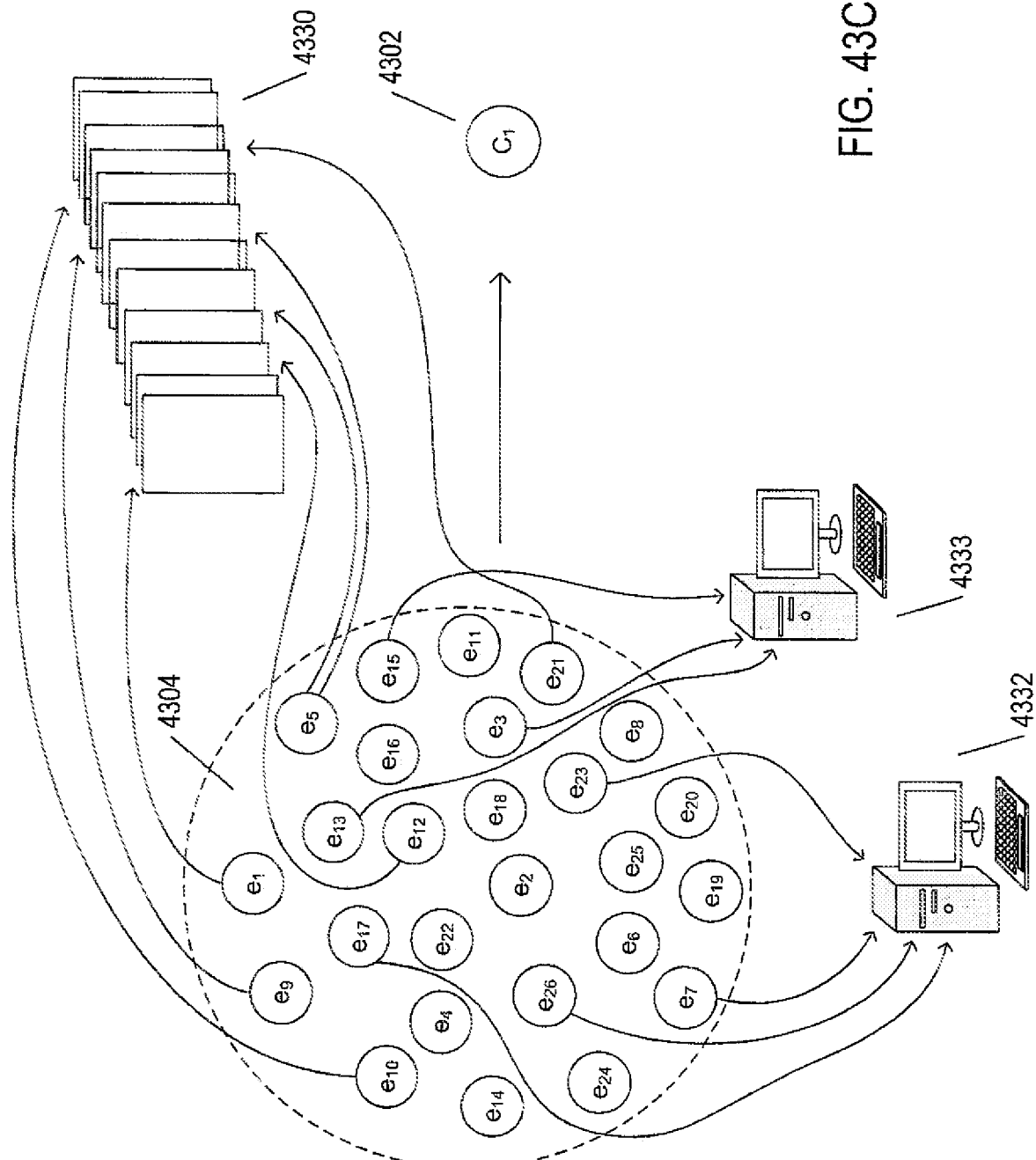

As shown in FIG. 43C, because each specific event associated with an event cluster, or event type, may be associated with numerous different types of additional information, the collection of events 4304 associated with a particular event cluster or event type 4302 may be described by a great many different documents 4330, developers and other experts 4332 and 4333, and a huge number of additional information entities too copious to show in a simple illustration.

Figure 43D:
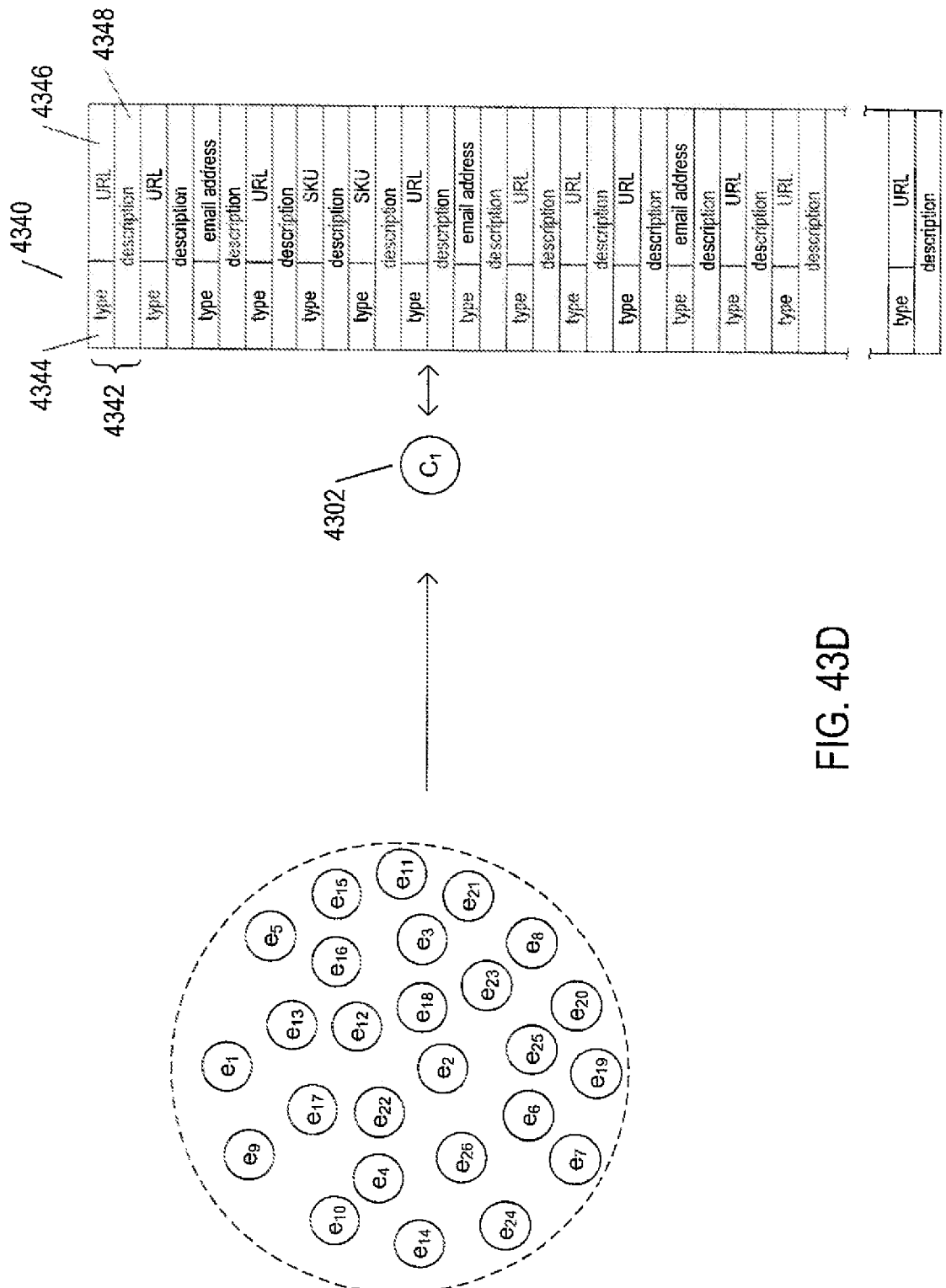

Because of the enormous amount of information that may be potentially available for any given event cluster or event type, only a systematic, automated approach to collecting and associating additional information available from many different information sources for each event type or event cluster can provide the accurate, efficient, and rapid display of additional information related to event types to users through an event-type-occurrence display interface, such as that discussed above with reference to FIG. 42B. Therefore, in the disclosed implementations, as shown in FIG. 43D, each event type or event cluster 4302 is associated, via automated methods and subsystems, with a set of descriptors 4340 for the additional information available for the given event cluster or event type 4302. The set of descriptors is stored in one or more physical data-storage devices, including electronic, electromechanical, and electro-optico-mechanical data-storage devices, including magnetic-disk-based physical data-storage devices, electronic memories, optically accessed disks, and other such physical data-storage devices. Of course, those familiar with modern science and technology well recognize that electromagnetic radiation does not and cannot store data for subsequent retrieval and does not constitute, by any stretch of the imagination, a physical data-storage device. The set of descriptors 4340 may be stored in flat files, in relational-database tables, and other types of databases, or as multi-field records in a variety of different types of databases and record-storing utilities. As shown in FIG. 43D, each descriptor, such as descriptor 4342, in the set of descriptors includes a type field 4344 that indicates the type of the encoded address for the information source 4346 in a second field as well as a third description field 4348 that contains a short textual description of the additional information.

Figure 44:
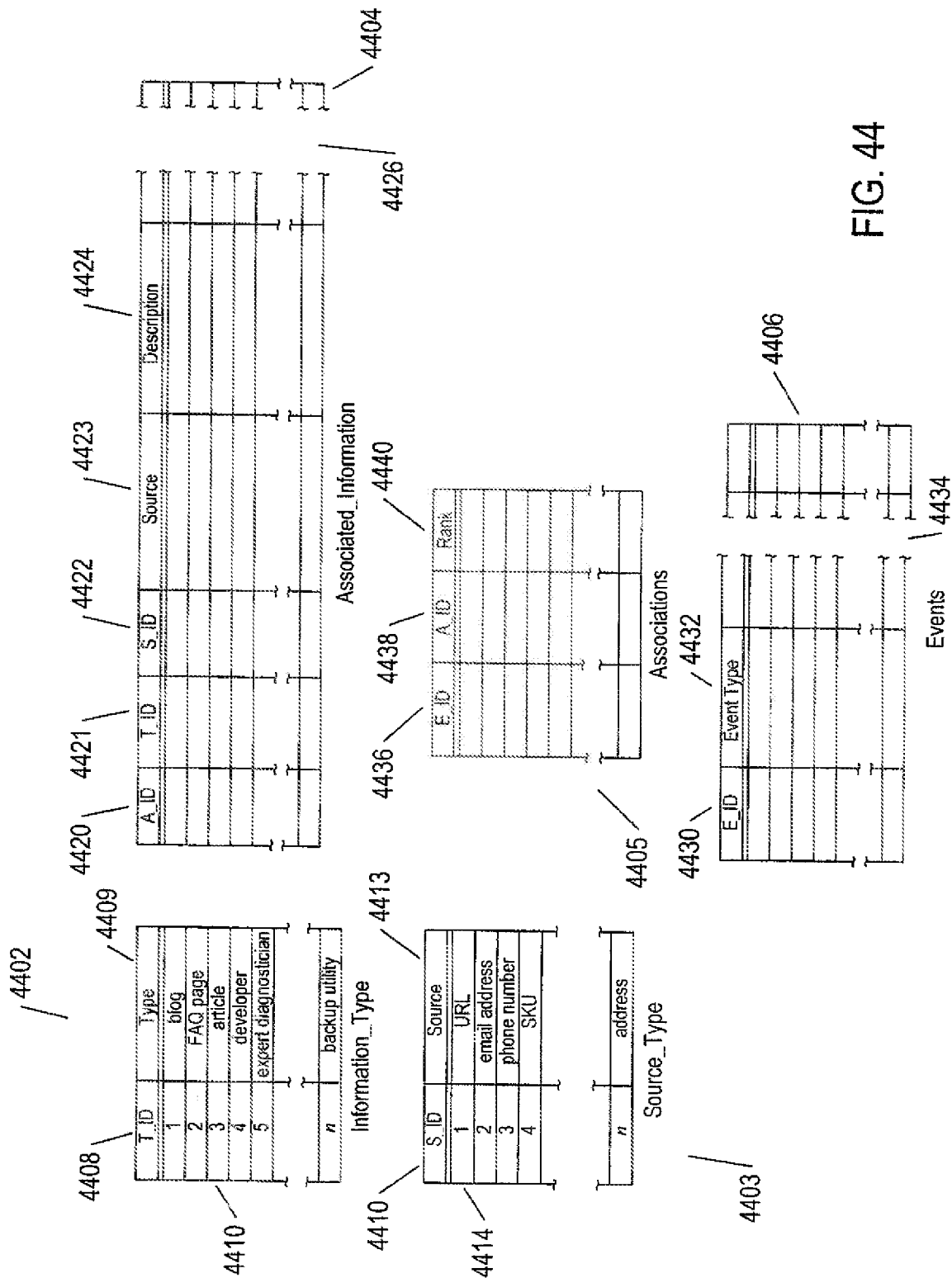
FIG. 44 illustrates a simple relational-database schema used in one implementation of the disclosed methods and systems to store the additional information that has been accumulated for event clusters or event types.

FIG. 44 illustrates a simple relational-database schema used in one implementation of the disclosed methods and systems to store the additional information that has been accumulated for event clusters or event types. This schema consists of five relational-database tables 4402-4406. Each row of the Information_Type table 4402 represents a particular type of additional information. Each row contains values for two different columns 4408-4409 that correspond to a numeric ID for the information-source type and a textural description of the type, respectively. For example, the third row 4410 represents the type "article" which is assigned the identifier "3." Each row of the Source_Type table 4403 represents a type of information-source address or descriptor. Each row contains values for two different columns 4412-4413 that represent a numerical identifier for the information-source address or descriptor and textural description of the information-source address or descriptor, respectively. For example, the first row 4414 in the Source-_Type table 4413 represents a uniform resource locator ("URL") that is assigned a numeric identifier "1." Each additional-information entity for each event type is contained in the Associated_Information table 4404. Each row of the Associated_Information table represents a particular additional-information entity that is associated with a particular event cluster or event type. The Associated_Information table 4404 includes the five columns 4420-4424 shown in FIG. 44 and may contain additional columns, as represented by broken column 4426. The five columns include: (1) A_ID 4420, an identifier for the additional-information entity; (2) T_ID 4421, the ID for the information type of the additional-information entity; (3) S_ID 4422, the source type for the additional-information entity; (4) Source 4423, an address or descriptor appropriately constructed and formatted for the information source from which the additional information entity can be obtained using the address or descriptor; and (5) Description 4424, a textural description for the additional-information entity. Each row of the Events table 4406 represents a different event cluster or event type. Each event type is characterized by a numeric event identifier, represented by column 4430, and a textural description of the event type, represented by column 4432. Broken column 4434 indicates that other columns may be present in an events table. Finally, the table Associations 4405 represents associations between associated-information entities, represented by rows in the Associated_Information table 4404, and event types, represented by rows in the Events table 4434. In addition, each event type associated with an additional-information entity is also represented by a numeric rank value, indicating the rank of the associated-information entity with respect to all associated-information entities associated with the particular event type. Thus, the Associations table 4405 includes three columns representing event-type identifiers 4436, a second column representing associated-information-entity identifiers 4438, and a third column representing numerical ranks 4440.

FIG. 45 provides a structured query language ("SQL") routine that gathers additional-information entities related to a particular event type from the relational-database table shown in FIG. 44 and inserts them into a Results table for use by a display routine for displaying additional information related to event types, as discussed below. The SQL procedure is named "GetAnnotations" and takes a single argument etype that is a variable-character-string representation of an event type 4504. First, the procedure "GetAnnotations" creates the Results table 4506. This table is then populated by rows from an implied table created by a select clause that represents a join between the five tables shown in FIG. 44 4508. This routine assumes that the results are subsequently used by an events-display routine and then dropped prior to a next call to the procedure "GetAnnotations."

Figure 46A:
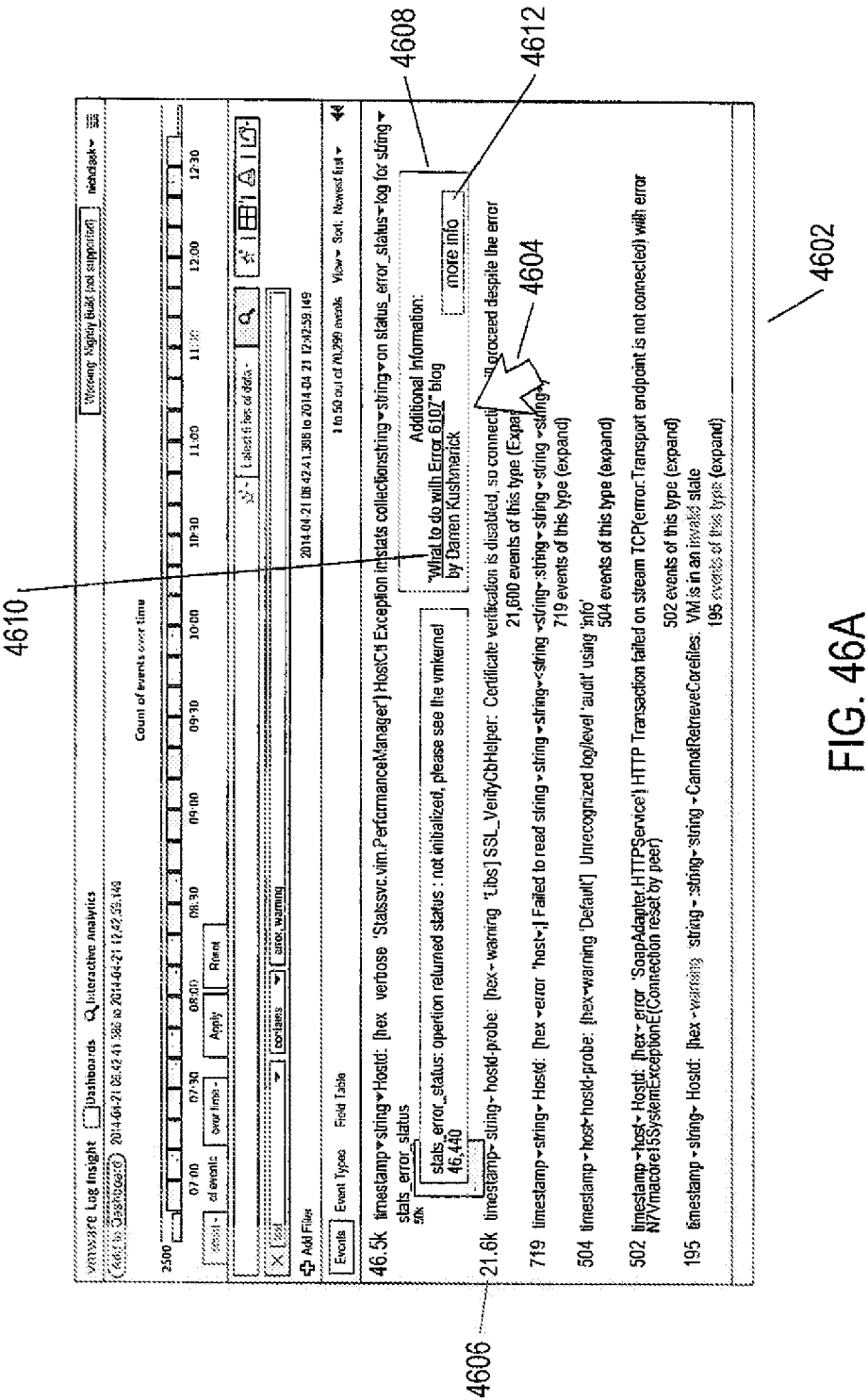
FIGS. 46A-D illustrate one implementation of an event-type display interface, such as that discussed above with reference to FIG. 42B, that further includes mechanisms for the display of additional information associated with any particular event type, using additional information stored within a physical data-storage device, such as a physical-data-storage device storing the above-discussed relational tables.

FIGS. 46A-D illustrate one implementation of an event-type display interface, such as that discussed above with reference to FIG. 42B, that further includes mechanisms for the display of additional information associated with any particular event type, using additional information stored within a physical data-storage device, such as a physical-data-storage device storing the above-discussed relational tables. In FIG. 46A, the event-type display screen 4602, previously provided in FIG. 42B, is shown with a mouse-controlled cursor 4604 positioned to point to, or select, the displayed event type 4606. Positioning of the cursor to point to displayed event type 4606 automatically elicits display of an additional-information window 4608 that displays a textual representation for the highest-ranked additional information associated with the event type 4606. The displayed information includes a hyperlink 4610, to which a user may input a mouse click to display the blog page entitled "What To Do With Error 6107." In addition, the additional-information window 4608 includes a "more info" feature 4612, to which the user may input a mouse click to display more or all of the additional information associated with the event type.

Figure 46B:
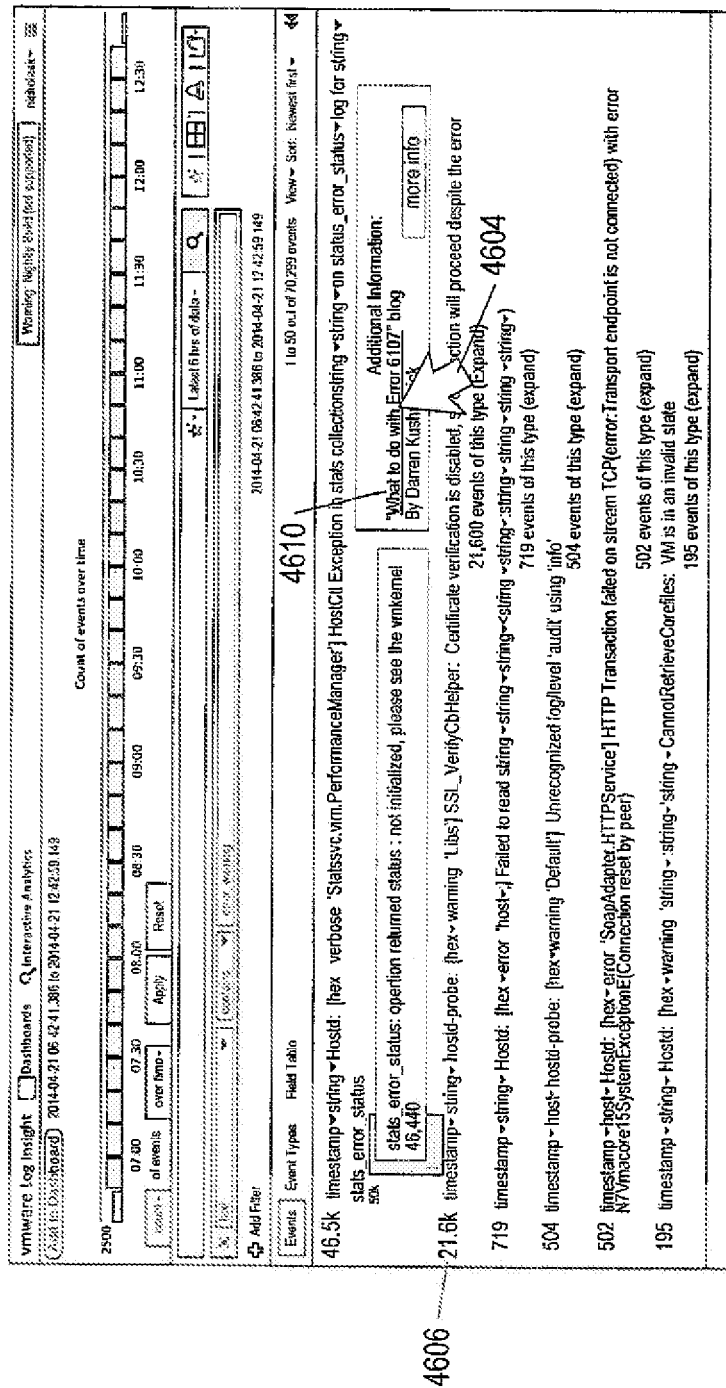
Figure 46C:
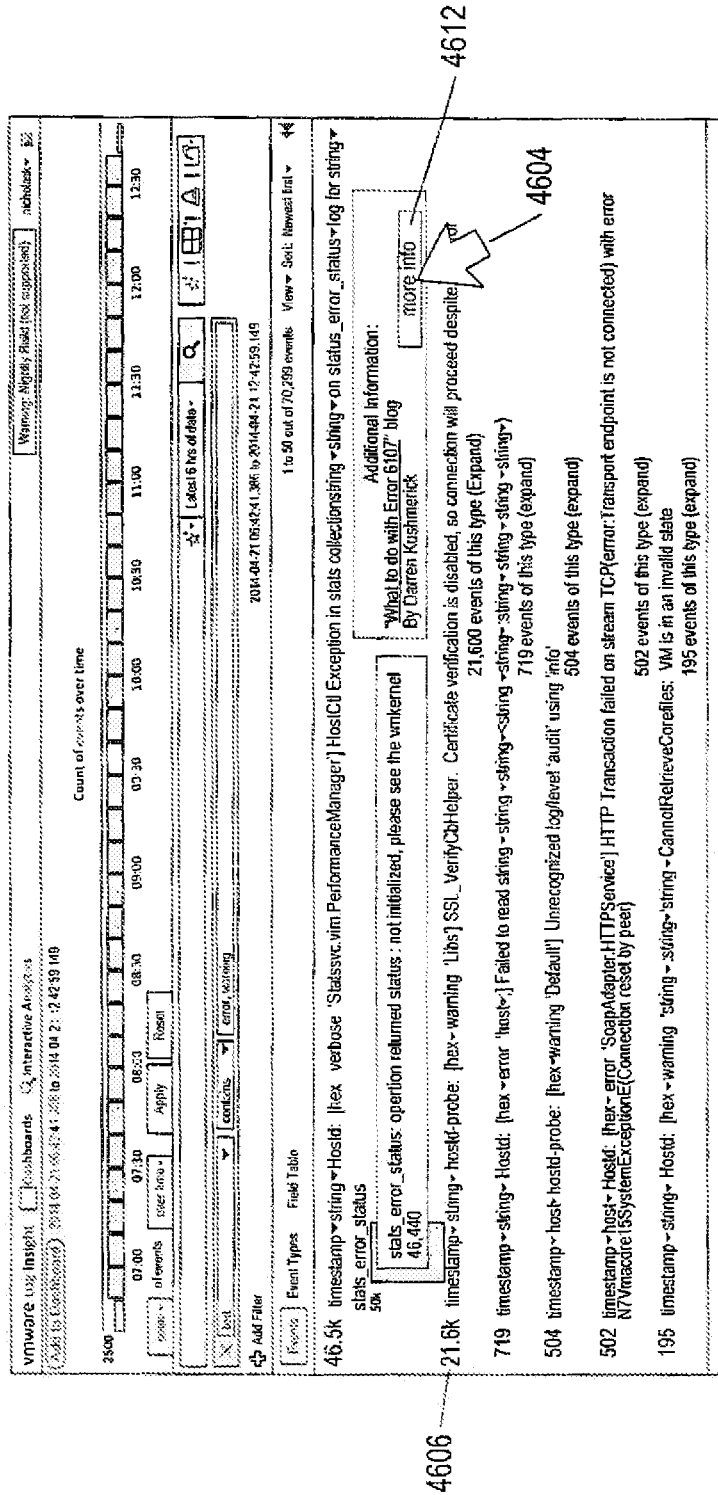
Figure 46D:

FIG. 46B illustrates movement of the cursor by the user, via the user's mouse, to point to the hyperlink 4610 in order to display the blog page entitled "What to do with Error 6107." When the user inputs a mouse click to the hyperlink, the blog page is displayed over, to the side of, above, or below the event-type display screen 4602 to allow the user to read the blog page to obtain additional information about event type 4606. FIG. 46C illustrates movement of the cursor 4604, by manipulation of the user's mouse, to point to the "more info" input feature 4612. When the user inputs a mouse click to the "more info" input feature 4612, indications of the additional-information entities related to event type 4606 are displayed in a separate scrollable window, as shown in FIG. 46D. The scrollable window includes a scroll feature 4620 that a user can manipulate with the user's mouse to scroll through representations of the various additional-information entities associated with event type 4606. Input of a mouse click to a particular additional-information entity results in display of the additional-information entity over, to the side of, above, or below the event-type display window 4602. Thus, while viewing event types displayed by an event-log-analysis-and-rendering application, the user may quickly identify and display additional information associated with the event in order to formulate hypotheses and carry out analyses based on the displayed event types without having to methodically and slowly accumulate information to pose queries to one or more search engines. As can be appreciated by developers, system administrators and other who have had to analyze events stored in event logs and displayed through event-log-analysis applications, the ability to identify and display additional information related to displayed log events via mouse manipulation and input of mouse clocks to hyperlinks and displayed texts can greatly facilitate use of displayed event-log entries for any of the many different purposes for which event-log files are used.

Figure 47A:
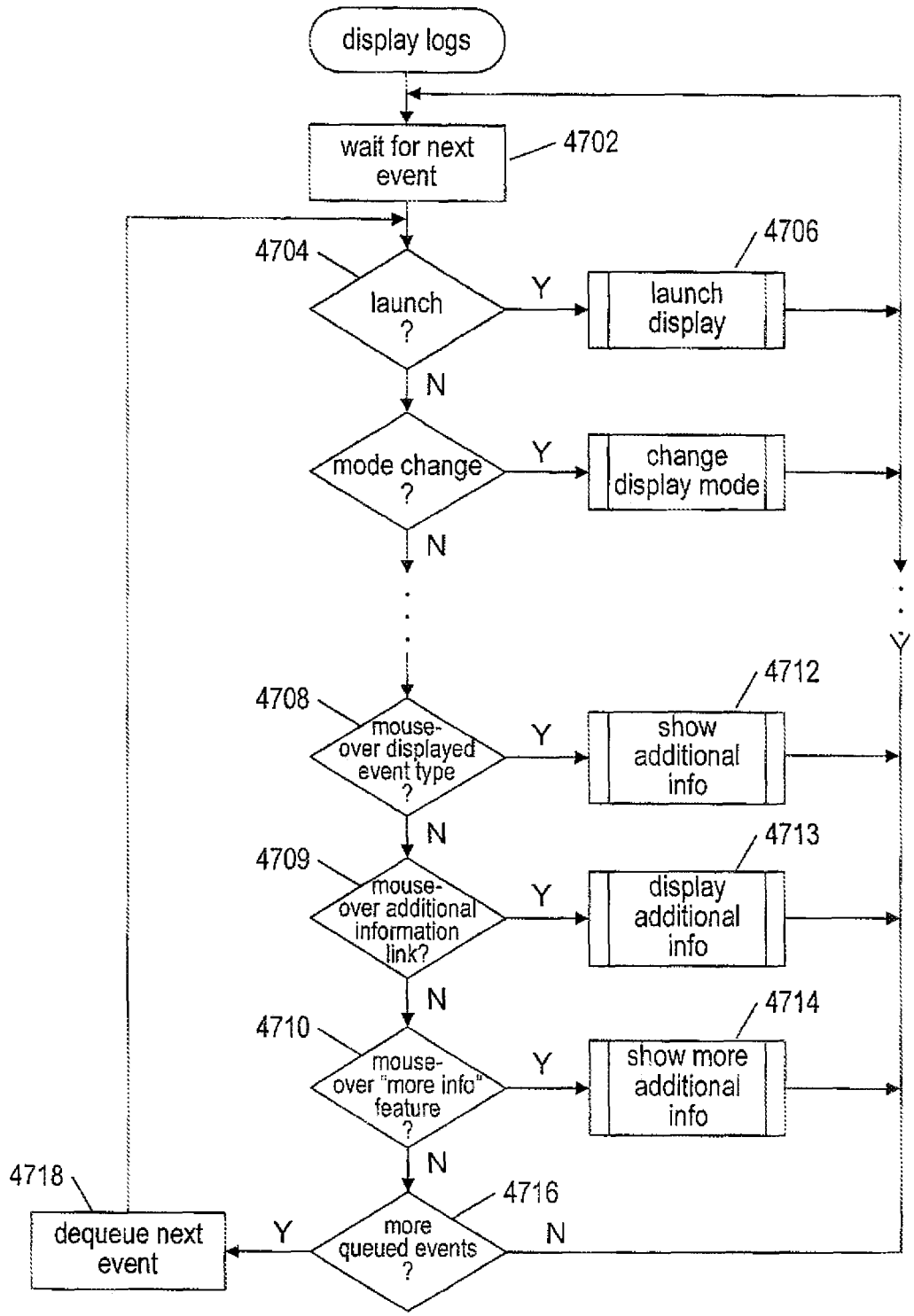
FIGS. 47A-C provide control-flow diagrams that illustrate how display of additional information related to event types or event clusters is incorporated into a subsystem that displays event-log entries and/or event types, examples of which include the display screens shown in FIGS. 42A-B.
Figure 47B:
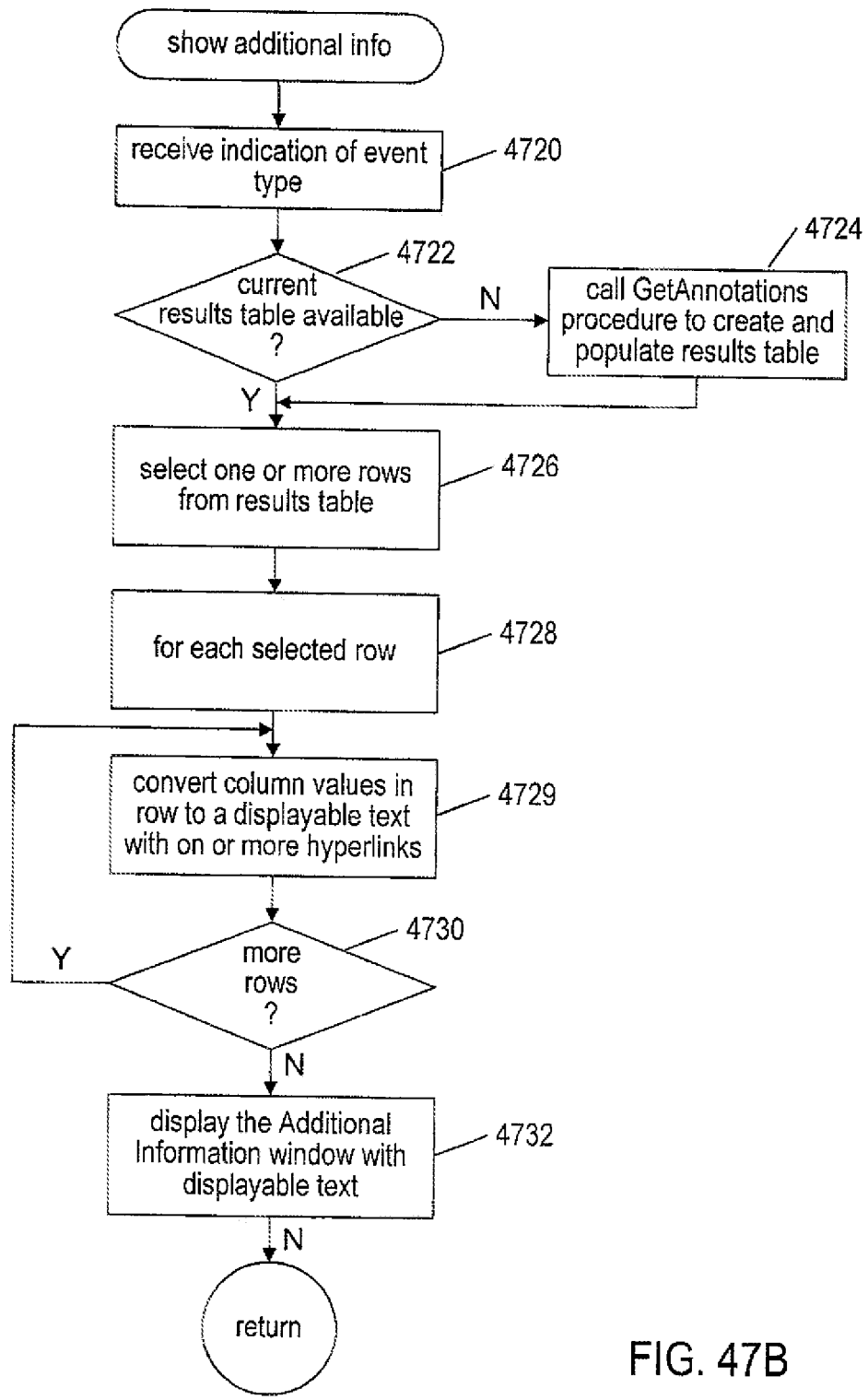
Figure 47C:
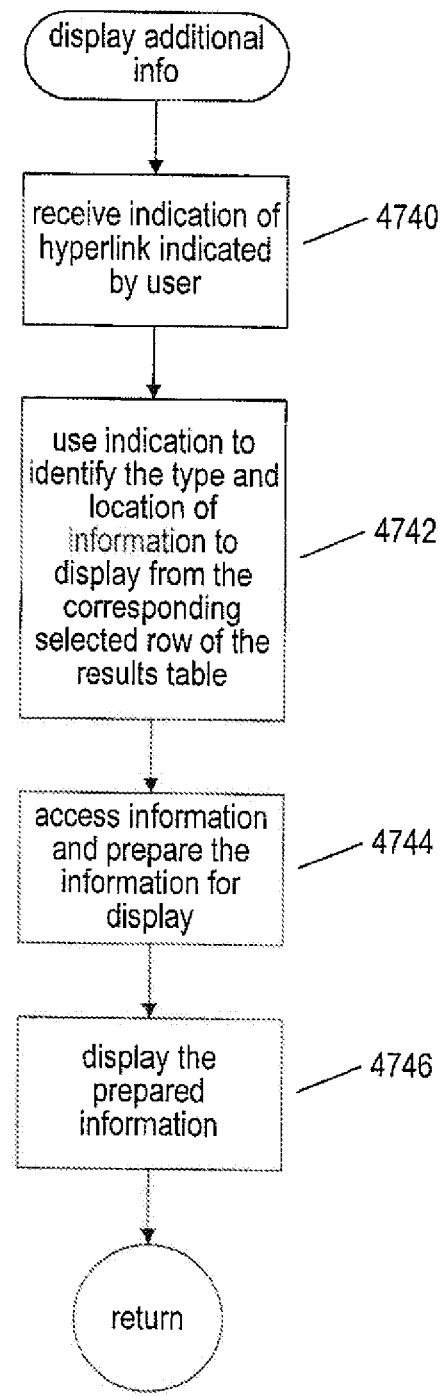

FIGS. 47A-C provide control-flow diagrams that illustrate how display of additional information related to event types or event clusters is incorporated into a subsystem that displays event-log entries and/or event types, examples of which include the display screens shown in FIGS. 42A-B. One implementation that enhances such displays with display of additional information related to event types or event clusters harvested from a variety of different information sources is discussed above with reference to FIGS. 46A-D.

FIG. 47A provides a control-flow diagram for the event loop that underlies a subsystem that displays event-log entries and event types or clusters. This event loop is implemented as the routine "display logs." In step 4702, the routine "display logs" waits for a next event to occur. When a next event occurs, the type of event is determined by a series of conditional steps, such as step 4704, so that an appropriate handler for the event can then be called, such as invocation of the handler "launch display" 4706 when the next-occurring event is a launch event. Incorporation of the display of additional information related to event types or event clusters is obtained, in a described implementation, by the three conditionals 4708-4710 that, when returning a true value, result in calling the three handlers 4712-4714. Following handling of the next-occurring event, when there are more events queued for handling, as determined in step 4716, a next event is dequeued, in step 4718, prior to returning to step 4704. Otherwise, control returns to step 4702, where the routine "display logs" waits for a next event to occur.

When the next-occurring event is a mouse-over displayed-event-type event, as determined in step 4708, which, for example, occurs in the situation shown in FIG. 46A when the cursor 4604 is moved over the display event type 4606, the handler "display additional info" is called in step 4713 to display the additional-information window (4608 in FIG. 46A). When the next-occurring event is a mouse-over additional-information-link event, as determined in step 4709, as arises in the situation shown in FIG. 46B, when the cursor 4604 is moved to point to hyperlink 4610, the handler "display additional info" is called in step 4713. When the next-occurring event is a mouse-over the "move info" feature event, as determined in step 4710, as occurs in the situation shown in FIG. 46C, where the cursor 4604 has been moved to point to the "more info" feature 4612, the handler "show more additional info" is called in step 4714. Other similar event-recognizing conditionals and corresponding handlers may be included to handle, for example, scrolling of the window, discussed above with reference to FIG. 46D, that displays indications of the additional-information entities associated with an event type or event cluster, events that arise from inputting, by a user, inputs to a displayed representation of an additional-information entity displayed in the window shown in FIG. 46D, and for other such additional-information-display-related events.

FIG. 47B illustrates the handler "show additional info" called in step 4712 of FIG. 47A. In step 4720, the handler receives an indication of the event type over which the cursor has been moved. This information is provided by the log-entry display application, which tracks the event types currently displayed in a display screen or other user interface in which event types are displayed to users. In step 4722, the handler determines whether there is a current results table available for the event type. For example, when the user moves the cursor away from a particular event type and then moves the cursor back over the same event type, the results table populated by the previous mouse-over event may remain available for use in handling the current mouse-over event. When there is not a current results table for the current event type, as determined in step 4722, then, in step 4724, a call is made to the previously discussed procedure "GetAnnotations" to create and populate the results table with additional-information entities related to the event type of the displayed representation of the event type over which the mouse has been moved. In certain implementations, the current results table is dropped prior to calling the procure "GetAnnotations." In step 4726, one or more rows from a results table are selected for display in the additional-information window (4608 in FIG. 46A) invoked by the mouse-over event. When the rows in the results table are ordered by rank, an initial n rows of the results table contain the highest-ranked additional-information entities and these n rows may be selected for display in the additional-information window. The number n may be a fixed number or may be determined based on the screen area available for the additional-information window, the current display-screen resolution, and other factors. In alternative implementations, the handler may choose to display the highest rank additional-information entity for each of a number of different types of additional-information entities, such as the highest-ranked blog page, highest-ranked expert diagnostician, and highest-ranked authoritative article. In the for-loop of steps 4728-4730, each of the selected rows are converted into displayable text for display within the additional-information window. Finally, in step 4732, the additional-information window is displayed to the user with the displayable texts generated in the for-loop of steps 4728-4730 displayed within the additional-information window.

FIG. 47C provides a control-flow diagram for the handler "display additional info," called in step 4713 of FIG. 47A. In step 4740, the handler receives an indication of the hyperlink over which the cursor has been moved by a user. In step 4742, the handler uses this indication to identify the type and location of information represented by the hyperlink, using information contained in the corresponding row of the results table, and, in step 4744, accesses the information from the information source that provides the information. Finally, in step 4746, the handler displays the information, prepared for display in step 4744, to the user. For example, when the additional-information entity corresponding to the hyperlink is a document, the handler may display a third-party display window appropriate for the document type, such as a portable document format ("PDF") display window when the document is a PDF file.

Figure 48:
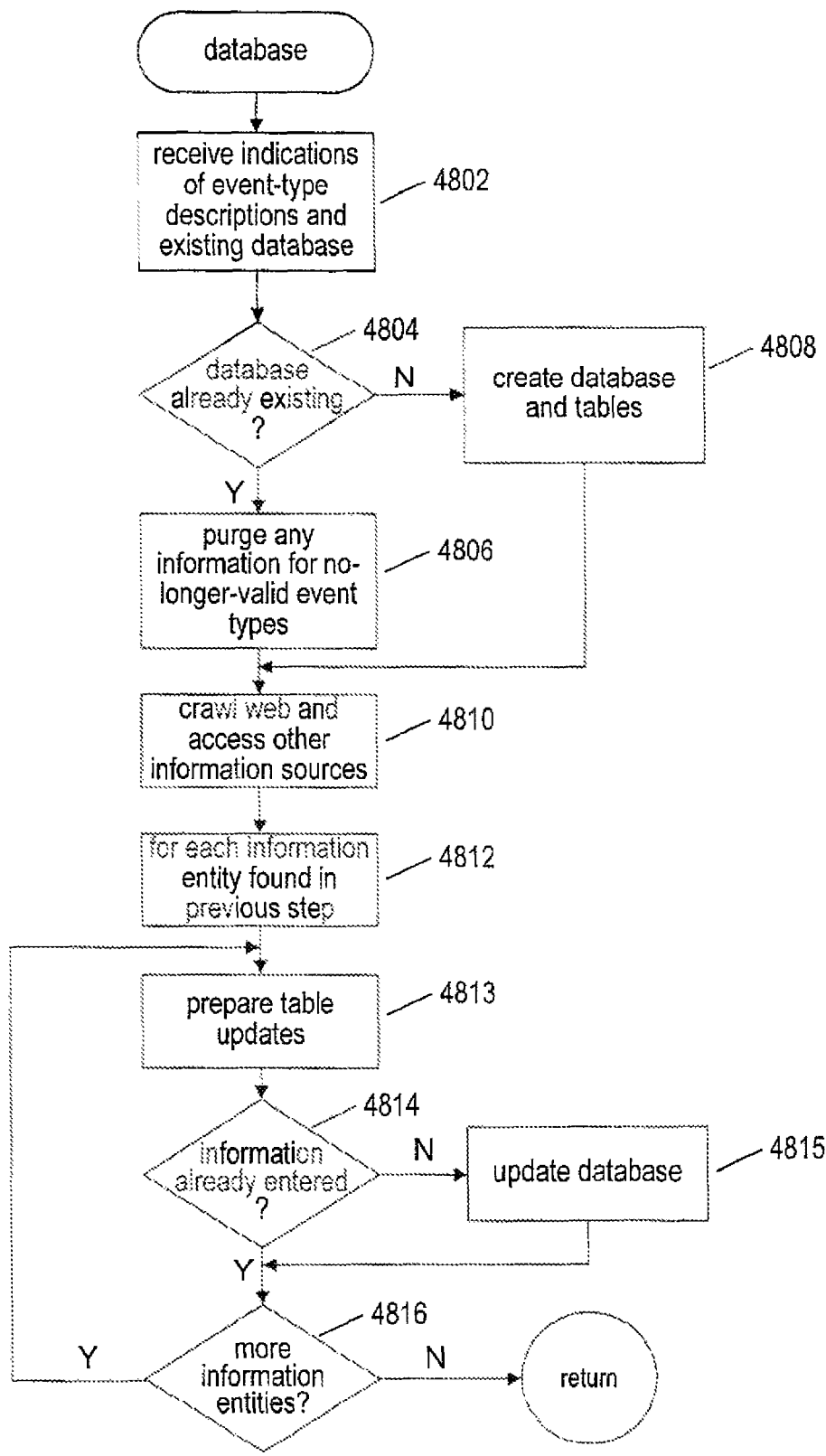
FIG. 48 provides a control-flow diagram that illustrates preparation of a database of additional-information entities, such as the database stored in the relational tables discussed above with reference to FIG. 44.

FIG. 48 provides a control-flow diagram that illustrates preparation of a database of additional-information entities, such as the database stored in the relational tables discussed above with reference to FIG. 44. The routine "database," a control-flow diagram for which is provided in FIG. 48, may be called at regular intervals within a computer system in order to create and maintain a database of additional-information entities to provide for display of additional-information entities associated with an event type or event clusters during display of event types that summarize contents of event-log files or displays of other information that include representations of events types or event clusters. In step 4802, the routine receives indications of descriptors for the current event types for which additional information is to be collected as well as for an existing additional-information database. When the additional-information database has already been created and currently exists, as determined in step 4804, information entities accumulated in the database for event types which are no longer valid are purged, in step 4806. Otherwise, the database is created along with the tables discussed above with reference to FIG. 44, in one implementation, in step 4808. In step 4810, web crawlers may be launched and other types of information-gathering programs or routines may be additionally launched to search for and collect additional information about the current event types described in the event-type descriptors received in step 4802. In the for-loop of steps 4812-4816, for each additional-information entity found in step 4810, table updates are prepared, in step 4813 and, when the additional-information entity has not already been entered into the database, as determined in step 4814, the database is updated to include the additional-information entity in step 4815.

Although the present invention has been described in terms of particular embodiments, it is not intended that the invention be limited to these embodiments. Modification within the spirit of the invention will be apparent to those skilled in the art. For example, any of many different implementation and design parameters, including hardware platforms, programming languages, virtualization layers, operating systems, modular organization, control structures, data structures, and other such design and implementation parameters may be varied in order to produce numerous alternative implementations of the currently disclosed methods and systems. Many different types of techniques may be used for displaying additional-information entities related to event types and event clusters. Additional-information-display windows may have different sizes, resolutions, display formats, and may vary in many other ways. The additional-information entities may be rendered for display in a variety of different ways, each of which includes different descriptive information. The choice of a subset of the additional-information entities available for a particular event type or event cluster may be made in a variety of different ways, including using ranks associated with addition-information entities to choose the highest-ranked additional-information entities to initially display in an additional-information-display window. Ranking may be based on user feedback, on ranks provided by developers and experts, and based on other techniques, including automated, semi-automated, and manual techniques. There are many approaches to accumulating and storing additional-information entities for display to users, and many different types of information-display events that may trigger display of additional-information entities with respect to event types and event clusters. The above-discussed implementation represents only one of many different possible approaches to the display of additional-information entities associated with event types and event clusters.

It is appreciated that the previous description of the disclosed embodiments is provided to enable any person skilled in the art to make or use the present disclosure. Various modifications to these embodiments will be readily apparent to those skilled in the art, and the generic principles defined herein may be applied to other embodiments without departing from the spirit or scope of the disclosure. Thus, the present disclosure is not intended to be limited to the embodiments shown herein but is to be accorded the widest scope consistent with the principles and novel features disclosed herein.

The invention claimed is:

1. An accumulated-event display system that displays accumulated events, the system comprising:
   one or more processors;
   one or more memories;
   one or more data-storage devices;
   a display device; and
   computer instructions, stored in one or more of the one or more memories that, when executed by one or more of the one or more processors, control the accumulated-event display system to
      to receive a set of accumulated time-stamped events, to each of which event types have been assigned, and store the set of accumulated time-stamped events in one or more of the one or more memories and one or more data-storage devices;

retrieve, from the one or more memories and one or more data-storage devices, a display set of accumulated events having timestamps within a selected time window;

in a first accumulated-event-display mode, display, on the display device, timestamp-ordered representations of the display set of accumulated events, the display scrollable when the events in the display set cannot be displayed simultaneously on the display-device screen; and in a second accumulated-event-display mode, display, on the display device, representations of the event types assigned to the events within the display set, each event-type representation indicating the number of accumulated events to which the event type is assigned.

2. The accumulated-event display system of claim 1 wherein each event type represents a group of one or more related events.

3. The accumulated-event display system of claim 1 wherein events are issued by event sources within a distributed computer system as event messages and collected into event logs stored as files in data-storage appliances.

4. The accumulated-event display system of claim 1 wherein event types are assigned to events by an event-typing system that clusters events based on distances between metrics computed for events.

5. The accumulated-event display system of claim 4 wherein the event-typing system types events by:

receiving a stream of event messages;

for each received event message, identifying tokens within the event message, using regular expressions to identify parameter tokens and non-parameter tokens, computing a metric for the received event message from the non-parameter tokens, determining a distance between the metric and the metric associated with each already existing event-type associated event clusters, selecting the event cluster, if any, for which the determined distance is smallest, when there are no existing event clusters or when the distance between the metric computed for the received event message and the metric associated with the selected event cluster is greater than or equal to a threshold value, creating a new cluster and adding the received event message to the new cluster, and when the distance between the metric computed for the received event message and the metric associated with the selected event cluster is less than the threshold value, assigning the event type associated with the selected event cluster to the received event message and adding an event record corresponding to the received event message to the selected cluster.

6. The accumulated-event display system of claim 5 wherein the event-typing system, based on feedback from down-stream analytic systems, merges existing event clusters into a single event cluster and splits existing event clusters into multiple event clusters in order that the set of event clusters represent a partitioning of events into related groups of events.

7. The accumulated-event display system of claim 5 wherein the metric is computed for the received event message by applying multiple functions to the identified non-parameter tokens to produce a feature vector.

8. The accumulated-event display system of claim 7 wherein the distance between the metric computed for the received event message and the metric associated with an already existing event cluster is computed as the number of non-matching feature-vector entries of the feature vectors corresponding to the metric computed for the received event message and the metric associated with an already existing event cluster.

9. The accumulated-event display system of claim 1 wherein the displayed representations of event types are active representations which visually respond to user input.

10. The accumulated-event display system of claim 9 that, in response to an input directed to a particular displayed active representation of an event type, accesses stored descriptions of information entities associated with event types to select one or more of the stored descriptions of information entities associated with the event type represented by the particular displayed representation, and displays, on the display screen, an active representation of each of the one or more selected descriptions of information entities, an input to each of which invokes display of a corresponding information entity.

11. The accumulated-event display system of claim 1 wherein, in the second accumulated-event-display mode, the display of the representations of the event types is ordered by the number of accumulated events to which the event types of the display set are assigned.

12. A method that displays accumulated events in a system having one or more processors, one or more memories, one or more data-storage devices, and a display device, the method comprising:

receiving a set of accumulated time-stamped events, to each of which event types have been assigned, and storing the set of accumulated time-stamped events in one or more of the one or more memories and one or more data-storage devices;

displaying, on the display device, timestamp-ordered representations of the accumulated events with timestamps within a selected time window, the display scrollable when the accumulated events with timestamps within the selected time window cannot be displayed simultaneously on the display-device screen; and when an event-type display mode is selected, displaying, on the display device, representations of the event types assigned to the accumulated events with timestamps within the selected time window, each event-type representation indicating the number of accumulated events to which the event type is assigned.

13. The method of claim 12 wherein the displayed representations of event types are active representations which visually respond to user input.

14. The method of claim 13 further comprising:

in response to an input directed to a particular displayed active representation of an event type, accessing stored descriptions of information entities associated with event types to select one or more of the stored descriptions of information entities associated with the event type represented by the particular displayed representation, and displaying, on the display screen, an active representation of each of the one or more selected descriptions of information entities, an input to each of which invokes display of a corresponding information entity.

15. The method of claim 14 wherein descriptions of information entities associated with event types are stored in an associated-information database that, for each information entity associated with an event type, stores:
- an indication of an information source for the information entity;
- an indication of the type of information source; and
- an indication of the type of information entity.

16. The method of claim 15 wherein types of information sources include:
- a remote server that is accessed through a uniform resource locator;
- a person or system accessed through an email address;
- a person or system accessed through a phone number;
- a person accessed through a mail address;
- a person or system accessed through a social network;
- a person or system accessed through a web browser;
- component or system information that is accessed through a stock keeping unit input to a search engine or on-line information interface; and
- an on-line information service accessed through a dial-up phone number.

17. The method of claim 15 wherein types of information entities include:
- a blog page;
- a web page;
- an article encoded in a text file;
- an article encoded in a web page;
- a link to an article encoded in a web page;
- an article encoded in a formatted file;
- a human developer;
- a human expert;
- a frequently-asked-question message or message response;
- a frequently-asked-question message or message response encoded in a web page;
- a link to a frequently-asked-question message or message response encoded in a web page;
- text stored in a database;
- a user manual or product specification encoded in a web page; and
- a link to a user manual or product specification encoded in a web page; and
- a user manual or product specification encoded in a text file; and
- a user manual or product specification encoded in a formatted file.

18. The method of claim 12 wherein events are issued by event sources within a distributed computer system as event messages and collected into event logs stored as files in data-storage appliances.

19. The method of claim 12 wherein event types are assigned to events by an event-typing system that clusters events based on distances between metrics computed for events.

20. Computer instructions encoded in a physical data-storage device that, when executed by one or more processors of a system having one or more memories, one or more data-storage devices, and a display device, control the system to:
- receive a set of accumulated time-stamped events, to each of which event types have been assigned, and storing the set of accumulated time-stamped events in one or more of the one or more memories and one or more data-storage devices;
- display, on the display device, timestamp-ordered representations of the accumulated events with timestamps within a selected time window, the display scrollable when the accumulated events with timestamps within the selected time window cannot be displayed simultaneously on the display-device screen; and
- when an event-type display mode is selected,
  - display, on the display device, representations of the event types assigned to the accumulated events with timestamps within the selected time window, each event-type representation indicating the number of accumulated events to which the event type is assigned.

\* \* \* \* \*